United States Patent
Vanasco

(10) Patent No.: US 11,151,516 B2
(45) Date of Patent: Oct. 19, 2021

(54) UTILIZING CROSS-NETWORK IDENTITY DATA FOR CUSTOMIZED CONTENT

(71) Applicant: Jonathan Brian Vanasco, New York, NY (US)

(72) Inventor: Jonathan Brian Vanasco, New York, NY (US)

(*) Notice: Subject to any disclaimer, the term of this patent is extended or adjusted under 35 U.S.C. 154(b) by 514 days.

(21) Appl. No.: 15/968,703

(22) Filed: May 1, 2018

(65) Prior Publication Data
US 2018/0247268 A1    Aug. 30, 2018

Related U.S. Application Data

(62) Division of application No. 12/011,869, filed on Jan. 30, 2008, now Pat. No. 10,007,895.
(Continued)

(51) Int. Cl.
*G06Q 10/00* (2012.01)
*G06Q 10/10* (2012.01)
(Continued)

(52) U.S. Cl.
CPC ....... *G06Q 10/107* (2013.01); *G06F 16/9024* (2019.01); *G06F 16/9535* (2019.01); *G06Q 30/02* (2013.01)

(58) Field of Classification Search
CPC .............. G06Q 30/02; G06Q 30/0269; G06Q 30/0255; G06Q 20/384; G06Q 30/0241;
(Continued)

(56) References Cited

U.S. PATENT DOCUMENTS 6,202,058 B1 * 3/2001 Rose ..................... G06F 16/335
706/45
6,523,019 B1 * 2/2003 Borthwick ............ G06F 16/215
706/45
(Continued)

OTHER PUBLICATIONS

S. Saklikar and S. Saha, "A Social Query Framework," 2007 2nd International Conference on Communication Systems Software and Middleware, Bangalore, India, 2007, pp. 1-11, doi: 10.1109/COMSWA. 2007.382412.*
(Continued)

*Primary Examiner* — Gabrielle A McCormick

(57) ABSTRACT

A networking database and system into which profile information is aggregated from online websites and services to correlate discovered identities to one another via Intra-Personal and Inter-Personal Relationships and Profile Information. Profile Information, Inter-Personal relationships and related content of those identities which have been determined to have an Intra-Personal relationship are aggregated into Meta-Profiles. The aggregated Meta-Profiles' information is used in place of their component Intra-Related identities for optimized social graph operations and content customization. Identity and Relationship data can be used to customize content for the primary service, registered or unregistered users, and third-party services. The system may define, categorize and group both identities and relationships belonging to individuals registered with the system and unregistered users through computational analysis. The system may be provided with Identities and Relationships directly from users, via third-party systems, or through automated discovery.

13 Claims, 64 Drawing Sheets

Related U.S. Application Data

(60) Provisional application No. 60/887,253, filed on Jan. 30, 2007, provisional application No. 60/954,568, filed on Aug. 7, 2007.

(51) Int. Cl.
  *G06F 16/901* (2019.01)
  *G06F 16/9535* (2019.01)
  *G06Q 30/02* (2012.01)

(58) Field of Classification Search
  CPC ........... G06Q 30/0251; G06Q 30/0641; G06Q 50/01; G06Q 10/107; G06F 16/9535; G06F 16/24575; G06F 16/248; G06F 16/9024
  USPC .......................................................... 705/319
  See application file for complete search history.

(56) References Cited

U.S. PATENT DOCUMENTS

| | | | | |
|---|---|---|---|---|
| 6,691,106 | B1* | 2/2004 | Sathyanarayan | G06F 16/9535 |
| 6,853,982 | B2* | 2/2005 | Smith | G06Q 30/0603 705/26.7 |
| 6,986,154 | B1* | 1/2006 | Price | H04N 7/17318 348/E7.071 |
| 7,016,875 | B1* | 3/2006 | Steele | G06Q 10/00 705/44 |
| 7,424,439 | B1* | 9/2008 | Fayyad | G06Q 30/0204 705/7.33 |
| 7,478,035 | B1* | 1/2009 | Wrench | G06F 16/9535 704/7 |
| 7,747,648 | B1* | 6/2010 | Kraft | G06F 16/288 707/790 |
| 2001/0054153 | A1* | 12/2001 | Wheeler | G06F 21/55 713/185 |
| 2002/0144262 | A1* | 10/2002 | Plotnick | H04N 21/252 725/32 |
| 2002/0169888 | A1* | 11/2002 | Nabkel | H04L 41/22 709/238 |
| 2002/0178077 | A1* | 11/2002 | Katz | G06Q 10/10 705/7.36 |
| 2002/0178161 | A1* | 11/2002 | Brezin | G06F 16/9535 |
| 2003/0005150 | A1* | 1/2003 | Thompson | H04M 7/0033 709/238 |
| 2003/0065742 | A1* | 4/2003 | Culp | G06Q 10/109 709/218 |
| 2003/0088830 | A1* | 5/2003 | Tognazzini | G06F 40/106 715/256 |
| 2003/0187713 | A1* | 10/2003 | Hood | G06Q 30/0204 705/7.33 |
| 2003/0225785 | A1* | 12/2003 | Arellano | G06F 16/337 |
| 2004/0139050 | A1* | 7/2004 | Barrett | G06F 21/34 |
| 2004/0148275 | A1* | 7/2004 | Achlioptas | G06F 16/9535 |
| 2004/0215793 | A1* | 10/2004 | Ryan | G06Q 50/01 709/229 |
| 2005/0043961 | A1* | 2/2005 | Torres | G06F 21/55 705/35 |
| 2005/0084139 | A1* | 4/2005 | Kyle | G07C 9/38 382/115 |
| 2005/0124320 | A1* | 6/2005 | Ernst | H04M 3/4931 455/411 |
| 2005/0125226 | A1* | 6/2005 | Magee | G06F 21/32 704/246 |
| 2005/0210102 | A1* | 9/2005 | Johnson | H04L 67/22 709/204 |
| 2005/0216300 | A1* | 9/2005 | Appelman | G06Q 10/10 705/319 |
| 2005/0216550 | A1* | 9/2005 | Paseman | G06Q 10/00 709/202 |
| 2005/0234770 | A1* | 10/2005 | McKnight | G06Q 30/0269 705/14.1 |
| 2005/0234781 | A1* | 10/2005 | Morgenstern | G06Q 30/02 705/14.16 |
| 2005/0240580 | A1* | 10/2005 | Zamir | H04L 67/306 |
| 2005/0257250 | A1* | 11/2005 | Mitchell | H04L 63/102 726/3 |
| 2005/0283753 | A1* | 12/2005 | Ho | G06Q 10/10 717/102 |
| 2006/0031203 | A1* | 2/2006 | Rosenbaum | G06F 16/9024 |
| 2006/0064431 | A1* | 3/2006 | Kishore | G06Q 30/02 |
| 2006/0074986 | A1* | 4/2006 | Mallalieu | G07C 9/37 |
| 2006/0106847 | A1* | 5/2006 | Eckardt | G06F 16/3323 |
| 2006/0218492 | A1* | 9/2006 | Andrade | G06F 40/166 715/234 |
| 2006/0229902 | A1* | 10/2006 | McGovern | G06Q 50/10 705/321 |
| 2006/0282270 | A1* | 12/2006 | Sheets | G06Q 10/10 705/1.1 |
| 2006/0287971 | A1* | 12/2006 | Armstrong | G06F 16/9558 |
| 2007/0023507 | A1* | 2/2007 | Starbuck | G06F 16/20 235/382 |
| 2007/0198275 | A1* | 8/2007 | Malden | H04L 51/00 705/1.1 |
| 2007/0282987 | A1* | 12/2007 | Fischer | G06Q 10/10 709/223 |
| 2008/0015878 | A1* | 1/2008 | Feng | G06Q 30/02 705/1.1 |
| 2008/0052102 | A1* | 2/2008 | Taneja | G06Q 10/103 705/7.11 |
| 2008/0104495 | A1* | 5/2008 | Craig | H04L 67/306 715/205 |
| 2008/0120411 | A1* | 5/2008 | Eberle | G06Q 50/10 709/225 |
| 2008/0140711 | A1* | 6/2008 | Hyder | G06Q 30/02 |
| 2008/0182563 | A1* | 7/2008 | Wugofski | G06Q 30/02 455/414.2 |
| 2008/0228532 | A1* | 9/2008 | Gengarella | G06Q 30/02 705/5 |
| 2008/0275861 | A1* | 11/2008 | Baluja | G06N 5/02 |
| 2009/0063491 | A1* | 3/2009 | Barclay | H04L 67/42 |
| 2009/0328173 | A1* | 12/2009 | Jakobson | H04L 9/3263 726/7 |

OTHER PUBLICATIONS

S. Foll, J. Pontow, D. Linner and I. Radusch, "Classifying Multimedia Resources Using Social Relationships," Eighth IEEE International Symposium on Multimedia (ISM'06), San Diego, CA, USA, 2006, pp. 690-695, doi: 10.1109/ISM.2006.46.*

* cited by examiner

Identity & Relationship Tracking chained inter-personal and intra-personal relationships using verified and probable intra-personal relationships intra-related identities ( same as / facet of )
being related to a user of the system and to one another
solid lines represent verified link, thin dotted lines represent scored link
scores represent the probability of match

Figure 9
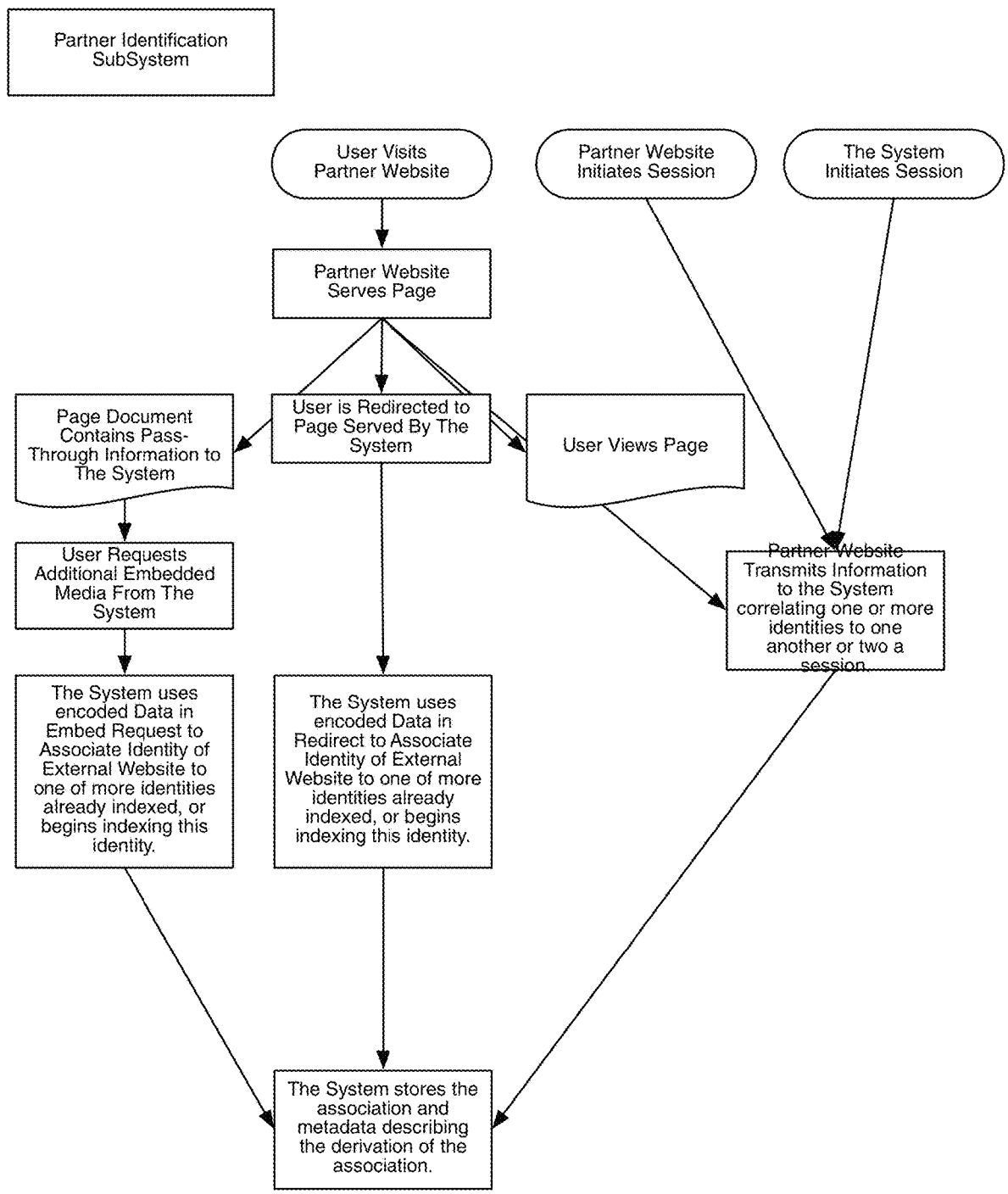

Figure 10

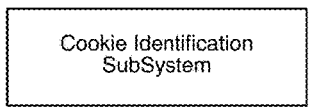

1. A user visits either The System, an External network that partners with The System, or a website that embeds media ( advertisement, image, custom content, widget, etc ) offered by The System or an associated partner. This creates a user cookie or session identifier that is accessible to the System..

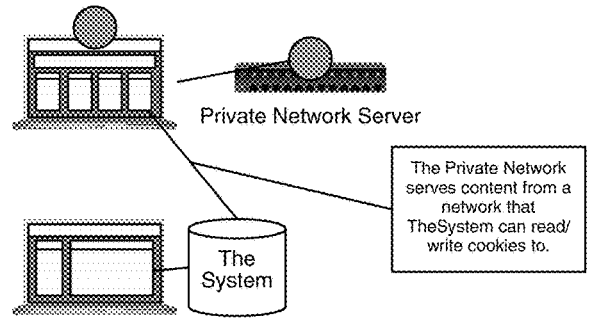

2. On subsequent visits to The System, an External network that partners with The System, or a website that embeds media offered by The System, the System can correlate identities associate identities associated with the cookie/session to new identities.

New identities are formulated by: i. partner site information pass through, ii. url analysis. In the case of URL analysis, the system can analyze the metadata from embedded content. For example, the referrer header the media was requested with contains the URL of the page it is shown on. For many social networks and identity-oriented sites, the URL for a user's own profile differs drastically from the URL of others -- therefore the referrer header can identity user.

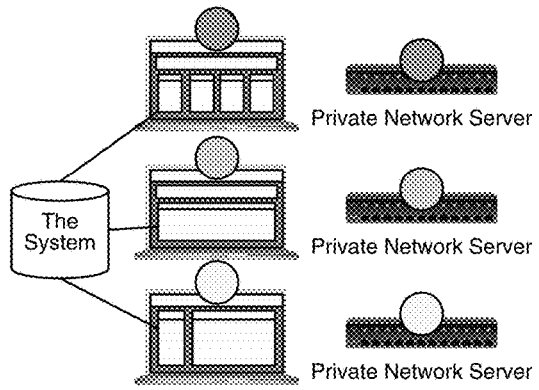

Figure 11
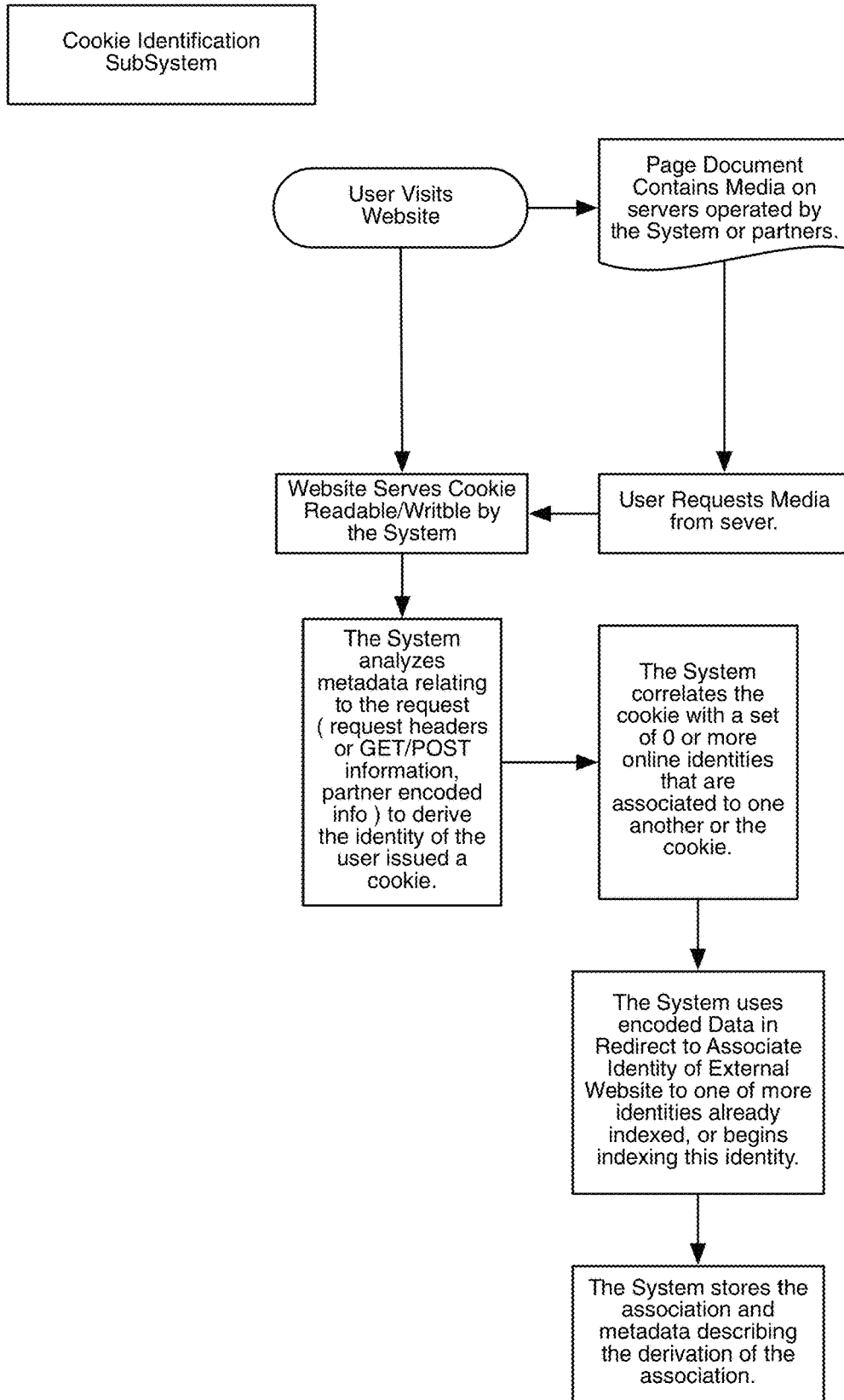

Figure 17
a. Overview
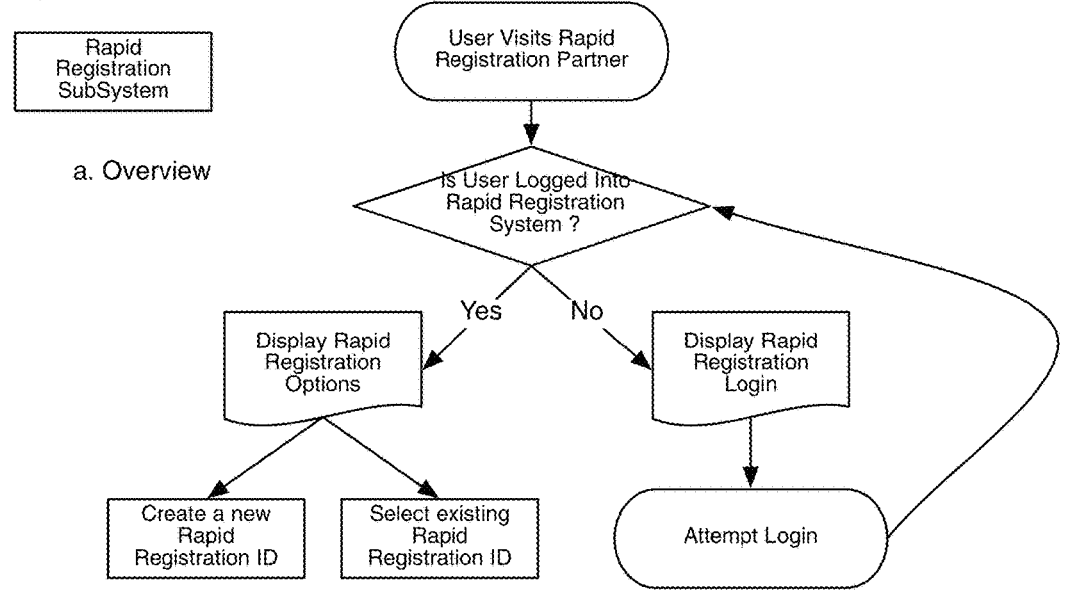
b. Detailed Example
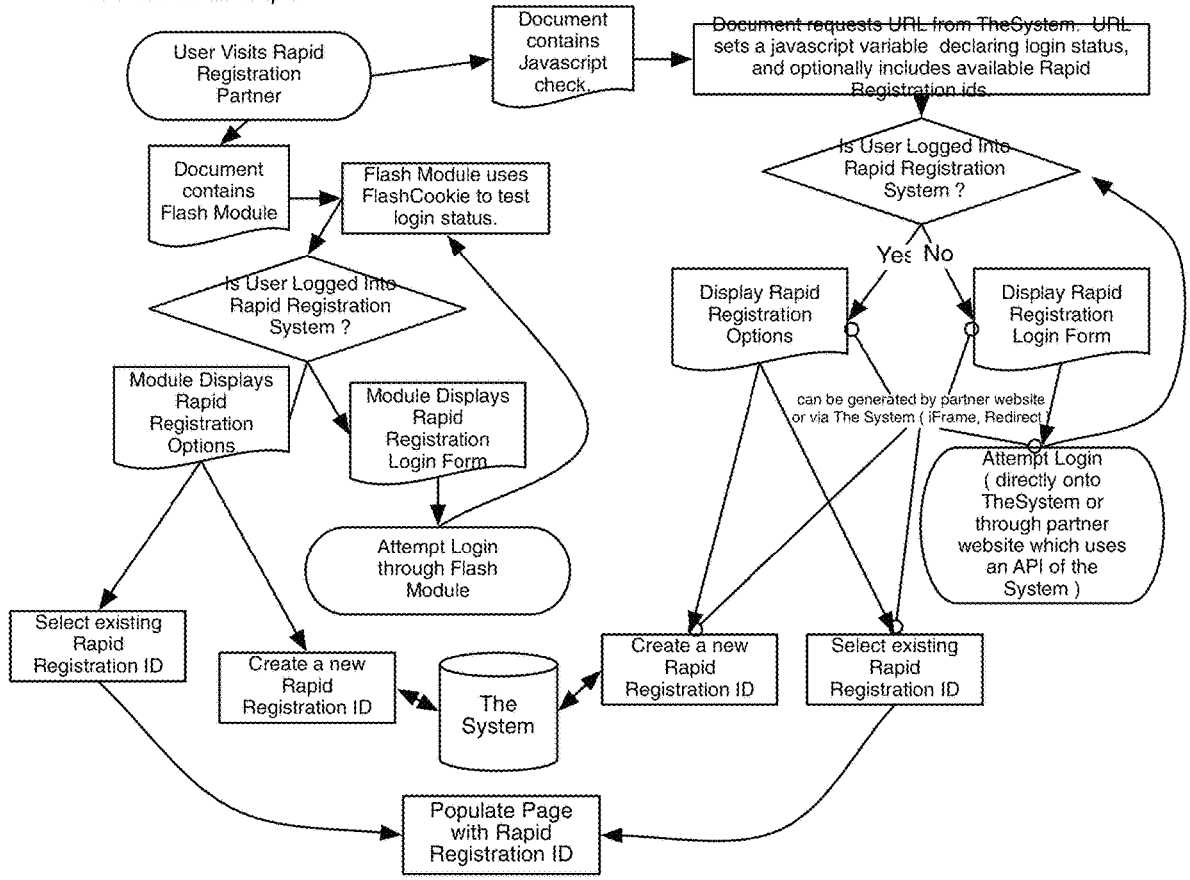

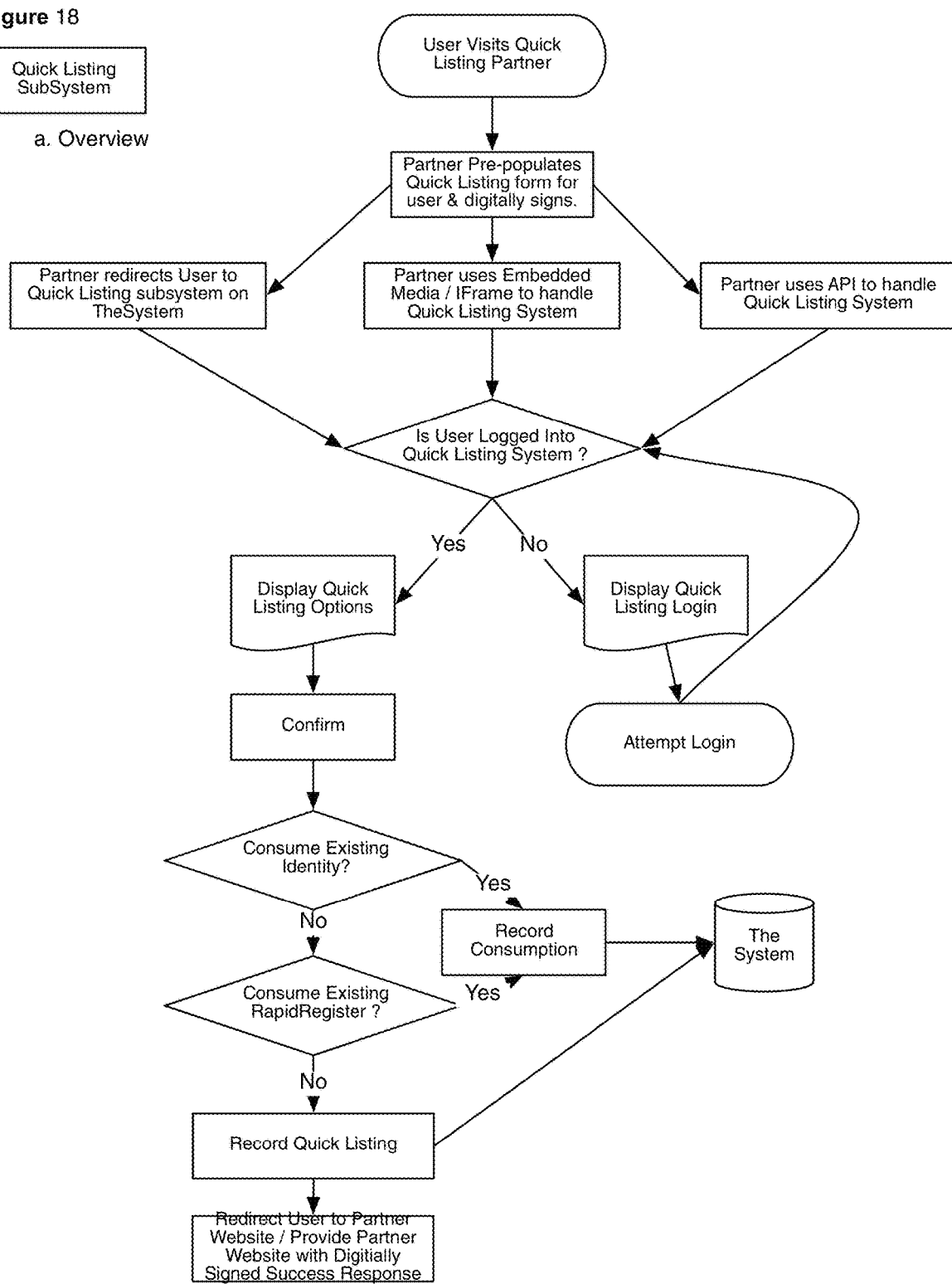

Figure 19
Bi-Directional Contact Search Utilized for Efficiency
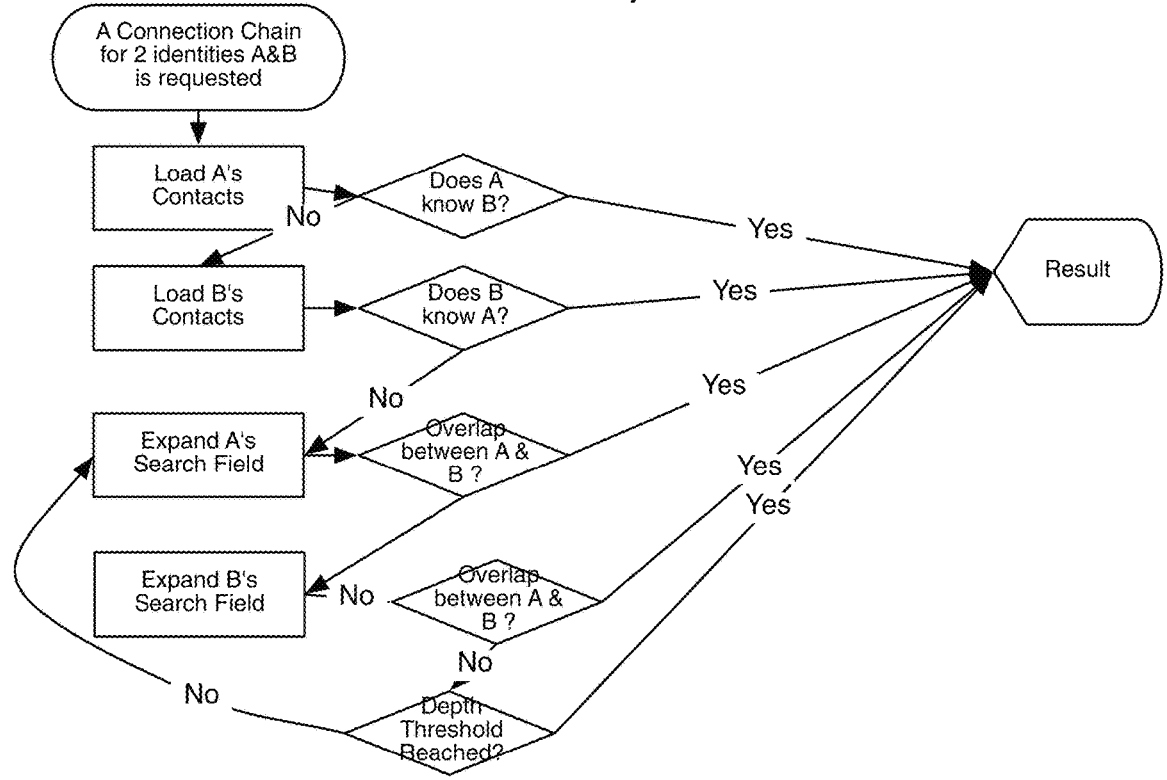
A - Single Direction Search
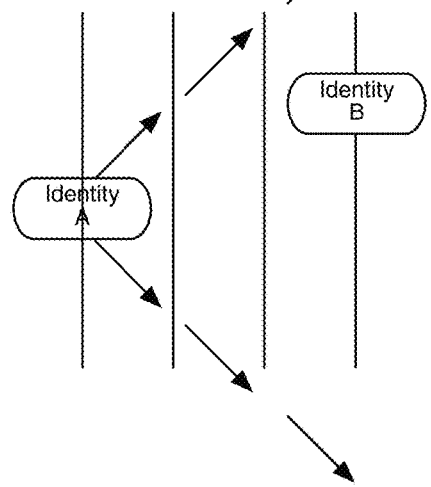
B - Bi-Directional Search
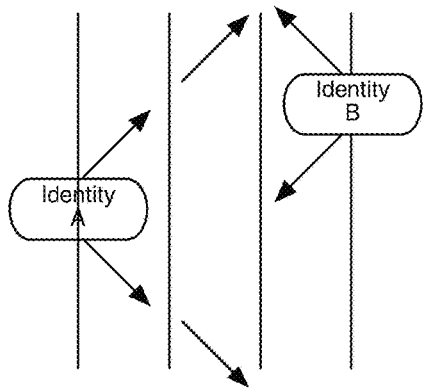
When a search is performed that involves the chain or intersection of 2 known identities,

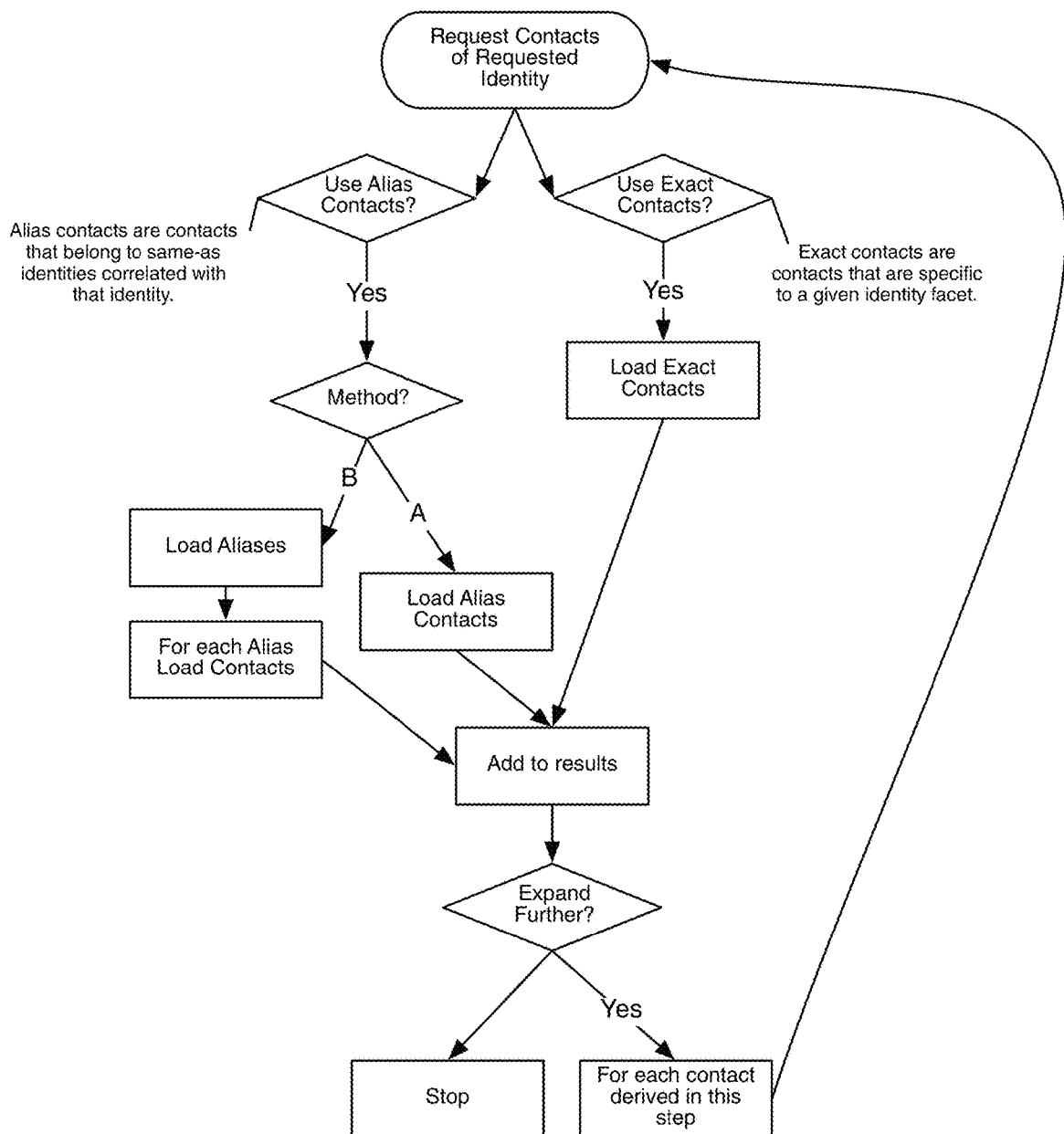
Figure 20
Contact Expansion Mechanism

Figure 21 | Quick Listing & Rapid Registration SubSystems Logging & Security
a - Rapid Registration
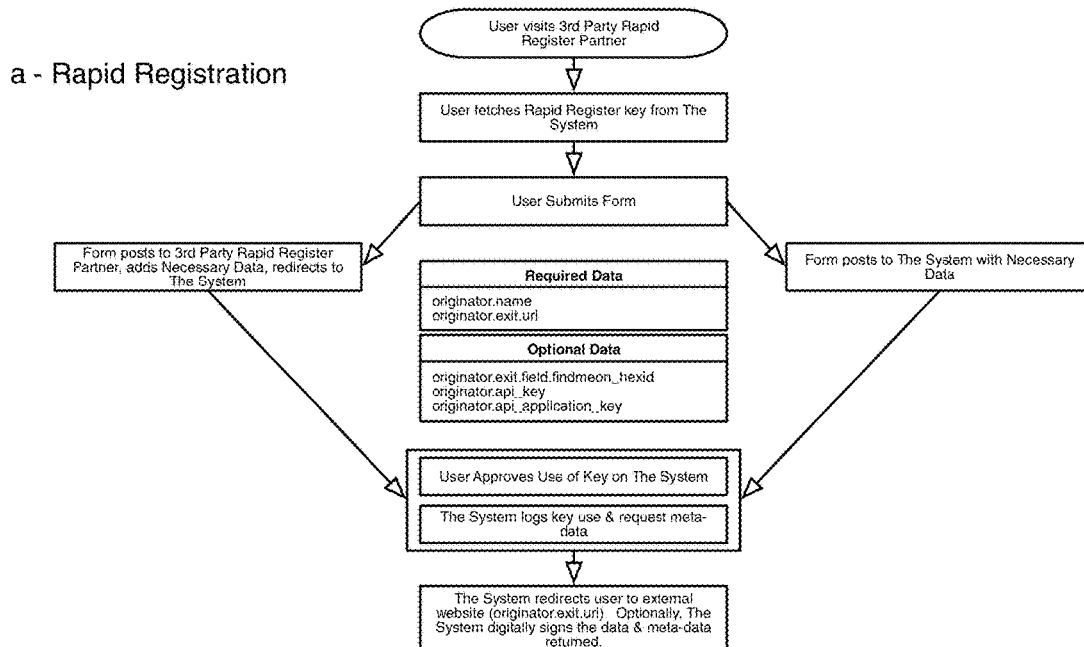
b - Quick Listing
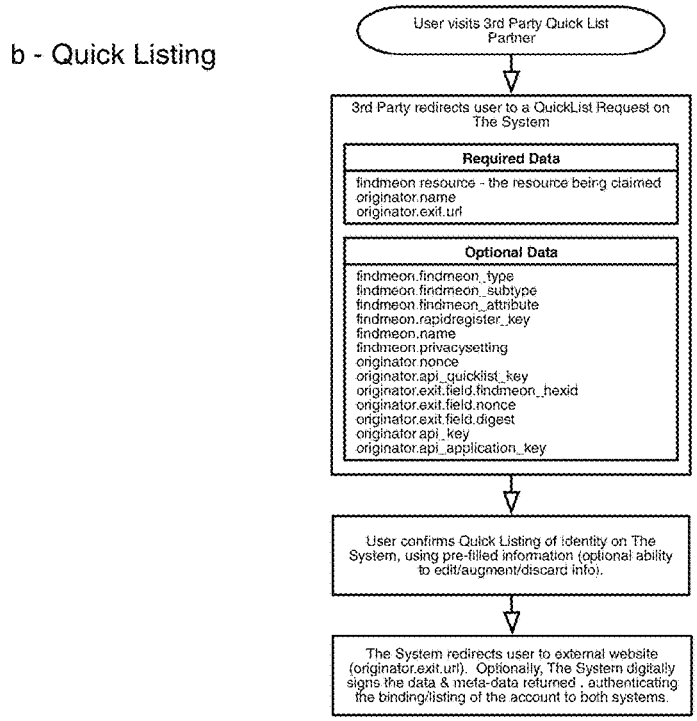

My Registered Identities

This is your collection of active identities registered with FindMeOn.com.

We call them 'FindMeOns' -- because they're the networks and accounts where people will find you.

By default, we will syndicate your links to badges in this order ( which is sorted by type, subtype , then resource ). But you can click here to set a custom ordering Or would you like to » Add a new identity »

| Type | SubType | Resource | Verified? | Details | BadgeBuilder | Name | Privacy Setting |
|---|---|---|---|---|---|---|---|
| url | homepage | www.myspace.com/2xlp | verified | details | badge builder | | private friends public |
| url | business | 2xlp.com | verified | details | badge builder | 2XLP.com | private friends public |
| url | business | findmeon.com | unverified Click Details To Verify | details | badge builder | FindMeOn | private friends public |
| url | business | roadsound.com | unverified Click Details To Verify | details | badge builder | RoadSound | private friends public |
| url | blog | destroybrooklyn.com | unverified Click Details To Verify | details | badge builder | DstryBkln | private friends public |
| url | blog | destructuring.net | verified | details | badge builder | dstrctrng | private friends public |
| url | social network profile | digg.com/users/2xlp | unverified Click Details To Verify | details | badge builder | digg | private friends public |
| url | social network profile | findmeon.com/user/6a36ee79a3 | verified | details | | | |
| url | social network profile | friendster.com/31720 | verified | details | badge builder | Friendster | private friends public |
| url | social network profile | whosgoing.com/profile/jonathan-vanasco | unverified Click Details To Verify | details | badge builder | WhosGoing | private friends public |
| url | social network profile | www.consumating.com/profiles/2xlp | unverified Click Details To Verify | details | badge builder | consumating | private friends public |
| url | social network profile | www.linkedin.com/in/jonathanvanasco | unverified Click Details To Verify | details | badge builder | LinkedIn | private friends public |

Identity Details

An Identity is a collection of screen names, urls, real names and email addresses.

Other viewable FindMeOns for this user

| Resource | Type | SubType | Attributes | Date Added | Verified? | Date Last Verified | FindMeOn.com Record | other listings search |
|---|---|---|---|---|---|---|---|---|
| jon@2xlp.com | email | primary email | | 08/03/2006 | verified | 08/03/2006 | find on resource | search |
| friendster.com/31720 | url | social network profile | | 08/03/2006 | verified | 09/20/2006 | find on resource | search |
| roadsound.com | url | business | | 08/03/2006 | | | find on resource | search |
| findmeon.com | url | business | | 08/28/2006 | | | find on resource | search |
| destructuring.net | url | blog | | 09/24/2006 | verified | 09/27/2006 | find on resource | search |
| wheeoging.com/profile/jonathan-vanasco | url | social network profile | | 10/12/2006 | | | find on resource | search |
| www.linkedin.com/in/jonathanvanasco | url | social network profile | | 10/27/2006 | | | find on resource | search |
| www.myspace.com/2xlp | url | social network profile | | 10/29/2006 | | | find on resource | search |
| digg.com/users/2xlp | url | social network profile | | 11/03/2006 | | | find on resource | search |
| www.consumating.com/profiles/2xlp | url | social network profile | | 11/26/2006 | | | find on resource | search |

Figure 27 http://www.findmeon.com/findmeon/8946c661ff114ba67d4f7b23c118712a/profile/ findmeon
the cure for multiple web personality disorder

IdentiPHI Single Sign-On
Solve password challenges by managing user's credentials

Single Sign-On
Imprivata OneSign - the only easy, smart, and affordable SSO Solution Logged In as jonathan vanasco (jon@2xlp.com)

Home | Logout

The permanent url for this item is: http://findmeon.com/findmeon/8946c661ff114ba67d4f7b23c118712a

| Resource | Type | SubType | Attributes | Date Added | Verified? | Date Last Verified |
|---|---|---|---|---|---|---|
| 2xlp.com | url | business | primary,work | 08/03/2006 | verified | 09/20/2006 |

The owner of this account has marked it with a privacysetting of: public search Search for other FindMeOn.com listings claiming this resource

Main Details | User Profile | User Shouts | Friends (Incoming) | Friends (Outgoing) | Connection

User Profile

Interests

General alphabetizing, almond brioche, art, bourbon, butter, buck hunt, coding, coffee, copyleft, cooking, design, doing absolutely nothing, espresso, film, ignoring the concept of religion, irreverence, irrelevance, italian espresso machines, joining museums and then never going, law, music, making fun of critical theory, minimalism, moogs, open source stuff, photography, pinball, political science, retro/recreation/vintage furniture, skeeball, vegetarian food, vintage port, wine, well designed things, writing

Music

90 day men, american analog set, amon tobin, autechre, bedhead, blonde redhead, boards of canada, broken social scene, built to spill, calexico, can, efterklang, explosions in the sky, heavenly, iron & wine, kompakt records, lambchop, m83, the mfa, mogwai, morr music, my bloody valentine, neu, pavement, plus minus, polvo, prefuse 73, rodan, saxon shore, six parts seven, sebadoh, shellac, slint, songs:ohia, spoon, smog, stereolab, superchunk, superpitcher, swayzak, underworld, versus, warp records, we are scientists, yngwie malmsteen

Basic

About Me

I live in Williamsburg , Brooklyn, where I work on managing social networks with FindMeOn.com and information for bands with RoadSound.com I drink a lot of espresso and wine - they balance one another out. I studied urban art in east africa and speak better swahili after 5 months than french after 6 years. A Film/Media major in college ruined the joy of watching movies, so I detoxed by only watching bad teen movies for 2 years. It worked. I have a moog and a monome, can turn whole wheat flour into seitan, and know how to both make and use coconut milk. I ran a fake asian porn site as an art project to win a bet, and threw up 2x while watching Salo. I don't eat things that can love

Who I Want To Meet passionate & driven creative types people who want to make my screenplays into movies or shorts people for new music tips anyone up for some pinball or skeeball people interested in midnight sports leagues librarians, scientists, bakers ( i know none ) extra credit if you're an insomniac double extra credit if you're a cute agnostic girl who doesn't eat meat or smoke Figure 28
Small Widget
shown in phases:
1. default
2. loading
3. option a
4. option b
5. selecting option
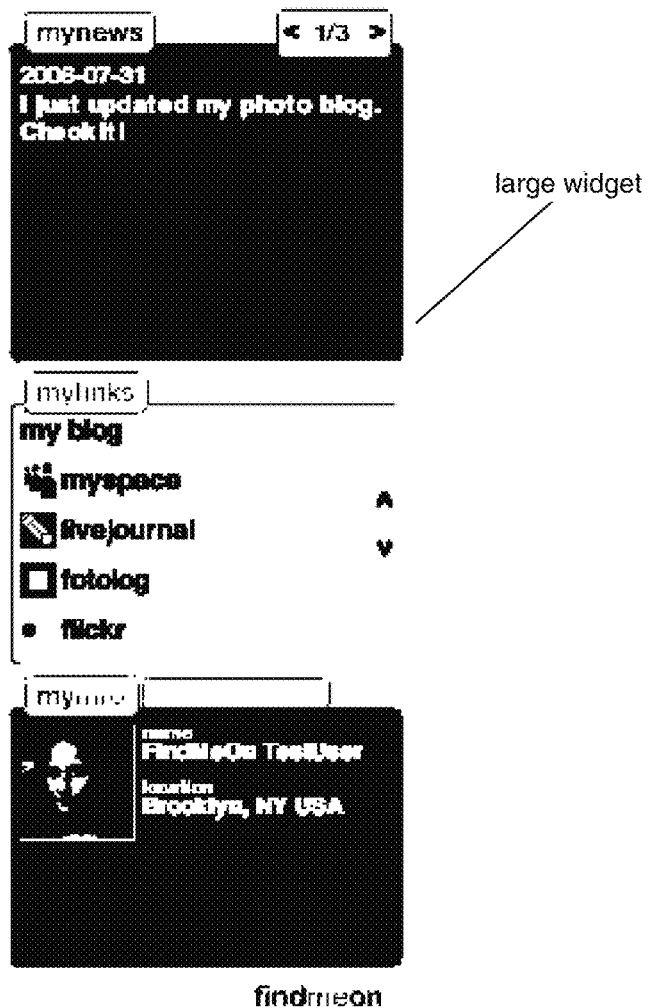
medium widget
large widget widget communicates with the system, pulling content

Figure 35 a  Aggregated Identities

Online networks have different styles and personalities. Users post information to one, that they might not list on another.
By indexing publicly available profile information, intra-personal identities can be consolidated showing their consumer profile in rich detail.
A sampling of fields across Aggregated Identities associated with myblog.com

| identity | gender | age | bday year | bday month | bday day | ethnicity | hair | eyes | height | weight | zodiac | status | orientation |
|---|---|---|---|---|---|---|---|---|---|---|---|---|---|
| Aggregated | m | 25 | 1972 | 12 | 12 | caucasian | blue | brown | 6'0 | 165 | pisces | single | heterosexual |
| myblog.com | | 25 | | | | | | | | | pisces | | |
| findmean.com/user/fe9c8660ba | m | 25 | 1972 | 12 | | | | | | | pisces | single | |
| myspace.com/JohnDoe | m | 25 | | | | | blue | brown | 6'0 | 165 | pisces | single | |
| friendster.com/JohnQPublic | m | 25 | 1972 | 12 | 12 | caucasian | | | | | | | heterosexual |

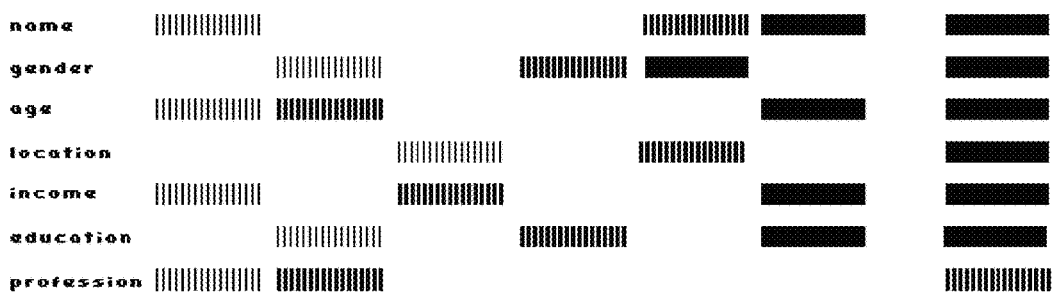

c  Online Profiles Are Consumer Profiles
public facing, opt-in consumer marketing data

SNS Advertising & Marketing Is Inefficient
each network has its personality ; people share different information across identity facets.

Social Mapping Technology Assembles the Pieces
A full consumer profile is created by completing the picture and amplifying data.

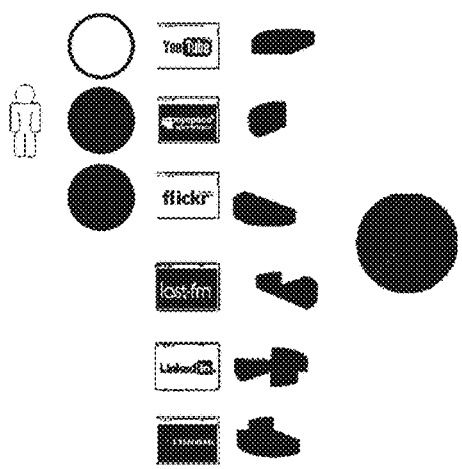

Figure 36
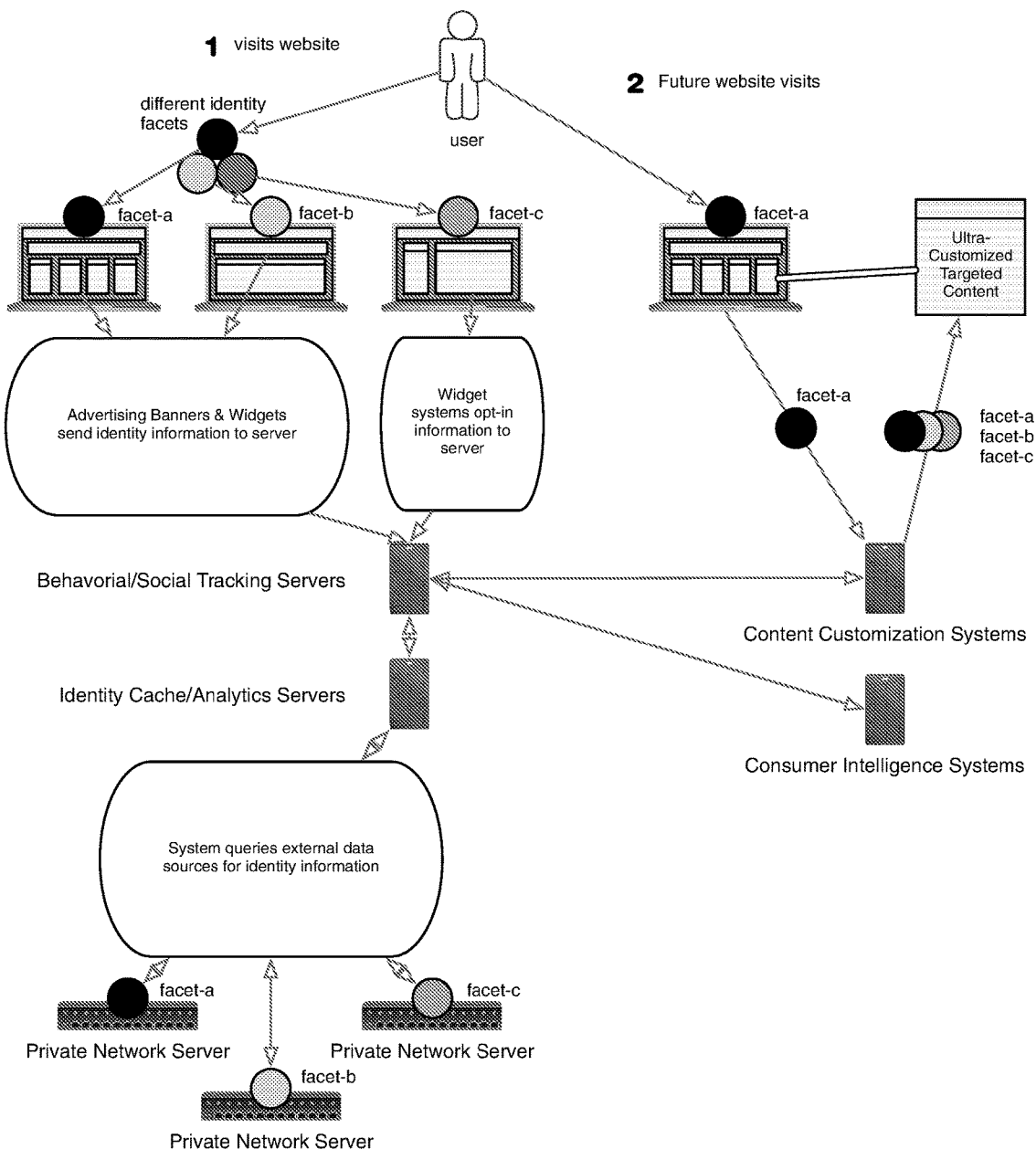

Figure 38

Advanced Demographic Reporting

By tracking users across networks the system is able to offer comparative demographic profiling of networks using cross-site data.

This active profiling of social networks allows for accurately identifying groups of consumers across networks with configurable controls, using a base of verified and predicted identities.

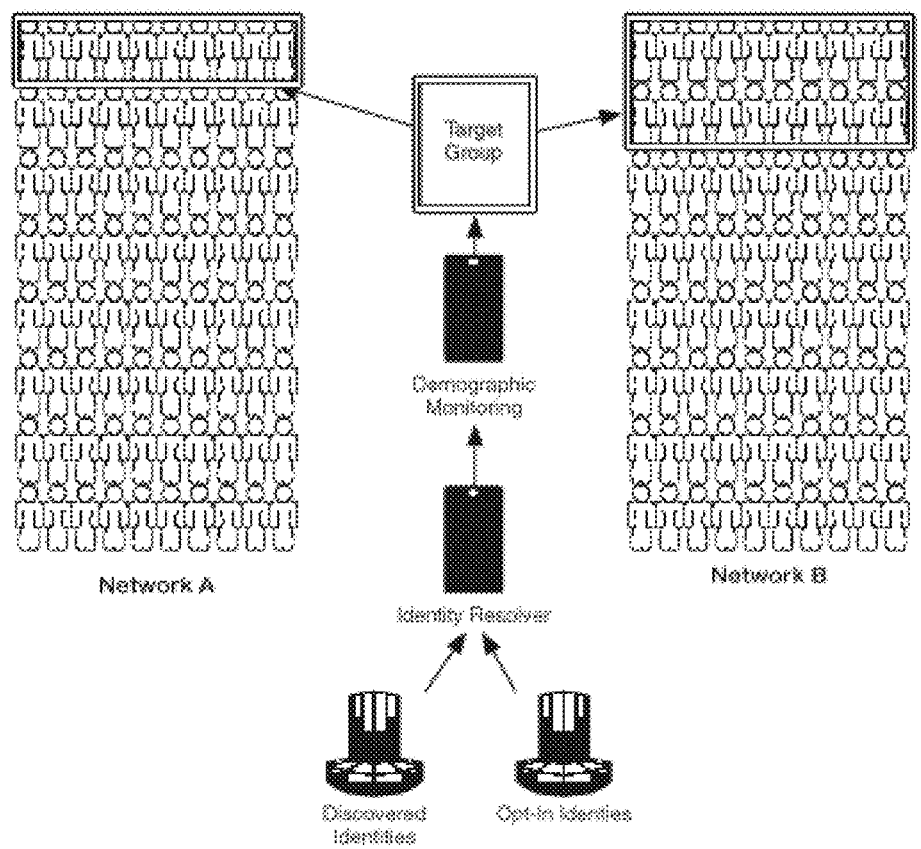

Figure 39
The Invention compared to existing systems
A- Standard Identity Systems
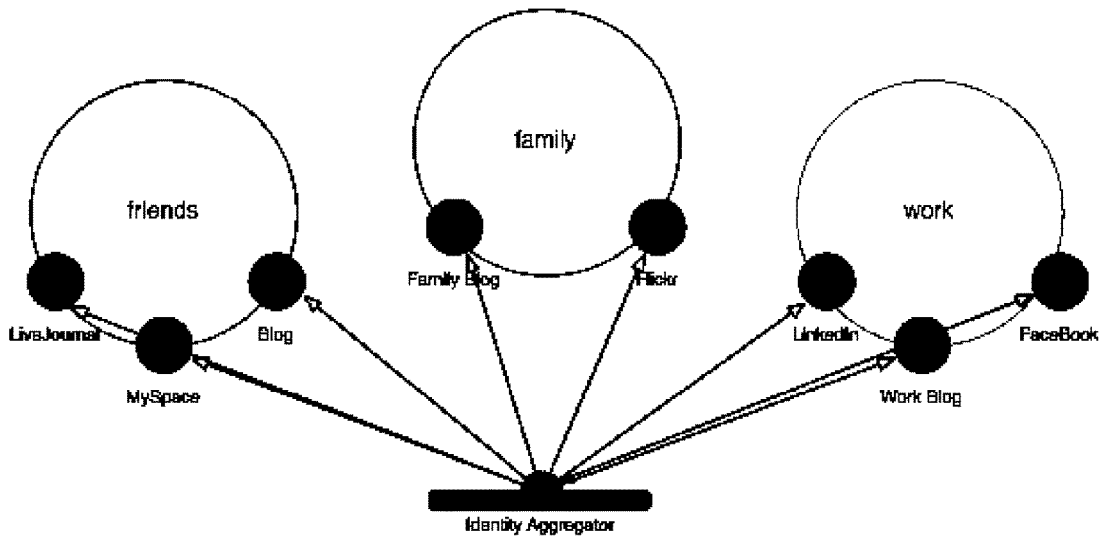
B- The invention
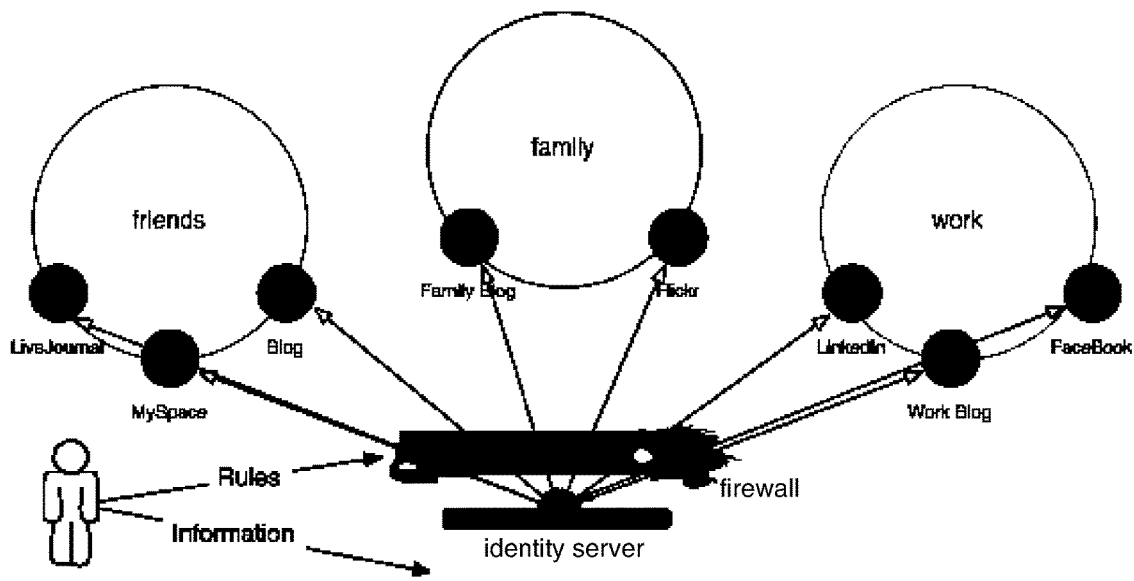

Figure 40
A- An illustration of the normal overlap of friends, family and work circles of relationships and personality.
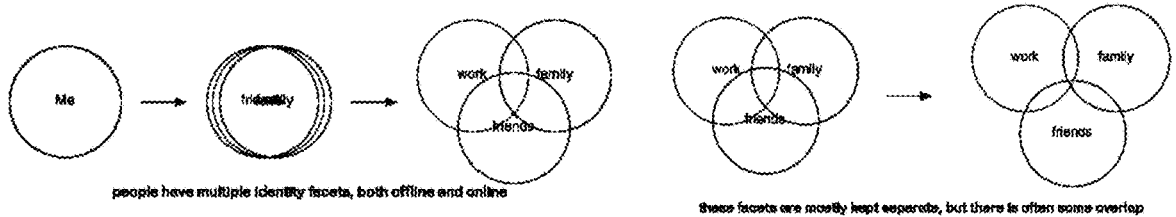
B- The status-quo of online identity systems is to ignore divisions of identity and create linkage around a single entity.
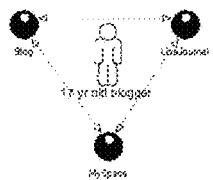
C- This status-quo approach leads to the potential of backtracing from one identity to another, as we can see in these diagrams.
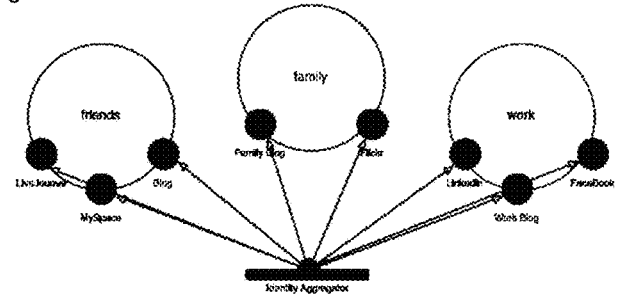
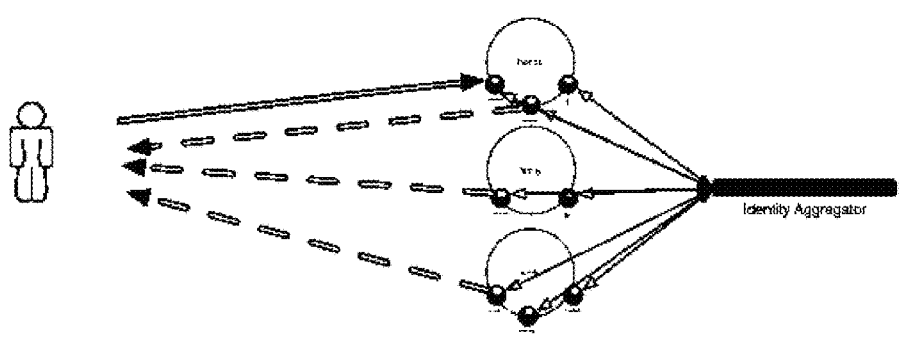

Figure 41
A- Standard Account Relationship Management
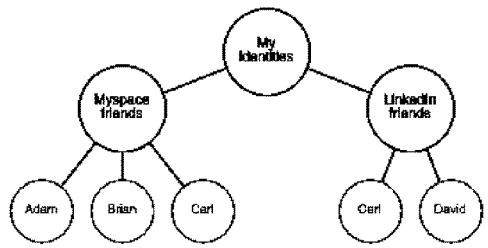
B- "Flattened" Account Relationship Management
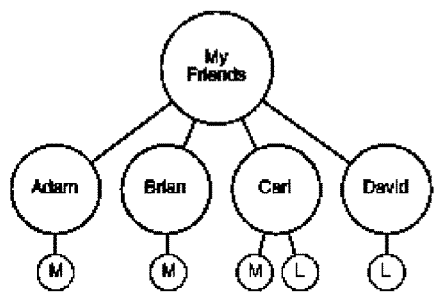
C- Privacy Issues created by "Flattened" Account Relationship Management (41.B)
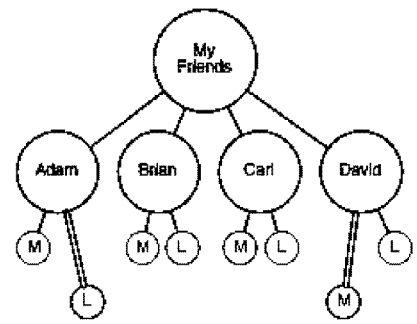
D- The Invention's Solution to Account Relationship Management
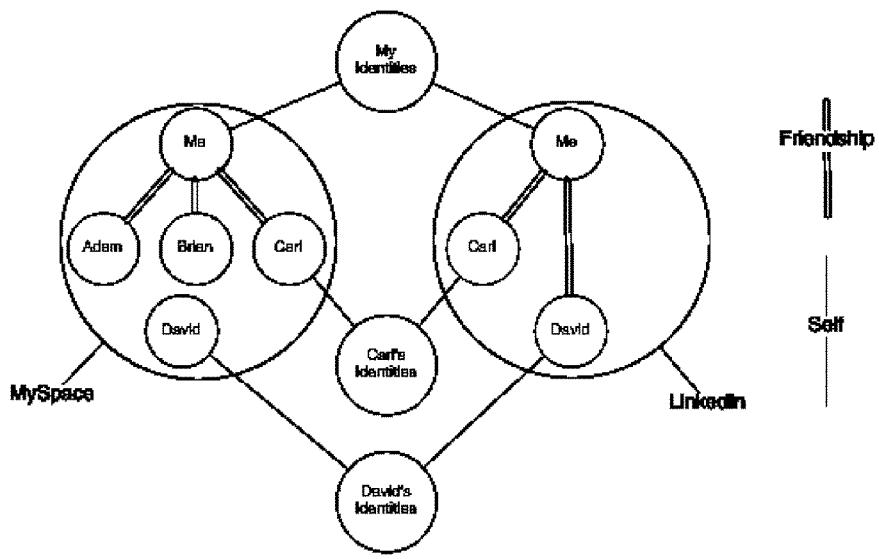

Prism Userbase Profiling & Reporting

Global Statistics

1,346,983 Total Supporter Identities Discovered
42 Networks Measured
1,987 Blogs Measured 546,983 Crollary Meta-Identities Tracked by the System (Definite Unique Support)
1,100,098 Crollary Network Identities (Belonging to Meta-Identities)
82% Indexer Coverage 647,847 FMO Projected Unique Support

Top Networks

*Overview - Top 5 Networks*

1,346,983 Total Supporter Identities Discovered
546,983 Crollary Meta-Identities Tracked by the System (Definite Unique Support)
1,100,098 Crollary Network Identities (Belonging to Meta-Identities)

647,847 FMO Projected Unique Support

*Prism - Myspace*

156,475 Total Supporter Identities Discovered
147,888 Supporters Registered with System
91% Conversion Rate Demographic Overview

Median Age Range 15 - 21 [ more/detailed reporting ]
Gender Distribution 40% M, 40% F, 20% ? [ more/detailed reporting ]
Orientation Distribution 90% Straight, 10% LGB [ more/detailed reporting ]

Top Ethnicities Caucasian, Pacific Islander [ more/detailed reporting ]
Top Religions Protestant, Jewish, Catholic, Buddhist [ more/detailed reporting ]
Smoking Distribution 60% No, 10% Yes, 30%? [ more/detailed reporting ]
Alcohol Distribution 60% No, 10% Yes, 30%? [ more/detailed reporting ]
Education Distribution 60% HS, 30% College [ more/detailed reporting ]
"Is Parent?" Dist. 70% No, 20% Yes [ more/detailed reporting ]

Top Interests Myspace, Music, Football, Movies [ more/detailed reporting ]
Top Music U2, Celine Dion, Fall Out Boy, OutKast [ more/detailed reporting ]
Top Movies Amelie, Brazil [ more/detailed reporting ]
Top Books US Weekly, People Magazine [ more/detailed reporting ]

Top Network Overlap

| Network | Verified % | Projected % |
|---|---|---|
| YouTube | 60 | 80 |
| Bebo | 58 | 70 |
| Twitter | 45 | 61 |
| Friendster | 30 | 48 |
| FaceBook | 15 | 18 |

Figure 47

CAMPAIGN ADMIN CONSOLE — POWERED BY findmeon

Admin Home » Syndication » Supporter eButtons

Supporter eButtons : Newsfeed

Syndication Metrics

Syndication Metrics – 2007.09.13 – Newsfeed Widget – Message Exposure

Viewing metrics for: 2007.09.03 – Secure the House ▼

Key:
- *Users-Registered* Network users registered for tracking.
- *Widgets-Placed* How many pages/profiles the widgets appear on.
- *Message-Total Daily Impressions* Total message served.
- *Message-Unique Daily Impressions* Unique audience.

| Network | Users - Registered | Widgets - Placed | Message - Total Daily Impressions | Message - Unique Daily Impressions |
|---|---|---|---|---|
| Combined | 11,579 | 11,003 | 631,872 | 442,316 |
| Amazon | 400 | 501 | 60 | 20 |
| Bebo | 987 | 987 | 2,771 | 1,555 |
| Bolt | 298 | 277 | 40,862 | 23,871 |
| Digg | 3,123 | 2,876 | 30,787 | 15,875 |
| Facebook | 4,892 | 4,000 | 33,716 | 29,976 |
| Friendster | 299 | 299 | 10 | 10 |
| Gather | 1,072 | 764 | 68,297 | 14,679 |
| iMeem | 743 | 392 | 21,876 | 13,235 |
| LiveJournal | 2,725 | 1,762 | 101,712 | 44,620 |
| MySpace | 4,927 | 3,664 | 212,876 | 73,761 |
| Twitter | 372 | 354 | 2,311 | 1,199 |
| YouTube | 945 | 901 | 45,123 | 1,870 |
| All Others | 1,247 | 582 | 300,498 | 298,999 |

» Detailed View

Figure 49

User Identities Control: Perspective "user@domain.com"

| Identity | Show? | Hide? |
|---|---|---|
| user@domain.com | SHOW | |
| user@domain2.com | SHOW | |
| user@domain3.com | | HIDE |
| user@domain4.com | | HIDE |

A listing of identities entered into The System belonging to a single user, with privacy controls shown from the perspective of user@domain.com Bookmarklet Flow Demographics Reporting on a Set Population

Figure 53

Demographics Reporting to Target a Population

Figure 56 — Creating a verified link between a subscriber account and a 3rd party system cross-network notifications are recommended to use a cryptograpihc signature or a secret key/digest to prove authenticity.

Figure 59 rapidregister•findmeon beta
the cure for multiple web personality disorder

Logged In as Jonathan Vanasco (jon@2xlp.com) « Hc my account | search | locate

My RapidRegister :: Get Key

RapidRegister is a way for you to quickly register new online accounts and tie them to your FindMeOn.com profile.

Requested By RadioRequest
Exit URL http://127.0.0.1:8080/Promotions/EvansBlue-Cold(ButImStillHere)/?a=register

Available RapidRegister Keys

Your available RapidRegister keys are:

| Key name (optional) | Key | Options |
| --- | --- | --- |
| radiorequest | 55fe6d262d463800f0fa3f1d5fe1dc12 | use key |
| demo | 5b3115b8e2293ce5841bb473045fdfaa | use key |

Create A New RapidRegister Key

Name (optional) [          ]  [Create Key]

--- splash | tour | about | about beta | contact | corp | faq | privacy | blog
FindMeOn Services : QuickList | RapidRegister | Open Source
©2006-2007 FindMeOn.com , U.S. Patents Pending

Figure 61

OpenID•findmeon beta
the cure for multiple web personality disorder

You are logged in as jon@2xlp.com  Active OpenID URL: https://127.0.0.1:7086/findmeon/55fe6d262d463800f0fa3f1d5fa1da12 |
Logout | Account | Sites                                                                                                       switch

*Do you wish to confirm your identity URL* 'https://127.0.0.1:7086/findmeon/55fe6d262d463800f0fa3f1d5fa1da12' *with* 'RadioRequest.com' ?

The server has also requested the transfer of profile information. The required and optional fields are listed below. Uncheck the "Send?" checkbox for fields that you don't want to send.

| Send? | Name | Value | Status |
|---|---|---|---|
| | Required Elements | | |
| ☑ | E-mail address | jon@2xlp.com | Required |
| ☑ | Full name | Jonathan Vanasco | Required |
| ☑ | Postal code | 11211 | Required |
| | Optional Elements | | |
| ☑ | Birth date | 1984-05-06 | Optional |
| ☑ | Gender | male | Optional |

The server supplied no data policy URL.

When you click a button below, you will be returned to http://127.0.0.1:8080/Promotions/EvansBlue-Cold(ButImStillHere)/?a=register&rapidregister=return&nonce=0by8EnyB ( Allow Once ) ( Allow Forever ) ( Deny )

tour | about | about beta | contact | faq | privacy | blog
FindMeOn Services | QuickList | RapidRegister | Open Source
© 2006-2007 FindMeOn.com , U.S. Patents Pending

Figure 62 quicklist•findmeon beta
the cure for multiple web personality disorder

Logged In as Jonathan Vanasco (jon@2xlp.com) « Home | Logout my account | search | locate

My QuickList :: Quickly Register an Existing Account with FindMeOn.com

QuickList is a way for you to easily tie an online account to your FindMeOn.com profile.

Another website has provided the basic information needed to create a FindMeOn listing and badge. We will automagically create a new listing for you with the information below.

QuickList Steps

▆▆▆▆▆  ▆▆▆▆▆  ▆▆▆▆▆

Please review this information before clicking 'submit' below.

Wait !

Before you add a new identity , perhaps you just want to confirm an existing identity with another website?

Your Identities

[ Select An Existing Account ▼ ]   ( Use Existing Identity )

error confirming ownership of account

A. Account Information

1. Account / Resource

If you are entering a website (url, blog, social network profile), enter the url here.
For a social network/messenger service this would be your screen name.

That does not look like a valid URL

[                                    ]

2. Account Type

You many only QuickList URLs at this point

[ url ▼ ]

3. Refine the Account Type

[ Select A SubType ▼ ]

4. Account Attributes

Figure 63 api•findmeon beta
the cure for multiple web personality disorder

Hello! Welcome to the FindMeOn.com API

You might want to visit the API registration / management section on FindMeOn.com first.

API Information

FindMeOn.com has opened up many of our syndication functions so that users and networks can create applications and widgets that ˌ

API Terms & Conditions

General Notices

This document and the APIs herein are subject to change at any time.

The API is currently under active development, and is particularly subject to frequent changes.

While API functions are versioned for continuity, API function versions may be removed at any time.

Using the API

You must wait at least one second between queries when using the API. Excessive queries will result in automatic throttling.

Please watch for 503 errors and back-off appropriately. It means that you have been throttled.

Please set your User-Agent to something identifiable. Default identifiers like "Java/1.4.3" or "lwp-perl" etc may be banned from time to The API currently has the following throttling limitations. Please note that you may query the API at least as many times as FindMeOn. Throttling is implemented based on 7 day averages -- so if you're making heavy use one day, and not the next -- don't worry, throttlin experience throttling.

* The API currently has the following throttling limitations for general use ( ie: exploration , having fun, testing, updating your dat
  ○ You may query the API up to 5,000 times a day for non-commercial use
  ○ You may query the API up to 500 times a day for commercial use
* The API currently has the following throttling limitations for use when a query is instantiated at the request of the identity owne
  ○ You may query the API up to 10,000 times a day for non-commercial use
  ○ You may query the API up to 2500 times a day for commercial use
* These numbers are subject to change. We hope to raise them as soon as possible.

Crediting the API

The information you see on FindMeOn.com isn't owned by FindMeOn.com - it belongs to the people who have entered it into the syster crediting terms for accessing the data through FindMeOn.com:

If you use the API to make a widget that you put on your blogs / profiles / etc, you MUST include a link to FindMeOn.com on the widge link directly to the user's page on FindMeOn.com. If you'd rather do the main FindMeOn.com page, you could -- but linking to the user If you use the API to update account information of users who are on both FindMeOn.com and your service:

* You do not have to credit FindMeOn.com with managing information if the request is a "1 time trigger" by your user. IE: If your against FindMeOn.com, you do not have to mention FindMeOn.com at all
* If you run periodic and/or automatic updates against FindMeOn.com , that are not directly triggered by your user, you must cre

Caching Data

Figure 64 api•findmeon beta
the cure for multiple web personality disorder

API Documentation

General Info

Unless otherwise stated:

- All API functions return a JSON object with a 'result' field that is either 'success' or 'error'
- Responses of the type {'result':'error'} will contain an element called 'errors' that is an array of error codes examples:

```
{"result":"error","errors":["API Key ( 2api_key=ts ) is required"]}
{"result":"success","open_sn_profile":{"basic":{"birthdate_day":"6","zodiac":"Capricorn","age":"89","birthdate_month":"5","birthdate_year":"1903","gender":"male"},"habits":{}}}
{"result":"success","shouts":[{"shout_text":"hello world! (redux)","timestamp":"09/25/2006 17:18"},{"shout_text":"hello world!","timestamp":"09/10/2006 13:09"}]}
{"result":"success","findmeons":[]}
{"result":"success","findmeons":[{"resource":"FindMeOn.com","name":"findmeon","id":"aaaaaaaaabbbbbbbbcccccccccddd"}]}
{"result":"error","errors":["Server Maintenance"]}
```

The Functions

- Is ID Cookied?
- List ID Identities
- List ID recent global newsfeed items
- List ID Profile
- List ID recent FindMeOn.com shout items
- List ID Contacts API Home ©2006-2007 FindMeOn.com

UTILIZING CROSS-NETWORK IDENTITY DATA FOR CUSTOMIZED CONTENT

RELATED APPLICATIONS

This application is a division of and claims priority to "U.S. patent application Ser. No. 12/011,869" entitled "System and Method for Indexing, Correlating, Managing and Syndicating Identities and Relationships Across Systems" filed Jan. 30 2008 and naming Jonathan Vanasco as inventor, the contents and disclosure of which is expressly incorporated herein by reference in it's entirety; said priority filing claims the benefit under 35 U.S.C. § 119(e) of "U.S. Provisional Patent Application No. 60/887,253" entitled "System and Method for Indexing, Correlating, Managing and Syndicating Identities and Relationships Across Systems" filed Jan. 30 2007 naming Jonathan Vanasco as inventor, and U.S. Provisional Patent Application No. 60/954,568 entitled "System & Method of Claiming & Verifying Identities of People and/or Entities" filed Aug. 7 2007, also naming Jonathan Vanasco as inventor—the contents and disclosures of which being herein incorporated by reference in their entirety.

This application herein incorporates by reference in their entirety, the contents and disclosures of "U.S. Patent Application Publication 2010/0274815", published Oct. 28 2010 entitled "System and Method for Indexing, Correlating, Managing and Syndicating Identities and Relationships Across Systems".

BACKGROUND OF THE INVENTION

Field of the Invention

The disclosed methods and systems relate generally to machine readable or interpretable social networks, and more particularly to indexing members of one or more of these networks across their associations and optionally customizing content based on such.

Description of Related Art

Two often-cited patents in regards to social networking are the "Six Degrees Patent", U.S. Pat. No. 6,175,831 to Weinreich et al., and the "Friendster™ Patent", U.S. Pat. No. 7,069,308 to Abrams,—both of which hinge on the construction of a database of users where relationships between any two users are described and navigated.

While useful, both patents suffer from the following limitations, to which their claims and design are specifically tied:
  i. Both inventions address social networking within a self-enclosed system of members/subscribers—that is the Inter-Personal relationships between identities are only defined as relationships between subscriber-users of a single system, requiring all individuals involve to subscribe to the service in order to be included in any chained relationship of identities.
  ii. Both inventions intrinsically tie the defined relationship between any two identities as a direct relationship between the subscribed user account/user account identifier.
  iii. Both inventions closely resemble the PGP 'web of trust' system that was publicly released in September 1992, in that a user is tied to a single id/key as an Intra-Personal relationship, and that single key/id is tied to other users as Inter-Personal relationships.

SUMMARY OF THE INVENTION

Instead of correlating the relationships between identities directly to a user-subscriber's account or ID in an enclosed system, the system I have devised tracks relationships across contextualized 'social network' and 'online' identities, and then correlates the shared Intra-Personal identities across networks to one another—creating a complex web of Inter-Personal relationships.

The considerable differences between the systems are then:
  i. The system of my invention stores Inter-Personal relationships as relationships related to a standardized abstract identity, not directly related to a user. These network & protocol specific standardized identities are considered to be "Spatialized Personas", as they are identities/personas that correlate to a specific spatial location on a map of global identities.
  ii. The system of my invention tracks Inter-Personal relationships through chaining Inter-Personal and Intra-Personal relationships.

Note: "The System" henceforth refers to an implementation of this invention.

It is through the abstraction of identities from users into spatialized personas that my invention is able to track and index both:
  i. identities that are not directly registered to The System through a subscriber of The System
  ii. identities that belong not necessarily to 'individuals/users' but to personas that are correlated to non-human entities (i.e. an identity that belongs to an entity such and an organization, promotions campaign, a rock group, an animal, an artificial intelligence).

The System standardizes identities into a spatialized standard, where an identity resource (e.g. an email address, account name, URL, real name, screen name, social profile id, online service id, etc) is translated into a network/service provider, and service-specific identifier. If a network/service provider provides more than one service, either:
  i. the additional services are treated as independent network/services
  ii. the additional services are treated as independent network/services referencing the first network/service
  iii. the spatialized identity includes data concerning the service type.

This standardizing of identities is analogous to standard email addresses: i.e. the email address user@email.com is composed of the local-part "user" and the domain "email.com", wherein "email.com" is the service/network provider, and "user" is the service-specific identifier Representing human relationships online is a core element of 'Social Networking' and the modern Internet. Much effort has been focused on describing and quantifying account or identity relationships within online systems.

As remarkable as recent efforts and accomplishments have been, the advancements have been focused-on and limited-to Intra-System relationships—identities and relationships within a given system, network or database.

As such, these computerized relationships are only of tangible benefit when they are accessed by a user-subscriber of the same network they are defined in—requiring individuals to subscribe to each given system in order to relate their personal identity and existing relationships to users of the new system.

Little work has been focused on Inter-System relationships—correlating online identities and their associated relationships across Internet services and networks—which is the core concept of this invention.

The system I have devised is one used to correlate identities within one social network to identities on separate social networks—treating each representation of a given identity on a single social network as a shared identity (or facet) of a master-identity/Über-Identity.

By "Social Network" I refer to a system which tracks, or allows users to define, Inter-Personal relationships. This could be in the form of a "Social Networking Website", a service/application that supports user-identity, an internet chat messaging system such as "AOL Instant Messenger™" and even an address-book for email or physical-world contact information.

By aggregating shared identities, The System can provide useful meta-data to users of The System, such as cross-network "degrees of separation" between online profiles: two users of a given social network can learn that they share a connection across networks through a common friend on a different social network, or a chained network of Inter-Personal relationships across networks. The System's utility, however, is not limited to social networks per se; by cross referencing social network identities with blogs, email addresses, and other online accounts it can also show readers of an article their actual connection to the author of a blog, offer suggestive content or advertising keywords based on aggregate user identity information, or display trends amongst an extended network of inter-related personalities.

The System considers two types of relationships between identities: Intra-Related identities (same-as identities; relationship-to-self; where different identities are facets of a master-identity or an Über-Identity) and Inter-Related Identities (contact-of identities; relationship-to-other; where different identities belong to different individuals who claim a relationship to an 'other' and possibly categorize that relationship as something other than 'self').

Thus far, attempts at identity matching and searching have been limited to using similar profile names or real names. By looking at an aggregate of profile data and meta-data (similar names, similar screen names, similar interests, similar personal profiles similar friends, similar other claimed identities, similar associations) one can expand the likelihood of matching a real identity across multiple online profiles. This is especially important given the following real world conditions: persons often use common names and personal names to mark their identities (i.e. Jonathan Doe might be 'Jonathan Doe' on one website, and 'Jon Doe' on another. Similar situations arise with Brad/Bradley/Bradford, Jennifer/Jenny, Elizabeth/Liz/Lizzie, etc), the availability of online names on a given network may limit options for people wanting to use the same or similar handle/screen name/assumed name from one system on another or when the user themselves wishes to abstract their identity into a more complicated name.

For example:
http://2xlp.com/users/jdoe wants to procure the identity http://findmeon.com/users/jdoe
http://findmeon.com/users/jdoe is already used, reserved, or otherwise unavailable
the user must instead procure http://findmeon.com/users/jdoe47 or http://findmeon.com/users/j_doe The System accomplishes identity aggregation using a variety of means. First, verifiable correlations between any two identities can be provided by an opt-in system where identities are explicitly linked to one another within The System itself. The System allows individuals to claim one or more identities directly through The System, and further offers individuals the opportunity to complete a challenge proving ownership of the identities. The System also supports reading and parsing published content to derive 'same as' claims (i e reading a blog and looking for text or standardized links suggested that another webpage or account belongs to the same owner of that webpage/account). When a definitive match between two identities is not available, The System can use information gleaned from Internet profiles and identity meta-data (interests, personal information, claimed 'same as' relationships to other online identities, claimed 'acquaintance of' relationships to other online identities) to calculate the probability of two identities being facets of the same Über-Identity. Verified inter-system shared identities are also used as waypoints in calculating relationships, and help create statistical models discerning the kind, quality and patterns of information sharing typical to users of any two online networks or services.

While current advertising and suggestive content systems use 'clickstream' analytics and page-contextualized-content to derive keywords for customizing content, The System of this invention allows for information gleaned from public-facing descriptions of an identity—including their personal profile/interests, associations to same-as and friend-of relational identities (friends, family, colleagues, etc), and known memberships to online/professional/hobby groups to create an aggregate profile of information likely to interest. Page-contextualized information is also hindered by its scope—users tend to tailor their information, activity and personality to each online network they utilize—much like a person alters their conversation and demeanor when talking to friends, colleagues or family members. By aggregating information pertaining to a single user from each of their facets, a richer, more detailed and more complete user profile can be gleaned. This aggregated profile information, which includes user-provided descriptions and online associations, incorporated from multiple networks can be amplified by similarly gathered information from a network of identities with relationships to the user (across any of their identity facets) to further discern items of potential interest to that user and their greater network of friends/family/colleagues.

Furthermore, the invention provides a means for registered users to edit, manage, and syndicate their online identity information across the Internet.

BRIEF DESCRIPTION OF THE DRAWINGS

FIG. 9 illustrates the partner identification subsystem.

FIG. 10 illustrates the cookie identification subsystem.

FIG. 11 illustrates the cookie identification subsystem.

FIG. 17 illustrates the rapid registration subsystem.

FIG. 18 illustrates the quick listing subsystem.

FIG. 19 illustrates the connection search mechanism.

FIG. 20 illustrates the contact expansion mechanism.

FIG. 21 illustrates Quick Listing & Rapid Registration SubSystems Logging & Security—how data passes between Subscribers, Third Parties and The System—enabling verification and logging of activity.

FIG. 23 is a screenshot illustrating setting profile element permissions in an embodiment of the invention.

FIG. 24 is a screenshot illustrating a user identity control page, including functionality to show/hide the identity from other identities, in an embodiment of the invention.

FIG. 25 is a screenshot illustrating a view within The System of a user identity, in an embodiment of the invention.

FIG. 26 is a screenshot illustrating a view within The System of a user identity, in an embodiment of the invention. This is a close-up illustrating other identities that are visible to the currently viewed identity.

FIG. 27 is a screenshot illustrating a view within The System of a user profile information, in an embodiment of the invention.

FIG. 28 illustrates exemplary widgets from an embodiment of the invention. Widgets communicate with The System to fetch and display current information; the smaller widget shows only syndicated identities and allows visitors to visit those resources; the medium and larger widgets handles syndicated news, identity links and shows a connection between the viewer of the identity resource and the resource.

FIG. 35 illustrates how aggregated identities complete & amplify profiles

FIG. 36 illustrates how The System can cull information from multiple websites to create custom content.

FIG. 38 illustrates an application of aggregated data usage.

FIG. 39 illustrates the innovations of The System in protecting end-user identity.

FIG. 40 illustrates the innovations of The System in protecting end-user identity.

FIG. 41 illustrates the innovations of The System in tracking Inter-Personal connections across networks.

FIG. 42 is a screenshot of the groups functionality. This Flash™/JavaScript/Image widget functionality displays content, memberships, & location info for users/identities associated with a group across websites.

FIG. 43 is a screenshot of the groups functionality. This Website/API functionality displays content, memberships, & location info for users/identities associated with a group across websites.

FIG. 45 is a screenshot of user targeting. This functionality allows for a user to create filters and 'drill down' to populations matching exact demographic criteria. The criteria is culled from cross-site data.

FIG. 46 is a screenshot of demographic profiling. This functionality allows for the display and breakdown of demographic patterns based on cross-site information.

FIG. 47 is a screenshot of syndication metrics. This functionality uses cross-site data to show how media (widgets, advertisements, etc) is consumed by a cross-network base. The image shows per-network and multi-network activity.

FIG. 49 illustrates user identities entered into The System, with privacy control settings shown from the perspective of one of the identities.

FIG. 59 is a screenshot of the Rapid Registration subsystem.

FIG. 61 is a screenshot of the OpenID system allowing information to be pushed to a partner website.

FIG. 62 is a screenshot of the Quick Listing subsystem.

FIG. 63-64 are screenshots of the API subsystem.

DETAILED DESCRIPTION OF THE INVENTION

Figure 1:
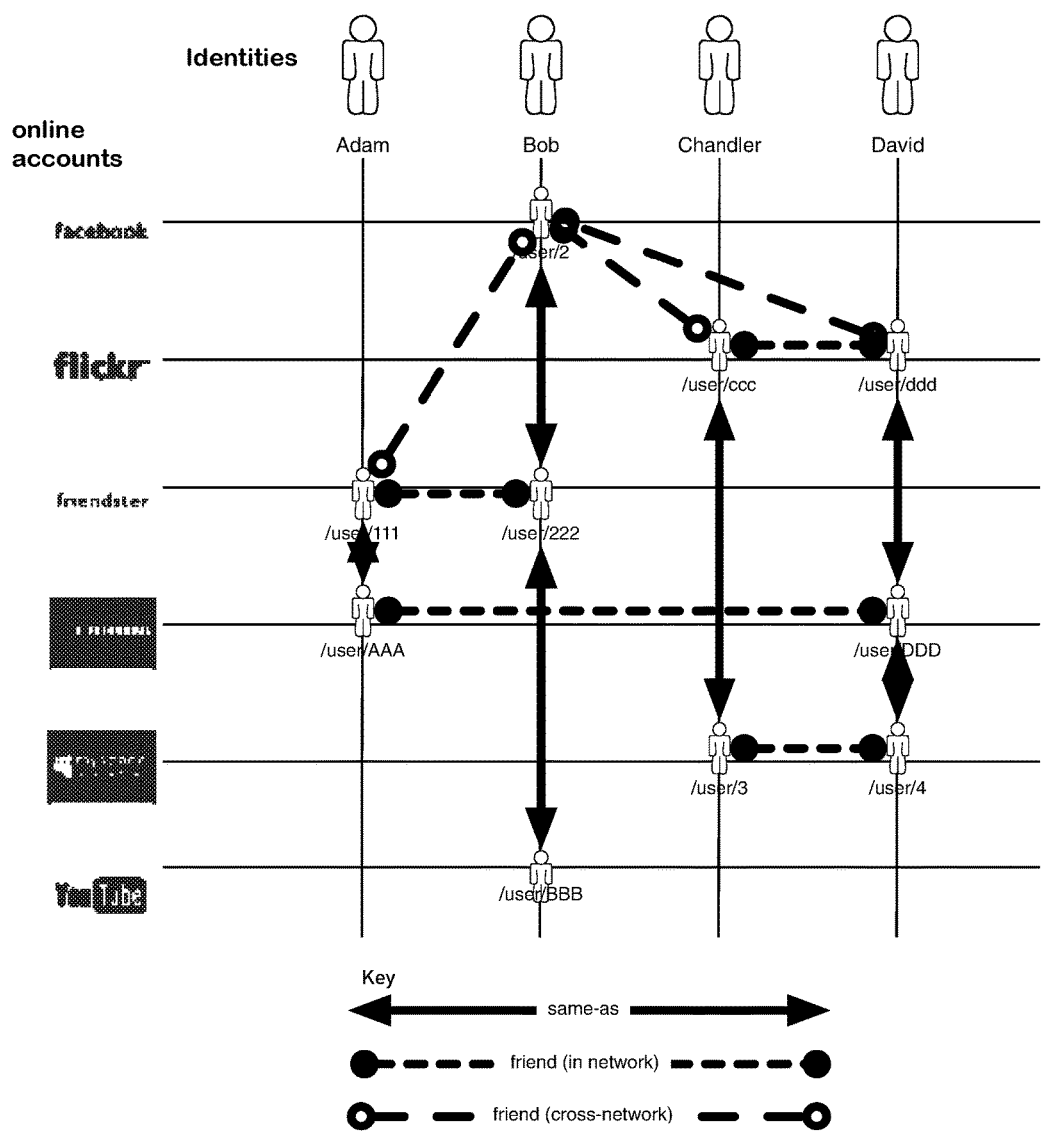
FIG. 1 shows a matrix of Identity & Relationship tracking across networks.

Description of the invention will now be given with reference to FIGS. 1-64. It should be understood that these figures are exemplary in nature and in no way serve to limit the scope of the invention, which is defined by the claims appearing hereinbelow.

Section A: Identity Tracking Format

Inter-Personal relationships between two identities are not described in terms of relationships between internal user accounts/user ids, but in terms of a contextualized identities on specific systems.

The context of the relationship is recorded and utilized intact—in its native form (i.e. the relationship type and the context of identities involved).

For example, if The System is running on 'Social Network A', then the following is true:
1. A friendship between Adam and Brian on Social Network A is recorded as ["Adam on System A" "is friends with" "Brian on System A"] (current systems & inventions specify ["On System A: Adam is friends with Brian"]).
2. Similarly, if a friendship between Chris and David on Social Network B is discovered, it is recorded as ["Chris on System B" "is friends with" "David on System B"].
3. Because systems can provide multiple services, http://findmeon.com/users/jdoe is a separate identity from jdoe@findmeon.com; if these two services belong to the same end-user, they can be associated with one another with an Intra-Personal link: ["http://findmeon.com/users/jdoe" "is the same as" "jdoe@findmeon.com"].

The System records the information into a database in this format as it is designed for the recording and indexing of non-native friendships.

Because The System encodes relationships in this manner, it is then able to create the relationship ["Evan on System D" "is friends with" "Fred on System E"].

To Note: the relationship is tokenized into components that are at the least ["Source Identity" "Relationship Type" "Target Identity"], and may additionally include meta-data relating to the discovery of the relationship and the environment the relationship was discovered in (i.e. when was the relationship discovered, how was it discovered, why was it discovered, if it was on a web page including the URL+a full/partial cache of the contents). Additionally: some service providers and networks offer multiple facets to a single account/identity. For example: "http://findmeon.com/users/1001" and "http://findmeon.com/users/john.doe" may both reflect the same identity, as this example system generates a numeric id and allows for a user-chosen alphabetical customization. In this scenario, both identities are treated as separate resources by The System. However, using rules for known networks, The System attempts to consolidate identities such as these by noting that they reference one another if applicable. The System may additionally be configured to limit search/matching results that include a plurality of these multi-faceted identities to a single representative of the plurality OR to use an aggregate of information derived from the plurality as a singular identity.

In some instances, a service provider may offer several unique contact methods for a given identity. For example:
 http://findmeon.com/users/1001
 http://findmeon.com/user.php?id=1001
 1001@users.findmeon.com
 http://findmeon.com/viewmore.php?type=user&id=1001

In this example, the system-specific identifier is 1001 across all contact methods. If The System knows of rules/patterns that external systems use like this, it can simply store the identity as "User 1000 of FindMeOn.com", and then generate the known aliases/additional contact methods as needed Inter-Personal relationships are entered/defined/discovered in a variety of ways:
 i) Relationships are directly entered into The System by a user, and recorded in a datastore as ["USER on THE SYSTEM" "is friends with" "TARGET"].
 ii) Relationships are imported by users of The System from other networks, using methods such as:
  a) An API on the external system that allows for exporting of relationships and associated meta-data.
  b) The System accesses the relevant information on the external network and parses it, either through a public access method or accessing the external system as the User on their behalf, deriving the source, target and relationship type.
  c) A helper application/tool in a web browser allows the User to visit the external system, and then parses the relevant information and sends it to The System deriving the source, target and relationship type.
 iii) Relationships are read from external systems using their public facing published internet documents or APIs deriving the source, target and relationship type.
 iv) Some systems or standards allow for Inter-Personal relationships to be claimed cross-system in an open format, claiming a source, target and relationship type; e.g. a blog or internet document may allow a user to say "Person X on Network Y is my friend".

Inter-Personal relationships are not just described in terms of mere existence, but are qualitatively defined: i.e. The term 'Relationship(s)' is used in place of any member of a group of descriptive relationship types: friend, acquaintance, parent, business associate, etc.

A relationship may be:
 1 way (A is friends with B)
 bi-directional (A is friends with B; B is friends with A)
 reflexive (A is B's parent; B is A's child)
 1 way+refuted (A is friends with B; B is not friends with A)

Section B: Discovery and Matching of Identities

Relationships between different facets of an online identity are then recorded in a database. Relationships between a user on The System and a contextualized online identity are also recorded when possible, e.g. ["Adam on System A" "IS" "Adam on System B"].

In order to correlate shared identities to one another, a number of methods are used.

Also, to note—not just the existence of a correlation between two identities is recorded, but a qualitative description of that correlation, i.e.:
 verified and how
 claimed
 suggested—and why The following terms apply universally throughout this document:

The aggregate collection of identities that are facets of a single entity are known as a "Meta-Identity".

The aggregate collection of profile information & activity data belonging to identities that are facets of a single entity are known as a "Meta-Profile".

The singular entity that is represented by a collection of identities is known as an "Über-Identity", "Root-Identity", or "Master Identity".

Section B.I: Discovery and Matching of Identities: Users of The System i. A User of The System may claim another online identity as a facet of their own larger identity (Über-Identity). If that is the case, then The System creates a database entry associating The User with the given online identity, and then marking the verifiability of that relationship as "claimed".

ii. A User of The System may then verify that the other online identity is indeed a facet of themselves by completing a challenge, where "a challenge" is defined as a task which only the owner of the claimed online identity can perform. The challenge need not be issued by The System, as The System may recognize a challenge issued by another party. Challenges Include (but are not limited to):

a—The user of The System may use an open standard such as Findmeon™ node standard or OpenID to prove ownership of the claimed identity.

b—The user of The System may place a digital signature on the claimed identity that can be verified with a public key that is tied to their greater identity (Meta-Identity or Über-Identity).

c—The user of The System may place a specified piece of text or image onto media managed by the claimed identity, or send an electronic message (instant message, email) from that identity to The System—thereby proving that they are in control of that identity.

d—The System may accept a challenge+verification scheme provided by another system. For example, the Technorati service allows for their registered users to claim a blog by placing a unique piece of code on their website—the system of my invention can respect such a link like that between the Technorati user and the blog they verified.

Challenges may be rated concerning their strength and spoofability (ability to be faked/compromised), and that rating may then be taken into consideration. In a current implementation, The System considers a "digital signature with a shared private key via the Findmeon™ standard" to be 100% strong. The System also considers the "MicroID format" to be 10% strong due to inherent limitations in its design, and a 20% strength in "link between a user of the Technorati service and their correlating blog" as that implementation of a verification scheme is comprised of a public facing verification process with no secret component.

Section B.II: Discovery and Matching of Identities: Non-Users of the System

Unknown Identities can be discovered by The System through a variety of means.

Inter-Personal and Intra-Personal Discovery.

A given identity has an Inter-Personal relationship with an identity belonging to a user of The System, and is entered as a claimed relationship.

An identity belonging to a claimed relationship known to The System is indexed and/or analyzed; any Inter-Personal/Intra-Personal identities discovered through this identity are then indexed and/or analyzed. This learning/analysis comes from information gleaned through API/System queries, manual input, or parsing publicly available web pages.

The System routinely performs online spidering of the internet, much like a content search engine, looking for identities to index.

Inter-Personal Discovery

1—The System records two identities as having a relationship to one another if one account publicly claims the other as another representation of itself.

EXAMPLES i. The XFN attribute 'rel="me"'.

ii. The System parses a document or queries an API or System to derive a listing of links/identities that are claimed as other representations of the user's self, or a known protocol claiming other identities as representations of itself (e.g. foaf, Findmeon™).

Notes:

a. if the relationship is 1-directional, it is noted as such (i.e. claimed)

b. if the relationship is bi-directional, it is noted as such (i.e. verified as the second identity claims the first identity as a facet of itself)

c. if the relationship is proven by digital signatures (e.g. the open standard specifications such as Findmeon™ or XML-DSIG) it is noted as such (i.e. digitally signed and verified)

d. The System searches for 3rd party challenges and verifications, with an optional strength rating (which can be configured) that is identical in functionality to the Challenge section described above for users of The System.

2—The System also correlates unregistered identities to one another using semantic/textual analysis, and analysis of profile meta-data and relations.

The System ranks the probability of two identities as being facets of an Über-Identity or one-another based on the following criteria:

i. Shared digital signature key parings
ii. Similar given-names/nick-names/handles/screen-names
iii Similar profiles
  (i) Profile data
  (ii) Descriptive information
  (iii) Interests, 'about me', artists, etc
iv. Occurrence of tokenized words & strings The identity meta-data is broken down into tokens based on individual words or groupings of words (strings), and the frequency of tokens is then compared. Both the similarity and difference of the tokens are used in comparison.

v. Occurrence of spatialized Inter-Personal and Intra-Personal identities

Two identities that claim similar 'same-as' accounts or friendships/associations to similar 'others' are more likely to be facet of the same Über-Identity.

vi. Occurrence of strings of words

The identity meta-data is broken down into sentences and phrases, then compared for overlap. The odds of 2 people using the exact same chain of words decreases drastically with every additional word added to the chain. Common sequences of words are checked against a database of quotations (pop-culture/movie/television/song/literary references); as longer sequences of words become more common, their likelihood of being a quotation or otherwise non-unique increases.

vii. Similar photos

Simple digital fingerprints (e.g. md5 or sha1 hash digests of files) are not useful as social network and blogging software typically resizes and alters photographs. Instead, a plug-in architecture for fingerprints provided by photo recognition/sampling technology is supported. Much like quotations, popular images can be repeatedly used by non-associated identities. The System ranks the uniqueness of photos and potential quotations on a bell curve—as items become too-common, their utility as a unique identifier is lessened.

viii. Similar associations

The identity claims similar relations to organizations or services as other identities. For example several identities all claim: to be members of a football club; to have accounts on a given social network, to volunteer with a given non-profit.

ix. Similar relationships to online identities

The identities or "claimed relationships with" are "claimed to be relationed to" similar proven/recognized identities with The System.

The identities or "claimed relationships with" are "claimed to be relationed to" similar identities (e.g. both are friends with people by the names of "Adam, Brian, Chris" within each network, and "Adam, Brian, Chris" on each network share similar traits).

The System calculates a weighted point value for a relationship utilizing the scoring/matching techniques specified above, and calculates a percentage of likelihood that any two identities belong to the same Über-Identity. The relationship is then marked as "suggested" along with the point value and the reasoning.

Furthermore, utilizing a database of verified and highly-probably inter-network identities, The System can create rules and reports that both:

i. Adjust the weight of the matching techniques above;

ii. Note trends of shared identities on multiple networks (i.e. users of Network A often use Network B and rarely use Network C; users of both Network A & B & D use Network D less often than Network A or B; 20% of users of both Network A & B use the same screen-name on both networks; 80% of users of both Network A & B use identical text as their "About Me" blurb);

iii. Look for adherence to trends between any 2 given networks by utilizing aggregate trends of validated inter-network identities.

Effectively, The System creates and utilizes rules concerning how an identity of one internet service is likely to portray itself on another internet service, by trends common to users known to be on both sites. For example:

There exists: a dating service CampusCupid™; a music service RoadSound™; an online service FindMeOn™.

By examining both verified & highly probably inter-network identities that are shared between any two of these services, The System notes the trends common to users of each system on another network. For instance, information entered as "general interests" on the dating site may typically correlate to information entered as "favorite bands" on the music site, or that users do not typically use the same handle on the music site and the identity site, or that users do not typically share their given name on the dating site but they do fill out that field on the identity site and music site. The System would then not consider a difference in "general interests" between an identity on dating and music sites to be as detrimental as it may otherwise be, and additionally looks for a similarity between "general interests" and "favorite bands".

Section B.III: Discovery and Matching of Identities: Storing and Utilizing Data

At the heart of the The System is a database that stores and relates identities. When identities are analyzed by The System upon discovery or update, the following happens:

The identity is spatialized/standardized into one of several common formats: URL, an email address, a common name+network name combination, or a standardized representation of a human name.

The System notes the time of the discovery/update. The System may also note other meta-data, such as the reason for the action.

The System may store a copy of the original version of this information as a cached version for future reference or other use. This cached version may be linked to the date-time and other meta-data of the action.

The System may attempt to access and parse public or otherwise readable information about the identity, such as profile information and meta-data, organizational or service associations, and lists of Inter-Personal and Intra-Personal identity relations, and proceed with the techniques listed above in Indexing Sections "B.I." & "B.II.".

The System may tokenize and analyze this information, storing it in the database as a machine readable format or a collection of formats.

The System may compare the identity to other identities, looking for potential same-as matches, incorporating rules developed by inter-site trend analysis. The System may then cache this ranking in the database as a hint for future searches. By creating a hint of similar profiles, The System can optionally perform more complex searches on a smaller data set than all identities.

The System may parse same-as and other relationships to the identity. This is done by:
requesting links in a machine readable format,
searching for links within documents,
looking for semantic clues,
looking for standardized relation codes
matching links or text to expected templates particular to the type or network of the identity.

When same-as or other relationed identities are found:
They may be stored in the database along with the type of relation and optionally meta-data concerning the action and relationships.
The relation type may be discerned either by:
standardized text within the relation listing/link,
expected relation type for a type,
network of identity, system default.
The System may then queue these discovered identities for their own indexing via discovery/updating analysis.

Section B.IV: Discovery and Matching of Identities: Methods of Import & Discovery—Detailed The System currently allows subscribers to import contacts in the following manners:

i) list a network-specific relation-to identity through an interface on The System; e.g. "["User A of The System" "is friends with" "http://myspace.com/users/2xlp"]"

ii) interpret public-facing "contact lists" & FOAF/XFN documents on social networks & web sites;

iii) utilize external-network APIs to query for contacts;

iv) prompt users for a login/password to an external network, then logs in as that user and parse web-pages or API calls into a list of network-specific contacts;
v) Use a user-mediated contact import:
  a) The System assembles content by either:
    i) Users request The System to pull content from a network/website/document on their behalf;
    ii) Users utilize a JavaScript bookmarklet to scrape information from one or more screens or query an API, and then provide that information to The System.
  b) The System presents the user with assembled information, offering them the opportunity to Edit/Augment/Discard information before submitting it to The System themselves.
  c) The System stores the information.

As contacts are imported, they are recorded into a spatialized network-oriented format ["123 on RoadSound.com" "is a contact of" "123 on RoadSound.com" ]. By using this format, and not collapsing relations or content into the Über-Identity, The System is able to preserve privacy and isolation through per-identity and per-attribute controls. This method prevents the compromise/exploitation of user identities by preventing conflation of contacts or publishing a singular end-point for identity resolution (which can be used to back-trace from any one identity to another).

When Identities are related to one another or to profile-specific data, The System employs the following technique:
  i) The System relates same-as identity facets to one another (assembling the Meta-Identity)
  ii) The System relates relation-to identity facets to a specific identity
  iii) The System relates profile data to a specific identity Section B.V.: Discovery and Matching of Identities: Group Relations Social Network/Application user relations have so far been described in terms of Inter-Personal relations (relation to a person of entity) and Intra-Personal (relation to self across networks). A particularly odd situation arises when addressing users and their membership to groups: entities that exhibit qualities of both individuals and networks. Groups can often be described as micro or virtual social networks—while they are "Social Networks" in the aspect of interactivity, they are often not formalized onto a single machine or computer for tracking and indexing. Groups are often challenging to discuss, because they exist in many different forms: They can be a collection of users on a single social network/application, or a collection of users scattered across many social networks/applications. Groups can be: a collection of people banding together under a single name or one-or-more interests; an official sanctioned group of people ("Politician X Official Supporters" or "Non-Profit Y Members") or any other collection of people and entities that represent themselves with identity.

The System utilizes several innovations for handling "Groups".
1. User features implemented for Groups
  a. The System allows Groups to function very much like users: a group may sign up for an account with The System, link multiple network/application specific group accounts/homesteads together, and syndicate information across these accounts.
  b. The System tracks, indexes, and analyzes group membership for users in the same ways it treats a user-network relation.
  C. The System allows users to control privacy settings (per-attribute & roles) on a per-group basis just as it allows for these settings to be used in Network scenarios.
2. Network features implemented for Groups
  a. The System indexes groups and allows for reporting, demographics, and content customization as if they were networks.
  b. The System allows for management & queries/API access of groups as if they were a network, making them a pseudo-network.

Figure 42:
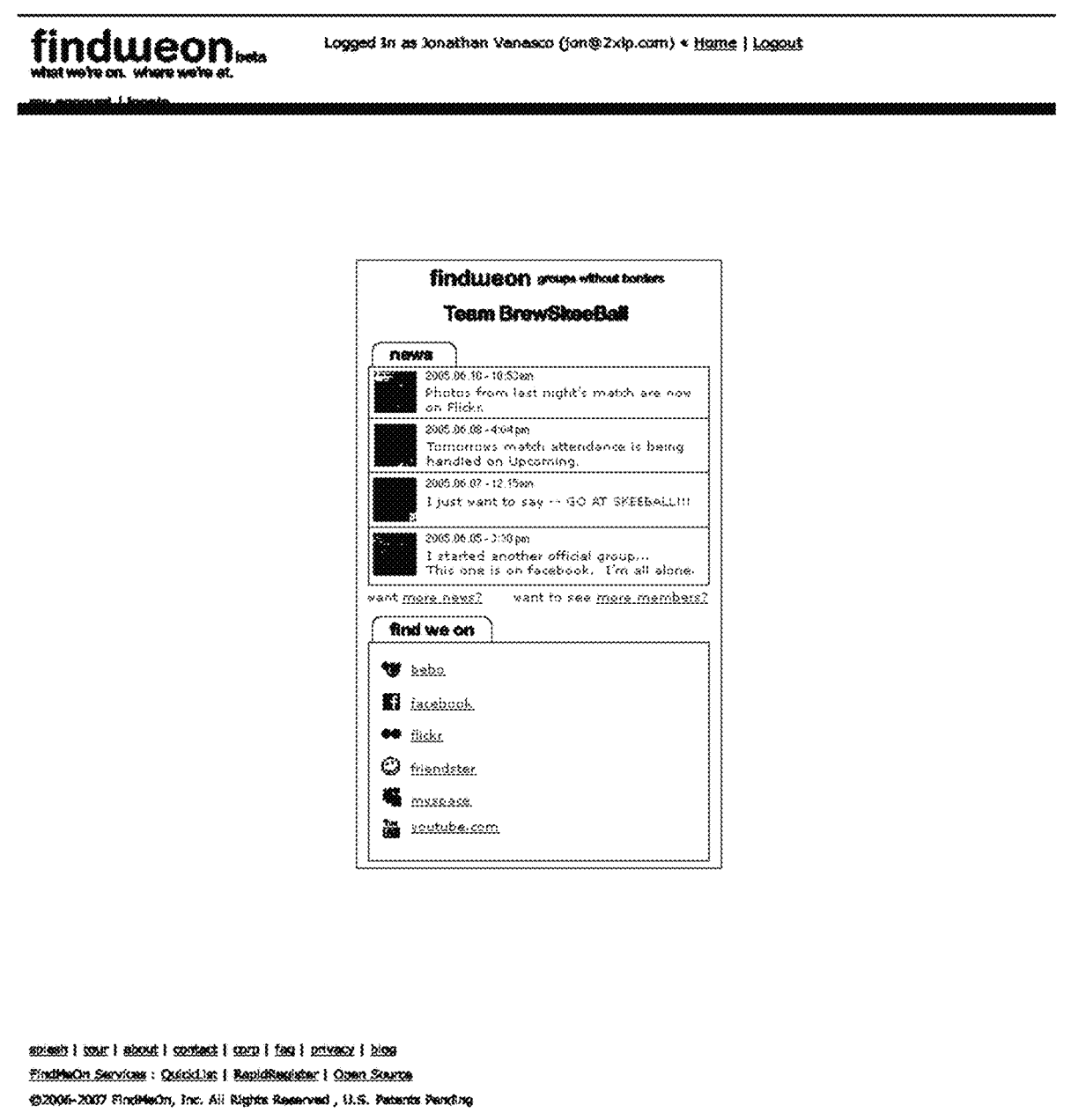

In FIG. 42, we see a Group view with a widget. The widget behaves much like a user widget, it syndicates content across networks (but content from Group Members), and it syndicates the group's identities/homesteads that are scattered across online networks. In this implementation of The System and a Group widget, a group administrator—one who lists the group with The System for syndication concerns can set controls over who is allowed to post content onto the widget or have network activity tracked/culled for widget distribution. Groups need not be registered with The System for discovery, indexing, tracking—only for syndication privilege control.

Figure 43:
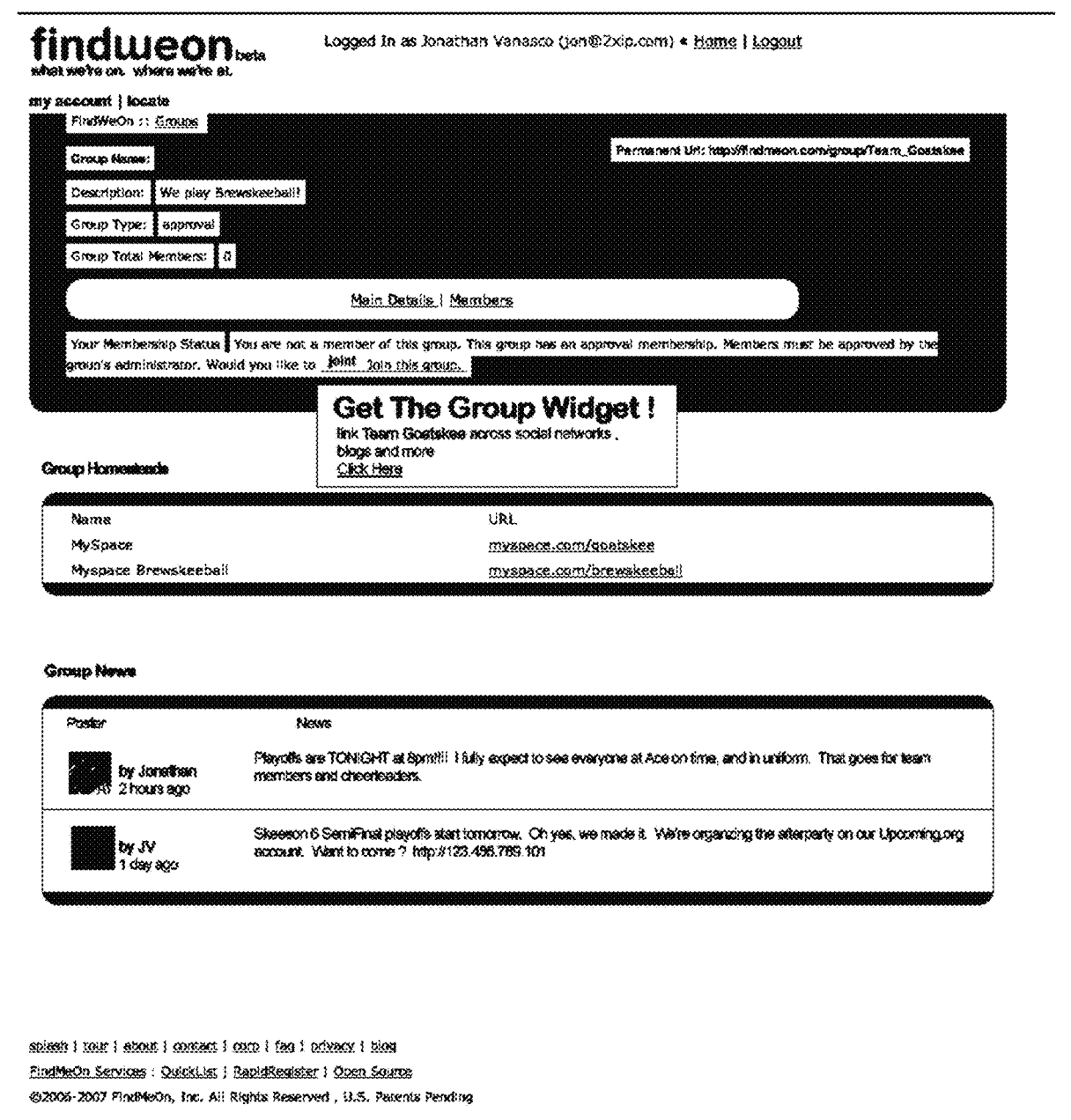

In FIG. 43, we see a Group information page. This page lists group details (such as name, description, online homesteads), and provides some news from group members.

Figure 44:
FIG. 44 is a screenshot of the groups functionality. This Website/API functionality displays the membership (users/identities) of identities associated with a group across websites.

In FIG. 44, we see a Group Members browsing page. This page lists a selection of group members, along with their photo and some social networks they belong to. This information can be culled from Meta-Profiles/indexing or explicitly opted-in by the user. The System allows users to show/hide their associations to the group, and affords per-attribute information privacy settings.

Section C: Relation Chain Searching and Identity Searching

Identities & Relationships are correlated to one another as Contextualized Relationships, and identities which are to be searched/traversed by The System. In other words, relationships are not recorded as between "users" of The System, but as between "abstracted online identities/accounts" which are then related to one another. When a match involves a user-subscriber of The System, the match does not involve their account directly, but a contextualized representation of their account on The System which is then associated to their account as an Intra-Persona identity or "account asset".

The System then traverses the association of users of The System to account assets, and account assets to Inter-Personal relationships, looking for relationship paths—thereby navigating online identity associations across networks and providing a detailed relationship path. By default, The System tries to find the shortest path between identities giving preference to verified Intra-Personal identities and bi-directional relationships.

One of the techniques The System uses is to search from the front and back of the chain.
  1—Search for common Inter-Personal relationships between the source and target identities.
  2—If not found, branch the source and target identities into collections of Intra-Personal identities.
  3—Search for common Inter-Personal relationships between this level of Intra-Personal relations.
  4—If not found, break the Inter-Personal relations into sets of Intra-Personal identities.

The benefit of this technique is that a much smaller search set is required than by searching only at one end. The System can be optionally configured to start searching at only at one end (and specify which end).

The System may be configured to limit searching to a depth of N Intra-Personal and Inter-Personal levels before stopping, to limit searching to a depth of N Intra-Personal and N2 Inter-Personal relationships, to stop once X number of connection chains have been found, to require a certain number of verified levels within a chain of Inter-Personal and/or Intra-Personal relations, to require a certain level of probability of matches on Inter-Personal and/or Intra-Personal levels, and a combination of one or more of the above. The System can also be optionally configured to require a bi-directional Inter-Personal relation and/or a verified Intra-Personal relation and/or a verified Inter-Personal relation.

The System can be configured to note any identity matches or relation chains that do not meet a configurable amount of search criteria, along with the reason for failure, creating a list of near matches/near chains.

While the Friendster™ and "Six Degrees" patents mentioned above concern an ability to limit a search to N levels within a social network and find the shortest distance between two users, the instant inventive System enjoys the following key advantages, among others:

(i) The limiting of N searches in other inventions and methodologies is tied directly to users of a single network where a single ID represents a user of that network and N represents levels of direct connections within that network. The language and technology in the other inventions and methodologies clearly specify and require through both their technical design and legal claims that the chains of connectivity are comprised of identification numbers representing user-subscribers of a single system.

(ii) In the instant inventive system, the searching and limiting occurs not through ID numbers representing a user of my system, but of ID numbers representing abstracted identities across multiple systems which are then related to other identities both as Intra-Personal related facets of a single identity and as Inter-Personal related identities to an 'other'.

(iii) Additionally, my invention's utilization of identity relations from foreign systems raises the issues of verifiability and trustworthiness. To address this concern, my system can factor in configurable parameters for relation chains—requiring certain levels of identity verification or relation probability for an Inter-Personal or Intra-Personal relational connection between any two identities be considered successful. These configurable parameters can be specified by The System as a default or by a user to fine-tune the granularity of matching.

(iv) This fundamentally different approach to identity relations and focus on inter-network searching requires the abstraction of account ids from system users.

Where other systems have limited the concept of identity to an enclosed system, I have created a far more robust approach to identity relation chains that allows for searches to transcend networks and incorporate unregistered users. As such, the inventive System is both fundamentally different in concept and execution from and offers a giant improvement over prior attempts at relation chain searching.

The end-result of the abstraction of identities into relatable components of Inter-Personal and Intra-Personal system identities (identities between networks, and within a given network, respectively) is that given any two online identities, The System can attempt to find a path between them. The System can also, given a single online identity, create a listing of Intra-Personal related identities matching certain characteristics or likelihoods of same-as relations.

Furthermore, The System can create a report of aggregate interests or other profile information and activity across those Intra-Personal related identities. Additionally, The System can branch the Intra-Personal related identities to a configurable depth, matching certain characteristics or likelihoods of same-as and other relations at each depth, and use that information to generate a report of aggregate interests or other profile information and activities across those Intra-Personal related identities. Utilizing these reports, The System can further create a listing of keywords pertaining to aggregate user interests or common trends across extended networks of 'other' relationed identities.

The System discovers and indexes a considerable amount of identities through public documents. The System allows for verified Intra-Personal identities to 'shield' knowledge of their relations from one another, The System also allows for Inter-Personal relations to be shielded from one another. This is accomplished by having both global settings and overrides. An example of a global setting is: "this identity is always hidden/shown from other identities". An override example is: "this identity is always shown if the identity it is being related to is another specific identity". The System may also be requested to hide from other identities unless there is an Inter-Personal relation or chain of relations that match certain characteristics such as depth and type (i.e. "only show this account to friends").

These privacy settings can be directly entered into The System by a user-subscriber with verified Intra-Personal relations to the concerned identities, or by standard command/policy file on a foreign system that The System reads when automatically indexing identities.

In order to make this search information useful and accessible, The System offers options such as the following to perform searches and create results:

1—A web service or computer terminal service offers the ability to enter in connection chain or report parameters—such as a source identity, target identity, depth, etc The service renders output in a machine and/or human readable form.

2—The service allows for online & offline requests for data and searches, either from authorized sources or a public API.

For example, the service currently offers a Flash™ widget that user subscribers may place on their various online identities. The widget communicates with the service and pulls customized identity meta-data and syndicated content for display by telling the service which identity is being viewed. If the viewer of the widget has a browser cookie that corresponds to an account with The System, the widget can additionally request a search for a relationship chain between the identities belonging to viewer of the widget and those belonging to the identity for which the widget is being displayed. When displaying a result set, the service limits the set and customizes the content based on submitted parameters. The widget is currently written in Macromedia™ Flash™ SWF, JavaScript and HTTP Specification Image-Map (different versions of a functional widget) but could be implemented in Java, or any other in-browser technology. Additionally, the widget need not be displayed within the context of a page—the widget can be built into a web browser or a plug-in, or be a separate application that can have access to browser information either in real-time or through a notification or logging facility. The widget may display all or part of a result set itself, and/or may direct the visitor to a web page on The System which displays a larger reporting of the data. In the case of the HTTP Specification Image-Map widget, the majority of processing occurs on the web-server, with the client-side technology only responsible for transmitting a pair of mouse-click coordinates to a specific URL.

Indexing Examples

Facts
The System operates as "10.com"
Adam belongs to "20.com" and lists Brian as a 'friend' on that website.
Brian lists both Adam and Clark as friends on "20.com"
Clark belongs to "30.com" and lists David as a friend on that website.
Adam then registers with 10.com and proves to 10.com that he is the same user as "Adam on 20.com"
Clark then registers with 10.com and proves to 10.com that he is the same user as "Clark on 30.com"
10.com, as The System can then do the following:
Correlate Adam on 10.com with Adam on 20.com as a shared-identity
Correlate Clark on 10.com with Clark on 30.com as a shared-identity
Derive the following friendship paths:
Path A
  Given:
    Adam on 10.com=Adam on 20.com
    Adam on 20.com is friends with Brian @ 20.com
    Brian on 20.com is friends with Clark on 30.com
    Clark on 30.com is friends with David at 30.com
  Calculated:
    Adam on 10.com is friends with David on 30.com through the above path.
Path B
  Given:
    The above plus:
    Brian on 30.com is friends with Clark on 30.com
    Brian on 30.com is friends with David on 30.com
    Brian on 20.com and Brian on 30.com share similar interests
  Calculated:
    Brian on 20.com IS LIKELY TO ALSO BE Brian on 30.com BECAUSE:
      They share similar proven identities
      They share similar profiled identities
      They share similar profile interests Section D: Searching for People that Match Certain Criteria Across Networks The System allows for users to search for identities matching specific criteria across systems, showing not only a result-set of users across multiple networks and online services, but correlating those identities to same-as (Intra-Personal) identities when possible. The criteria for matching facets of Intra-Personal identities is configurable, as are the search criteria.

For example: a user of The System may request a search that returns a list of "[men and women within 5 miles of New York City who use social networks A and B, or C]; [like the band U2]; [group Intra-Personal identities by verified links or a highly probably confidence score]". The System may then return a listing of matching identities by searching through its tokenized and/or cached data sources, grouping the identities where possible. If requested, additional Intra-Personal and Inter-Personal identities can be included in the result set within configurable parameters. The results may show photos from the profiles or websites along with clickable links to aggregate identity information or directly to the foreign account. The results may also contain a configurable amount of sample identity meta-data.

Example 1

Search for: Amanda, User "'Amanda' on Social Network A"
Results:
  Also Known As:
    ['Amanda' on Social Network A]
    ['Amanda' on Social Network B]
  Meta-data:
    Age: 29 years old
    Zip Code: 11212

Example 2

Search for: Betty, "User 'Betty' on Social Network C"
Results:
  Also Known As:
    ['Betty' on Social Network C]
    ['B123' on Social Network D]
    [bbb@email.com]
    ['Betty's blog at http://www.bettysblog.com]

Example 3

Search for: Charlie, User "'Charlie' on Social Network B"
Results:
  Also Known As:
    ['Charlie' on Social Network B]

Section E: Serving Targeted Content via Cross-Network Profiles

Furthermore, The System utilizes the profile and identity data in order to create targeted content or advertising that is relevant to identities known to The System.

When given a facet of an Über-Identity, The System can return a set of words (known as 'keywords') associated with the aggregate Intra-Personal identities (configured to match certain criteria) or words associated with a listing of aggregated Inter-Personal and Intra-Personal identities meeting configurable constraints and depths (i.e. "n° of Friends" or "Immediate Family"). These keywords are created by analyzing profiles for common interests, meta-data and/or organizational associations.

Lists can be either be compiled by a real-time search, or using hinted cached data from the original identity discovery or prior analysis (periodic or requested).

The System employs an analysis of words appearing on Intra-Personal profiles, or profiles associated with Inter-Personal relations to determine popularity of certain keywords (be they interests, products, entertainers/entertainment, consumer habits, etc) to the user or their circle of contacts.

"Keyword" is used where a keyword is either the word used within the profile name or description of an associated entity or a word associated to that word.

Keywords are derived from:
a) Contextualized user provided descriptions of themselves
   Online profile data such as "about me", "personal interests", or "who I would like to meet". Strings matching known quotations may be considered of lower importance, and they may be referenced in a database to include their originating context or related meta-data.

b) Identity associations

If a user belongs to certain associations or has accounts with certain websites, the names of the associations/websites may be keywords themselves, or may be associated to specific keywords in a database of targeted words describing them, their users or their demographic.

c) Words derived from the methods of A&B above, but NOT from an identity's profile on a given network, and instead the aggregated shared identity information of the various facets of the shared Über-Identity across multiple networks (the Meta-Identity).

d) Words derived from the methods of A&B above, but NOT from the user's profile, and instead from the profile of related identities with the user on one or more social networks that the identity's Über-Identity has facets on (the Inter-Personal contacts of the Meta-Identity across networks).

The System then uses these keywords associated with the identity to provide advertising or customized content relevant to the user's (perceived) interests and/or the interests of the user's friends.

This is done in a variety of ways:

1. The System operates its own advertising or content network, and a 'cookie' is used to identify a user of The System and correlate the cookie with a system account when a request for Content or a Content Keyword is displayed.

a) Generalized keywords can then be fetched that are derived from aggregated identities corresponding to the account.

or a) Given information about the context in which the customization information is requested (the URL or context of the request, additional keywords associated with the request, or a customization identifier that is correlated to additional customization commands in The System) keywords can then be further refined to target/include/eliminate specific areas of interest, or eliminate categories or originators of content.

This implementation retains relative privacy of the individual, as their information never leaves The System.

2. The System operates a service via an API or similar service where instead of using a cookie corresponding to a user account, The System is provided with an identity or a reference to an identity. That identity is then looked up in The System and the customization method described above can take place. This implementation is less desirable, as it gives a requester the opportunity to 'cookie' the user themselves and start collecting their identity information. However, this method allows for customized content and advertising by the network for non user-subscribers.

3. The System may also operate a service or API where a request can return a configurable amount of one or more keywords relating to a given account identifier, identity or reference to an identity, utilizing the keywording methods described above.

Section F. Centralized Management of Multiple Accounts Across Multiple Networks

The System offers user-subscribers tools to manage their online identities through syndicating knowledge of each identity with configurable controls.

As described above, internet users commonly have one or more internet identities (where an identity is a home page, a social network profile, an online photo sharing account, an email address, or another representation of themselves online).

As these online identities proliferate, it becomes necessary for users to efficiently manage and promote these accounts. A popular method receiving much attention lately has been a "pull" based aggregation system, in which visitors are referred to a centralized service that acts as a new identity, listing the numerous online accounts among a repository of corollary information. This approach unfortunately creates two distinct problems:

1. This sort of approach does little more than create a new online identity to be managed.

2. In creating a single point of identity resolution, multiple online identities (and therefore relations and content) are conflated into a single meta-persona. This creates the ability to 'backtrace' from any one identity onto related identities through the resolution-point. This can expose too much personal information, as separate (i) work, (ii) family, (iii) friends or (iv) misc. other circles of Inter-Personal relations & content can then be mixed with one another. The results of this can compromise personal privacy by providing "too much" sensitive information, or expose isolated facets to one another—such as exposing to a "work" contact, "personal" pictures that show an individual intoxicated.

To address the deficiencies in other approaches, the system of my invention features a "push" styled syndication model, in which a centralized service acts as a repository of information for registered user-subscribers. Instead of limiting the access and display of information to other users of the service (through a website or other interface), The System also supports and promotes the syndication of identity information to other systems (such as websites) through internal tools and an API, and filters to alter the visibility of information. This is accomplished by:

1—Offering users the ability to specify which identities can be known to, or allowed to know, other identities 2—Creating one or more rule sets of these 'profiles' of identity information, and assigning these rule sets to 0 or more identities.

3—Allowing users or external services the ability to query The System or embed this information or links to this information on other systems, websites or documents.

By pushing the aggregate identity content to other systems via badges/links/API, user-subscribers are able to efficiently promote aspects of their identity to consumers/viewers of their various profiles across networks. Whereas a pull model creates a new identity to replace or compliment existing identities (effectively managing identities in the sense of offering a directory service) this push model transcends the concept of a directory and offers one or more configurable identity profiles that may be used to update external accounts. The result of these differences is that the benefit of The System is not only limited to those individuals who directly or knowingly access The System—but that it may be used to compliment data on other systems or transparently compliment data on web pages through the use of widgets. This behavior effectively creates an ad-hoc web-ring out of a given person's network of identities, making every identity that belongs to a person promotable and visitable from any other identity within their network (in accordance with privacy filters).

This is useful not only as a way to promote one's Intra-Personal identities, but as a method of adding reputation to a single facet of an Über-Identity by leveraging multiple facets together. For example: users can associate known blogs and photo pages with an eBay profile or sale to prove that they are trustworthy.

This is fundamentally different from other approaches to online identity services or aggregation services, because other systems require visitors to an internet identity profile to visit the external aggregation system in order to list/access other identities. The system of my invention displays the listing of aggregate identities within the same web-browser window utilizing widgets, and provides methods for this information to be consumed by network operators or 3rd party systems in machine-readable form at their request. Furthermore, the system of my invention provides for tracking and metrics of usage patterns, as well as identity abstraction and configurable privacy permissions.

Details of this Functionality:

As noted above, subscribers of The System are able to enter a listing of their various online identities (or approve pre-generated identities that The System has compiled for them based on identity matching analytics described above, or an otherwise supplied list of multiple identities). These identities are considered to be alleged.

Subscribers may additionally:

Delegate permissions and privacy controls to certain identities.

State that an identity is public or private and that only persons or systems matching a certain criteria shall know about the identity.

State that a given identity must always be hidden from another identity or that it must always be visible to another identity.

Subscribers may additionally:

a) Embed a piece of code onto their website that functions as a widget which displays the identity information for that user. The System currently generates such code automatically, however users of The System are able to create their own widgets that communicate with The System. This widget operates by querying The System to show dynamic data.

b) Provide a website administrator or online system with a key or other unique information that corresponds with the ability to pull identity information related to a specific identity they have listed.

c) Link to a webpage or API on the central repository which lists all of the various identities.

d) The method of b) where authentication information is required to prove that subscriber allows the consumer to view the information.

This information may be then accessed by external parties by accessing The System through a search, browse, or direct access functionality offered by:

(i) A HTTP Web Interface
  i. Consumer or Partner Services
  ii. Standard API access
(ii) Standard internet communication protocols (e.g. http, telnet, sockets)
(iii) A widgetized display system Search results may be influenced by providing The System with one or more of:

(i) identity/authentication credentials of the requestor
(ii) specialized instructions for information return The System currently allows for information to be accessed via:

(i) a consumer website that offers search, browse, and direct links to packaged information
(ii) an API interface offering information retrieval/search/syndication (iii) a widget deployment system that offers embeddable units of code that communicate with The System to acquire and display data Flash™ and JavaScript Widgets currently communicate with The System as follows:

1. The widget contacts The System and requests information for a given identity or reference to the identity.
2. The System may require the widget to identify itself with a version number of the widget or a version number of the information sharing protocol.
3. Based on the widget's request, and taking into consideration the identified version of the widget and protocol, The System accepts or declines the request.
4. The System may additionally require an authorization code or an API key from the widget to accept the request.
5. If The System accepts the request, it uses the request query and widget/protocol version to format a result set, or uses a default format. Currently The System can reply with XHTML, XML, CSV and JSON formatted data.
6. The widget then parses this information and shows this information to the user.
7. The System may cause or require that a browser cookie or a Flash™ cookie be set on the viewers computer to track usage and/or authorize certain types of information exchanges.
8. Requested information is currently:
  a. What other identities are claimed by the owner of this identity.
  b. What other identities are claimed & verified by the owner of this identity.
  c. Do I have a relationship chain to this identity. if so, what is it or provide me with a link to show the full chain.

However, these widgets need not be in-browser or limited to Flash™ and JavaScript. The System is capable of providing this information directly to web browsers, to browser-plug-ins or to standalone applications on consumer computer devices or web servers.

HTTP-Spec ImageMap Widgets currently work as follows:

1—The Widget exists of an IMG Tag nested in an A tag.
2—The client web-browser requests a unique URL described in the IMG tag, and served by The System. This URL contains a uniquely identifying element for a specific identity.
3—Based on client's request, and taking into account the uniquely identifying element in the request, The System accepts or declines the request.
4—The System may additionally require an authorization code or an API key from the widget to accept the request.
5—If The System accepts the request, it uses the request query and widget/protocol version to format a result set. The result set is turned into a graphical image, and sent to the browser.
6—If a user clicks on the image, the browser then requests an internet document specified in the A tag. This document is located on a server controlled by The System, and the URL contains a uniquely identifying element for a specific identity. The client sends the X,Y coordinates of where the image was clicked.
7—Based on client's request, and taking into account the uniquely identifying element in the request, The System accepts or declines the request.
8—The System may additionally require an authorization code or an API key from the widget to accept the request.
9—If The System accepts the request, it uses the request query and widget/protocol version to format a result set.

The X,Y coordinates of the mouse click are mapped onto the image to derive on which identity was clicked on for selection.

10—The System then performs a specific action related to the mouse click, such as (but not limited to):
  a. Logging the mouse click and associative meta-data concerning who, when, how and why the click was made
  b. Redirecting the user to a specific URL based on the location of the mouse click
  C. Serving specific content based on the location of the mouse click To offer a layer of privacy controls, The System may be configured to provide information regarding identities only from the perspective of the identity that was queried, and optionally consider meta-data concerning the requester of the information to modify that perspective.

For Example:

1—A user may enter two or more identities into The System.

2—The user may then configure The System to "show" or "hide" specific identities when viewed from the perspective of specific identities; i.e. a user may say "Always show my MySpace™ (a social networking website) identity to the perspective of my Bebo™ (a social networking website) identity" or "Always hide my Facebook™ (a social networking website) identity from the perspective of my MySpace™ identity".

3—The user may then configure The System to "show" or "hide" specific identities when viewed by specific requestors; i.e. a user may say "Always show my LinkedIn™ (a business oriented website with social networking features) identity, unless the requesting entity is Person A" or "Always hide my Flickr™ (a photo sharing websites with social networking features) identity, unless I have categorized the requestor as a 'friend' or 'family', or they are within 'two degrees of separation' to me on more than one social network".

4—Another user or system may be searching for "user@domain.com", and The System returns only the subset of identities that the owner of "user@domain.com" wants seen from the perspective of "user@domain.com".

5—However, if the requester identifies themselves to The System as another identity that has an Inter-Personal or Intra-Personal relation to the target identity within configured privacy constraints, The System takes into consideration that information when generating a response. The requester can identify itself to The System via a cookie (or other account/session identifier such as a specially formatted logged-in link), session id, or API key.

By integrating these privacy concerns into its design and architecture, The System accomplishes the following:
  Isolates accounts from one another on a per-originating account basis. This allows for a user to register both a personal blog and a professional website with The System, and manage+syndicate this information through a central location (The System) while keeping the two accounts wholly isolated. Options can be selected to never syndicate information pertaining to the blog to the professional site and vice versa, or be dynamically switched to link the two accounts bi-directionally or urn-directionally.
  The System can analyze privacy chains for Intra-Personal related identities, helping users create a stronger and more secure internet identity (or, conversely, a more accessible one).

For example The System alerts the user of this situation:
Given 3 accounts: A, B, C.
  A is configured to be hidden to all, except B;
  B is configured to be hidden to all, except C;
  C is configured to be hidden to all.
The System alerts the user that A is indirectly viewable by C, because C knows of B and B knows of A.
Also:
Given 2 accounts: A, B.
  A is configured to be visible to all, except B;
  B is configured to be hidden.
The System alerts the user that there is no public link between A and B.

By further exposing weaknesses in privacy chains, The System:
  i. educates users about privacy issues,
  ii. suggests steps to isolate identities from one another,
  iii. helps users create rules to secure these identities from one another.

Also, note this example:
Given 1 account: A
  A is configured to be visible only to individuals within N degrees of Inter-Personal and/or N2 degrees of Intra-Personal relationships where N and N2 are configurable, as well as the threshold of probability needed for a matching identity.

Also, note this example:
The System can offer users 'roles' or 'personalities', which are a configurable set of privacy settings and rules that are assignable to one or more identities.
  For example, a user can assign a role of "self is public, hide from all others" or "show self to direct friends only, always hide from [list of one or more identities]".

As more than one person can claim or legitimately own a single online identity, The System implements the following functionality:
  a. If the identity "user@domain.com" is queried, and belongs to 2 sets of identities, The System asks for a refinement, showing aspects of the 2 potential lists:
    (i) The System returns both lists as potential matches optionally along with meta-data to assist in their refining of the query,
    (ii) The System can also be configured to show a most-appropriate match (based on submitted or pre-defined criteria), and optionally return with a result set data indicating that the result set contains a most-appropriate match and that there may be additional matches.
  b. Instead of querying "user@domain", a reference to a specific version of "user@domain" may be queried. This reference not only represents "user@domain", but may additionally represent the relation of "user@domain" to a registered user of The System. For instance:
    Adam registers with The System and claims "user@domain" as an identity. The System assigns him a unique id "09u12398u7asdasd".
    Brian registers with The System and claims "user@domain" as an identity. The System assigns him a unique id "user@domain#0". Brian then verifies this information by proving to The System he controls that identity.
    Verification is completed by the means explained previously in this document.
    The System may then be queried for identities related to "09u12398u7asdasd", which would refine the search to identities related to Adam, taking into account his relation to the unique identifier "09u12398u7asdasd" through the identity "user@domain".

The System may then be queried for identities related to "user@domain#0", which would refine the search to identities related to Brian, taking into account his relation to the unique identifier "user@domain#0" through the identity "user@domain".

The System may be queried for information related to "user@domain", which would list both Adam and Brian's claimed identities as the possible items.

Additionally, when a visitor to a subscriber's identity utilizes the syndicated list of identities, the user may elect to have The System track their usage, search and access patterns of the syndicated identities.

The System currently does the following:

A) Tracks the usage of lists of identities, including meta-data concerning the condition/environment of usage.

This is currently accomplished by logging the conditions under which widgets and API calls request information: including the time, date, ip address, source identity, browser information, cookie and/or session id that can be correlated to another requester of data or registered user of The System, API key, and query type.

B) Track the usage of the identity link when selected within a widget—either by making a separate transparent request to The System for the purpose of tracking, by requesting the identity link from The System which transparently logs the usage and then redirect the visitor to the appropriate link. If the usage occurs through an ImageMap widget, no additional request is necessary.

C) When widgets are not used and static images are, The System records similar information about the use of the image by tracking the image placement. This is accomplished by using a unique image link hosted on the server per identity. The image need not be unique itself, as a web server on The System can match multiple URIs to a single image file. When a web browser requests the image link, the target identity can be derived from a unique code within the image link's URI. Additionally, the image may link not to another identity, but to The System where either: an aggregated list of identities is displayed OR The System logs a request for a specific identity, and then redirects the user to that identity.

D) The System tracks searches for identities and notifies users of searches for identities they own.

E) For each identity registered with The System, The System creates a web page listing all related identities that are viewable via privacy constraints either from the viewpoint of the originating identity OR from the relationship of the viewer of the list to the identities listed. The viewing of this listing is logged, as are the click-trends of those who view the page.

Using these methods, a variety of graphs and reports concerning identity usage can be generated for users.

Currently The System reports on:

Number of views per-identity;

The above, by type (where type is: API, web browser on actual identity page, web browser on a system record of the identity);

Viewing patterns TO, per identity (i.e. how many were direct new views? how many originated from another identity? how many originated from each of the other identities?);

Viewing patterns FROM, per identity (i.e. how often do viewers of this identity visit another identity belonging to this user? how many outgoing links are there per identity?);

Viewing patterns: time of views, frequency of views by viewer, unique views—per identity or aggregate.

Utilizing this information, users can see how visitors travel through their Intra-Personal identities and how their aggregated Intra-Personal identity is searched and used by others.

The System also allows for registered users to opt-into an inter-network subsystem where The System can notify/allow to be notified the identity of the account viewer to the account holder. i.e. by using cookies and pooling the identity tracking & management resources of The System, The System can then let an account holder know which other users of The System have viewed their social network profile, online account, blog, eBay item, or any other web page that a widget or tracking image is placed. The functionality behind this occurs by cross referencing cookie data with the identity database, and then logging image/widget loads or callback pings from the widgets. Additionally, identity owners can learn their relation to visitors of their website—both at a granular level example: "visitor 101 [2006-09-01 10:14:13] was: jdoe@2xlp.com. your closest relation is: you→john.doe@2xlp.com=jdoe@2xlp.com {click for more details}"

and at an aggregate level example: "30% of visitors between [2006-09-01 10:14:13] and [2006-09-02 10:14:13] were within 1° of separation to you. 80% were within 2° of separation. people who visit your profile tend to like: music and sports. popular other destinations for them to read are: social network profile X".

Please note that the term 'widget' used throughout this document does not refer to the definition of widget as a generic object placeholder, but as the computer terms that mean "an interface element that a computer user interacts with, such as a window or a text box" and "a portable chunk of code that can be installed and executed within any separate HTML-based web page by an end user without requiring additional compilation."

Section G: User Manipulation of Identity Data and Meta-Data

The System offers user-subscribers tools to manage their online identities through managing, indexing, and syndicating data, content and knowledge of content associated with each identity through configurable controls.

The System can also serve as a centralized service acting as a datastore for identity data, such as profile information. Using this service, users may store, edit and aggregate their profile information and meta-data on the service itself, and then syndicate it outwards or inwards (inwards meaning consuming information from elsewhere and then formatting it for display and/or outward syndication). Correspondingly, third party systems can query The System for profile information regarding a given identity.

This functionality is accomplished by creating and managing an editable profile for registered users that is available in:

a) a human-readable representation to users of The System b) a machine-readable format that either:

a. marks up the human-readable format (i.e. the human-readable format contains a transparent/unobtrusive machine readable-encoding)

b. is available as a specified machine-readable format via a public or private API.

The current implementation of The System offers information via all three formats.

Because The System relates users to identities, and identities to other identities using abstracted spatialized references, profile data can be efficiently managed, edited and permissioned. This functions much in the same way The System handles the management of syndication and links.

Current innovations attempt to deal with profile syndication deal in an interactive manner: in order to import standardized/formatted information a user authenticates against a central server proving that they own the information and are authorizing its release/display to a consumer, making it both excellent for and necessary to the sharing of sensitive information (such as credit card or social security numbers). The added security, however, comes with the burden of requiring a login-style authentication to release information to other parties.

The System of my invention utilizes a less secure security model—security through obscurity. As such, it is wholly inappropriate to use for syndicating sensitive data—but it is perfectly suited for syndicating what is commonly publicly available information. Identity information can be 'pulled' from The System using either a standardized format of the identity requested (e.g. "Display information for john.doe@2xlp.com" or "Display information for http://findmeon.com/users/jdoe") or via a unique code that references each identity ("Display information for 'abcdefg'" where 'abcdefg' references an actual identity). An analogy would be that while other systems use "known doors with strong locks", The System utilizes "hidden/unknown doors with no locks" to provide this particular functionality.

Identity profile information, just as lists of Intra-Personal identities, may have permissions and privacy rules set to grant or limit the information that is shared based on the relationship of the consumer to the identity.

When provided with an identity or a reference to an identity, The System may either:
  display profile information for that identity, or
  attempt to derive the relationship of the consumer to the identity (via a cookie, session id, API key, or login) and show all/some/no information based on the existence and parameters of the relationship.

If configured to be publicly viewable, information syndication requires no interaction/authentication—the resource is essentially static and access restrictions to it are passive. Interaction/authentication of the requesting party or additional customization commands may be provided to influence the results, but a configurable amount of material may be provided as a 'public' resource that requires no additional information from the requestor.

The System stores identity profile information in two methods:
  a. The System standardizes profile information and stores it in a database. Currently this is done utilizing an intermediary format, as there is no standard for online profiles. The intermediary format is a superset of common online profile elements and standards. Using rules and mappings, various online profile formats and fields can be mapped to and from this intermediary format.
  b. The System may additionally store an original version of the profile in the database.

For users, The System acts as a clearinghouse and switchboard of personal accounts and information—associating identities and data from sources and clearing/routing/providing them to new data consumers (users, systems, applications).

Profile information does not just consist of personal attributes, but of any data/content associated with the identity.
  (i) Same-As identities (Other accounts owned by the user)
  (ii) Relation-To Identities (friends, family, contacts, etc relationed to the user)
  (iii) Personal Attributes (Profile Fields on a Given Identity)
  (iv) Identity-Oriented Content (system-specific newsfeeds, pictures, postings, account activities)

By tracking online identities & activity using network-native identifiers, and offering per-account and per-attribute controls, The System is able to efficiently index, route, or make available identity-specific information to multiple systems and persons.

Online profile information is entered into The System in one of the following manners:
  a. information is entered directly into The System by a user;
  b. information is imported into The System by The System reading/parsing an online profile;
  c. information is imported into The System by The System reading/parsing an API or other method of requesting online profile information from another system;
  d. a web browser widget, function, bookmarklet (user-installed JavaScript Application) or plug-in parses an online profile display page, an online profile form, or foreign system API.
    (i) The tool then redirects the user to The System with the relevant information submitted as GET/POST data, or
    (ii) the tool then communicates with The System, transferring the relevant information without redirecting the user's browser.

Users are then afforded the following opportunities:
a) Users may review the information and edit/remove/augment it before being recorded into The System's data store.
b) Users may reference their profile information to one or more identities (i.e. the same profile information is valid for john@2xlp.com and john.doe@2xlp.com).
c) Users may specify privacy constraints and permissions for the profile as a whole (anyone can access, no one can access, only contacts with certain Inter-Personal and Intra-Personal qualities may access).
d) Users may specify privacy constraints and permissions for individual elements of the profile.
e) Users may create sets of rules or roles of privacy constraints and assign them to one or more identities and attributes (e.g. "anyone can access the profile information if it is searched from the perspective of john.doe@2xlp.com", "no one may access the information if it is accessed from other perspectives", "individuals listed as 'friends' may always see this information", etc).
f) Users may create multiple profiles, having different identities reference different profiles, and optionally references rules and roles as well.
g) Users may reference their profile information to one or more "profile personas"—collections of profile information and rules/roles that users may configure and apply to 0 or more profiles.

In order to syndicate information outwards, The System responds to a query for an identity profile much in the same way as it responds to a listing of identities illustrated in Section F above:
  a. If "user@domain.com" is queried, and belongs to 2 or more sets of identities:
     (i) The System returns both lists as potential matches, optionally along with meta-data to assist in their refining of the query, or
     (ii) The System asks for a refinement, showing additional information of the current match set. The information shown can be configured by the requestor, The System, or both, and may be expounded upon by additional requests. This could either happen by creating a new request, or by submitting a unique request/transaction id for the first request that accesses the necessary information (the original request parameters, metadata concerning the original request, or a cache of the original request results).
  b. Instead of querying "user@domain", a reference to a specific version of "user@domain" may be queried.
     (i) This reference not only represents "user@domain", but may additionally represent the relation of "user@domain" to a registered user of The System.

Additionally, when formulating a response for the query, the following may be taken into consideration:
  The System may require the query to identify itself with a version number of the calling software or a version number of the information sharing protocol.
  The System may additionally require an authorization code or an API key from the query to accept the request.
  If The System accepts the request, it may use the request query and/or widget/protocol version to format a result set, or use a default format. Currently The System replies to Widget/API requests with XML or JSON data in the OpenSN format, and can translate subsets of information info hCard or FOAF formats. The System also replies to HTTP requests through a consumer internet service with structured OpenSN documents in the body of an HTML page; this could be represented in another format based on request parameters.
  The System may cause or require that a browser cookie or a Flash™ cookie be set on the viewers computer to track usage and/or authorize certain types of information exchanges.
  Privacy rules may be in place to limit or expand the viewability of the information.
  The query may specify to return the results in an intermediary format or in a templated mapping of fields and values.
  The System may also log information about the request such as: the request itself, the result (success, failure, error reason), the ip of the requester, the date/time, any additional info on the requester (login status, session id, cookie id), the request headers+meta-data if made via http.

Using these methods, information can be automatically syndicated.
  a. Users may alert a third party service that they are using The System to manage their public information. That third-party service may then make information requests for a specific identifier in The System.
  b. A user may utilize an application or script running on their computer or another machine, that will take information from The System and update third-party accounts with it. This could be a standalone application, a web service, or a browser-plugin/script that makes requests & simplifies workflow through the user's web browser.
  c. A third party system can query The System to discover if there is new information for one or more identifiers or identities Information that is typically syndicated by The System includes:
  a. information about a specific account,
  b. information about a specific account since a previous query or date+time (vectors/diffs of change),
  c. newly claimed/registered profiles for the 3rd party system,
  d. new information/profiles for accounts claimed to be on the 3rd party system since the last query or a date+time,
  e. new contacts for an identity,
  f. new content for an identity.

By centralizing the information and creating a publishing model for updates, third party systems eliminate the danger of orphaned accounts (accounts which have not been used for weeks, months or years). By using The System, 3rd party systems can update their databases against the most current version of user profiles—thereby affording their users the ability to continually interact with the most recent data. This provides utility not just for users of The System & networks, but for users of the Third Party Systems which can now use their preferred interface to access data.

If a 3rd party system does not wish to participate with The System directly, information can still be syndicated outwards by utilizing a web services framework to migrate information. Code running on a user's machine such as JavaScript bookmarklets, browser plug-ins, browser widgets, or external applications can communicate with The System to retrieve data and either update online forms or submit online forms on their behalf. This happens by interacting with or controlling the user's web browser or creating an external application session on the user's behalf, which in turn makes requests to the 3rd party system from that user. Because all requests come through the user's web browser or account session, The System does not need to utilize passwords or other access information as it can enjoy the benefit of the user's login status on the 3rd party system. If necessary, code running on the user's computer may contact The System in order to retrieve additional instructions on how to proceed and to transfer profile data.

For example: a JavaScript bookmarklet offered to users of The System merely contains JavaScript code with instructions to load additional code from The System. The first piece of code loaded from The System communicates with The System and is used to derive which online network/profile the user wishes to update or communicate with. Once the user chooses a profile to update, the code on the user's machines requests instructions specific to the profile/network. This approach keeps the code executing on the user's machines, but continually updates the code & instructions from the server. Profile information may be sent to the user's browser in a format that the client's computer maps onto the profile form by:
  (i) using predetermined instructions, or
  (ii) adaptively discovering the likely form fields by analyzing the names of the form fields, or
  (iii) suggesting to the user the likely form fields per-field and affording the user the opportunity to approve, reject, or provide their own mapping, or
  (iv) asking the user to correlate form fields from their profile to form fields on the screen.

Additionally, client-side technologies used by The System (such as bookmarklets, plug-ins and desktop applications) can communicate with server-side technologies of The System while they adaptively discover fields or engage in user dialog, notifying server-side elements of The System of decided field mappings. This information can then be logged, analyzed and used to provide for suggestive field-matching based on the aggregate trends of this 'crowd-sourcing'. These recording matchings can also trigger human audits of to create or update predetermined instructions and mappings. Using an aggregate of logged past behavior, predetermined instructions and suggestions can be inferred for future mappings.

As an example:
1. A user of The System has an account with RoadSound.com, and wishes to update their profile on that website.
2. The user chooses RoadSound.com as the intended profile of the update.
   (i) The user selects an option on The System to update their external profile and is presented with an option for RoadSound.com, or
   (ii) The user selects an option on The System to update their external profile on RoadSound.com, or
   (iii) The user selects an option as a browser bookmarklet or widget or an external application, to update their profile and is presented with an option for RoadSound.com, or
   (iv) The user selects an option as a browser bookmarklet or widget or an external application to update their profile on RoadSound.com, or
   (v) The user navigates to the RoadSound.com website and utilizes their bookmarklet, which asks the user to confirm that a profile update is requested for RoadSound.com.
3. The System can then:
   (i) generate a URL that will pre-fill the profile edit page for RoadSound.com based on a URL template for RoadSound.com and mapping the intermediary data format to known RoadSound.com form fields and redirect the user to that URL, or
   (ii) generate a URL that will submit an updated the profile edit page for RoadSound.com based on a URL template for RoadSound.com and mapping the intermediary data format to known RoadSound.com form fields and redirect the user to that URL, or
   (iii) redirect the user to the RoadSound.com profile page or instruct the user to visit the RoadSound.com profile page, and provide instructions to execute on the user's computer to update the profile.
4. If the user has successfully completed their profile update, no more interaction is needed.
5. If the user must rely on code on their browser to update the profile, then:
   (i) the code may connect to The System to download additional instructions on how to proceed
   (ii) the code may present the user with dialog boxes to approve actions or refine options, connecting with The System as needed
   (iii) the code may direct the user's browser to a profile page on the 3rd party and fill out the profile form using current profile information as provided by the server
   (iv) the code may direct the user's browser to a profile page on the 3rd party and fill out the profile form using current profile information as provided by the server and hit submit Because these instructions are executed on the user's computer, they can take advantage of the user's login state or online session. When dialog boxes are unnecessary, this results in a minimum of interaction by the user and a seemingly seamless update.

To illustrate:

Adam is registered with The System as a user claiming to be the following identities on foreign systems: Adam@domain.com, http://CampusCupid.com/users/adam, http://RoadSound.com/users/adam100

The System creates for Adam a unique link corresponding to his claim of that identity.

Each claimed identity can be located in The System by the following methods:

The record can be found by querying The System for the identity. The System spatializes a given account into a standardized identity, and attempts to locate corresponding records. The System can then return the number of corresponding identity records and meta-data concerning the believed validity of that identity (i.e. is this version of the identity claimed or verified? where did the profile information originate from?).

The record can by found by querying The System for an exact record version: instead of searching for "adam@domain.com", a unique reference to a specific record such as "adam@domain.com#1" or "091234kjas" is used.

Adam notifies the CampusCupid.com system about his profile and provides the unique key 'ABCDE'. CampusCupid.com then queries The System directly asking for information pertaining to 'ABCDE', and updates its datastore.

Adam logs into CampusCupid.com and changes his listings of favorite music. He then clicks a bookmarklet on his browser which ultimately reads the profile on the CampusCupid page and sends it to The System where it updates the standardized datastore.

Adam registers with RoadSound.com. During his process, he clicks his bookmarklet His web browser then contacts The System, retrieves the current profile data, and attempts to match it to the form. There is no pre-determined script for mapping profiles to RoadSound.com, so Adams sees dialog boxes asking him to approve some suggested field matches. Information on the field matches is then conveyed to The System, which:
   (i) notes that RoadSound.com should be audited for a pre-determined matching script to be made, and
   (ii) Adam's mapping is used in creating future suggestions when mapping the RoadSound.com form or forms with similar field names.

As more users encounter the form that Adam used and provide feedback, and as more users map profiles to forms with similar field names, The System adjusts its field mapping suggestions to reflect the aggregate trends.

The automated profile updating may alternately happen using a standalone program or a web service that queries The System for information and then updates external systems with the information.

The System may also be configured to automatically update one or more profiles from a user by querying/interpreting data from a third party system.

Section H: Allowing $3^{rd}$ party Systems to update Data Stores with Information Stored in The System A significant concern for consumer internet and software companies is that of "Retention & Abandonment". Classic marketing theories and practices have proven that it is significantly cheaper to retain a new customer and maintain that existing relationship than it is to acquire a new customer. Software and Social Networking systems have an added challenge of reaching and maintaining the "critical mass" necessary to maintain current successes and foster continual growth. Because online systems are often free for end-users, accounts are rarely cancelled or deleted—instead they lay fallow from months or years of abandonment.

It is particularly of interest to this situation that Social Network systems and applications generally have little content of their own—primarily acting as:
- an interface to user-generated content
- a mechanism through which user-subscribers interact with one other Looking at a selection of socially enabled systems it becomes evident that much of the innovation and allure of these systems to users is their implementation of the interface element, seconded by the collection of users they have amassed. A close inspection of these systems often shows a significantly large overlap of users and content, illustrating that these networks which act as interfaces, tend to consume what is essentially syndicated content—the same users are entering the same content across different networks.

The System was designed in part to help networks better focus on their interface elements, by simplifying the account creation, maintenance and portability tasks for users:
- The System makes it easier for users to join new networks or applications through rapid registration and other quick signup mechanisms
- The System makes it easier for users to manage active accounts, syndicating data or acting as a switchboard to update profile data and content
- The System allows networks to keep accounts (active or abandoned/inactive) up-to-date by consuming syndicated content or querying The System for specific content relating to a user By lowering the barriers to account registrations, The System helps networks gain users and achieve a healthy population. Through offering a means to keep user accounts up-to-date, The System helps networks maintain a rich offering of current and timely information, that attracts new users and gives existing users up-to-date information to browse and search, enabling the networks to focus on innovations and development (not acquisition and retention).

For example, given the following:
- Alice, Brandie, Carla and Danielle all use Social Network "A"
- Alice, Brandie and Carla stop using Social Network "A", and begin using Social Network "B"

The System enables the following:
- Social Network "A" can keep Alice, Brandie, and Carla's information (profiles, data, content) up-to-date and in sync;
- Social Network "B" can keep Danielle's information up-to-date.

This means:
- Danielle can still access/search/interact with up-to-date information of her friends on Social Network "B" through the network of her choice, "A"; and vice-versa
- New users to networks A and B have the opportunity to browse & interact with the full range of users & info, they are not discouraged from using network "A" because Alice, Brandie, Carla, and many other profiles they visit have been inactive for months or years; because the content is updated continuously, there is no perception of abandonment.

Figure 57:
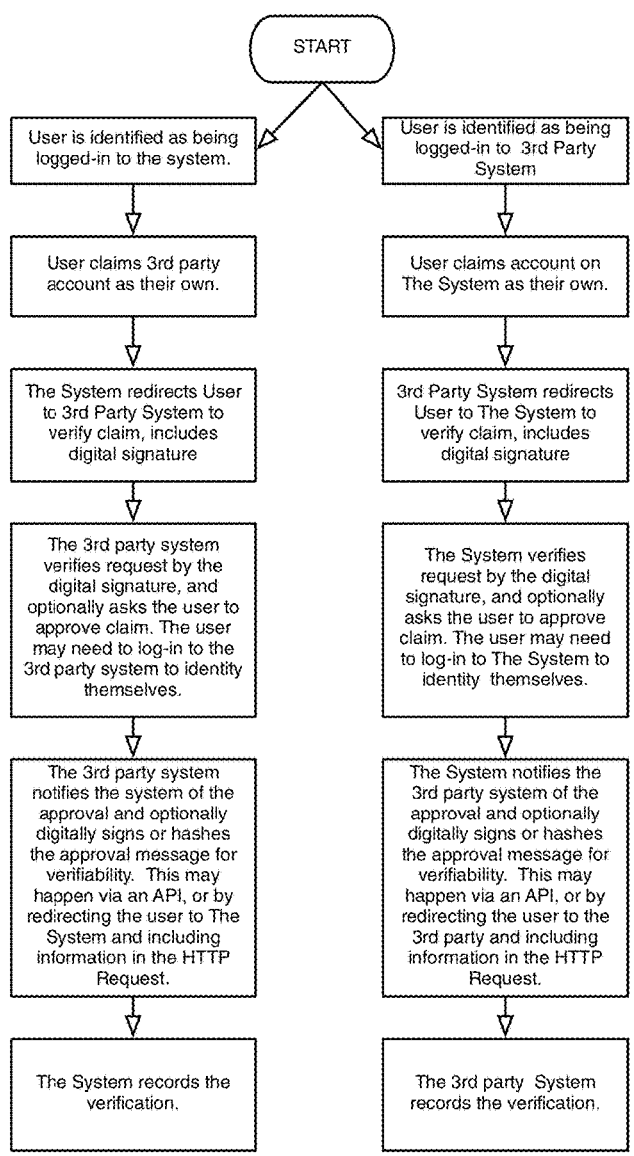
FIG. 57 illustrates an example of Creating a verified link between a subscriber account and a 3rd party system.

The System offers several methods of enabling $3^{rd}$ party networks to update their systems.
a. A user can provide the $3^{rd}$ party system with credentials for a certain repository of information managed by The System.
b. A user can bind a repository of information on The System with a $3^{rd}$ party account, proving to both systems that the same user owns a certain account. A method of this is explained when discussing the quick listing subsystem, and is also illustrated in FIG. 57. Generally this happens by digitally signing or hashing information for each system, to prove the legitimacy of the systems & request to one another—and asking the end-user to approve the linkage.
c. A $3^{rd}$ party can query The System for an exact identity or information repository.
d. A $3^{rd}$ party can query The System for a listing of possible matches of identities, and then query for an exact identity.

Credentials are often in the form of a unique URL or a unique Key/Code that correlates to the user's profile on The System, and specific rules+privacy settings set for one or more $3^{rd}$ parties.

Section I: Application of Meta-Identity and Meta-Profile Information

The System may use Meta-Identity and Meta-Profile information (culled from User-Subscribers or from indexing the internet-at-large) to create customized content suggestions or more accurately understand user behavior. The System can suggest highly targeted content for a given identity—based on their Meta-Profile or on Meta-Profile trends of their contacts across social networks and applications; and The System can examine networks and populations for trends to be used for demographics reporting or media buying.

Figure 34:
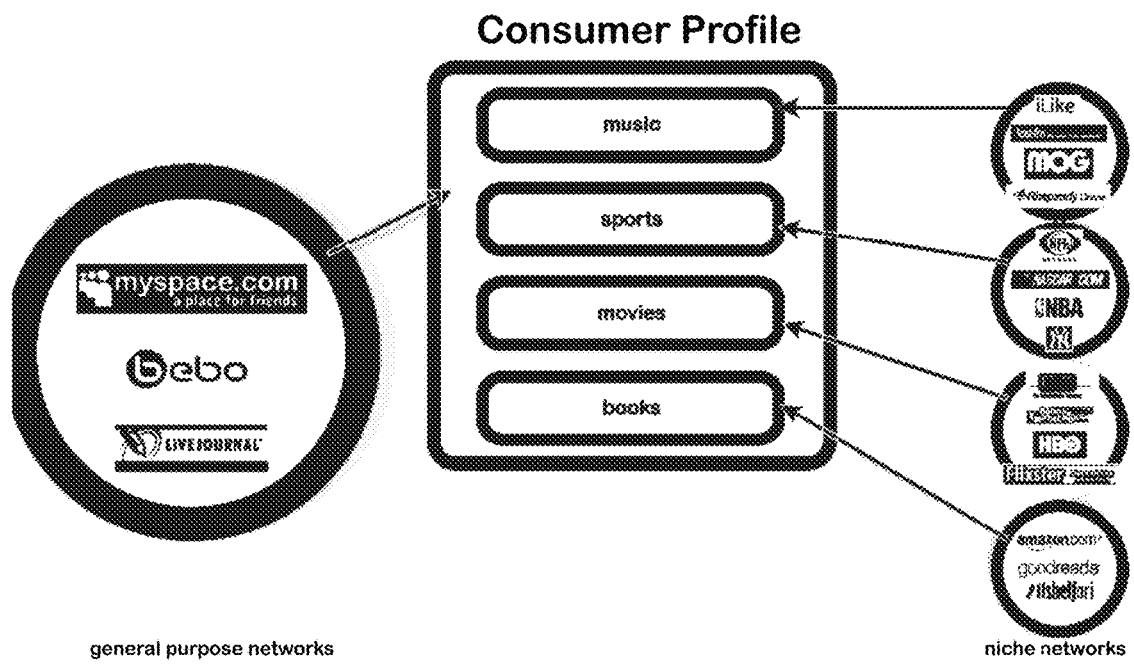
FIG. 34 illustrates how niche networks and general networks can be mapped to a full profile.

The System suggests highly targeted content by analyzing social networks, and taking into account the full range of identities that belong to an internet user. Internet users typically have 5-10 active online accounts that contain profile information. While this information may vary between online accounts in terms of presence and quality, if multiple identities belonging to a single individual can be aggregated, they can produce a complete consumer profile. In FIG. 34 we see how multiple online profiles and activity can correlate with the entirety or singular aspects of a consumer profile. In FIG. 35a and FIG. 35b, multiple identities are listed, each having a subset of information from the aggregate identity.

People tend to share different information across online identities; this has been observed to be influenced by several factors:
a. Much like people share different amounts of their personal life and use different vocabularies and mannerisms when interacting with real-world people across their Friends, Family, Colleagues, or other social groups, users will tailor their speech and actions online to match with the groups they converse with.
b. Social networks or applications with identity/networking tend to have personalities of their own: some are casual, others are proper. Users will often affect their personality on a network to embrace, be consistent with the overall temperament of that network.

Because different information & activities are shared across networks, two important events happen when assembling the aggregate profiles into a singular Meta-Profile:

(i) Completing the consumer profile—occurs when a particular type/field of data is not present in one profile, and is present in another ("filling in the blanks")

(ii) Amplifying the consumer profile—occurs when a particular type/field of data is present in one or more profiles. Having the same information associated with more than one profile gives added weight to its relevance; having different information associated with more than one profile expands its breadth.

The System is able to leverage the collective value of an individual's identities against one another, as it acts either as a central repository to manage/index/syndicate identity-specific information for subscribers, or as a central index and guide to non-subscriber identities and activities. In FIG. 35a, we can see a consumer profile created through 'completion' across multiple networks. In FIG. 35b we see how multiple profiles can amplify fields on top of one another.

Currently, there are two main approaches to customizing online advertising and content to internet users:

Target content to a user based on existing content of a published page

Utilize the web-browsing history of a user to derive click patterns and usage history The System I have devised suggests advertising and content that can prove to be more highly targeted than either of these methods, by analyzing the identities that belong to either the web browsing user or the identities belonging to the content publisher/subject of an online user profile. By incorporating a wide breadth of identities & corollary data related to the viewer or the viewed, a larger quantity of suggestive content can derived from the profiles—and their relevance can be better measured by frequency of use and context of certain terms.

In FIG. 35a, we see a few basic online dating and networking fields. These fields are exemplary, and anyone skilled in the trade would know that they comprise a mere subset of profile fields. We see in this figure that 4 disparate internet identities have been related to one another, each of which only holds a few pieces of relevant information to an aggregated identity. The first identity, the user's blog Myblog.com, only shows their age and astrological sign. When suggesting advertising and content for this user or online profile, advertisers and networks have an extremely limited base of information to run their suggestive content analysis on.

In contrast, the user's other identities offer much more information. Their profile on a social networking+dating site like myspace.com might offer their hair-color, eye-color, height, weight, dating status, and a list of bands they like. Their profile on a social networking site like Friendster.com might offer information like their ethnicity, sexual orientation, and a list of their favorite authors. When suggesting advertising and content for this user or online profile, advertisers and networks have an rich base of information to run their suggestive content analysis on.

The richest amount of information, however, comes when these disparate online identities can be related to one another—forming an aggregate identity that lists all of their various fields. When this is accomplished, the aggregate profile, or Meta-Profile, can be accessed for suggestive content analysis. In our example, suggestive content for the blog MyBlog.com can be built not just from an age and astrological sign, but from the full range of fields across the online identities: gender, birthday, ethnicity, etc. Suggestive content on the more-complete online profiles, such as accounts with social networks like MySpace™ and Friendster™, can be improved as well—adding just one field to the Meta-Profile can result in more appropriate suggestive content—by either adding relevant terms, ranking the relevance of terms, or simply showing a term that is more appropriate.

For example: a user's MySpace™ profile may not have any books listed on it—but a correlated Friendster™ profile lists several books—one of which is by an author who has a special campaign or advertising-buy on MySpace™. By using Meta-Profile data, The System would be able to serve an ad or ad-improvement suggestion for a MySpace™ page-view concerning the book, based on profile information integrated from the Friendster™ profile. This is because the viewer or owner of the profile is a fan—a fan on another network, but still a fan of the Author. By analyzing the frequency of terms (tokenized words or phrases) across multiple profiles, their relevance can be scored—a user who mentions snowboarding on 5 online profiles would likely respond better to suggestive content than a user who mentions snowboarding on 1 site.

When creating targeted content for an identity, The System utilizes several types of information. Generic profile fields such as self defined descriptions, likes & interests lend a great amount of detail to user (i.e. weight, religion, marital status, favorite bands, favorite authors). Aggregated profile metadata also illustrates interests—a user may have an identity on a "science fiction" fansite or a "preschool teachers union" message board, simple associations to targeted networks & websites suggest a lot of information about a user. The System can describe qualities of networks in two ways:

The System accesses a database containing online communities and their descriptions The System adaptively constructs one by analyzing the aggregate interests of members of online communities—both within the site and extended through multiple identities.

Similarly, qualifying associations can improve relevance of suggestive content—if a user lists that they are a member of the "American Diabetes Association" on one website, they can receive suggestive content pertaining to members of that group on another.

This information is further complimented when looking at "friends" or other Inter-Personal online identities. By incorporating the likes and interests of a network of inter-related identities across websites, The System can further target content specific to an identity. The System can optionally include interests pertaining to inter-related identities.

The System can be used to customize data for both web-browser-user identities (those identified by a session id) and online profile identities (those queried via a specific identity facet). Identities can be turned into 'suggestive content profiles' by simple analysis of the various profile traits. While existing profiling technologies limit themselves to a single identity, the system of my invention uses identities from multiple sources to transcend networks and create flexible profiling models by applying configurable rules and models to aggregated identities.

For example, The System can be configured to create suggestive content profiles by the following methods:

(i) Tokenization

1. Tokenize the elements of every identity facet (split identity profile fields into words or phrases) and return:
   a) All words & phrases
   b) Only words & phrases appearing in more than n % of identity profiles
   c) Only the top 10 most-often used words & phrases
   d) Only words & phrases appearing in a certain online identity profile 2. Search the tokenized identity profiles for certain terms
(ii) Full Text
   1. Search each identity profile in its entirety for certain terms
(iii) Methods of the above where:
   1. Profiles & content are checked to see if an identity is a "fan" or has an affinity for a certain band, author, celebrity, product, entity
   2. Tokenized and Textual results are filtered and analyzed to limit and/or include related words. For example: "Apples, Oranges" can be analogous to "Fruit"

In regards to a web-browser-user (a website consumer), there are several ways to discern the user's identity. The website user's computer may share identifying information, such as a standard web 'cookie', a browser toolbar or extension, or an external application. In all of these scenarios, the user may provide The System with an identifier linking their request to an identity already known by The System. A website publisher may also share the identity of the user with The System. If the user is known to the website publisher, by a login, a cookie, or other means, the publisher can notify The System of the identity to query. Finally, a third party—such as an advertising network—may have this information and provide it to the service.

Examples of this Functionality

Example I

If a user registers with The System, they receive a cookie which identifies them to The System when content is requested. In this scenario, targeted content can be directly provided to the user.
   Application Scenarios:
   The System returns suggestive content directly to the user, by being integrated with the web publisher.
   The System returns suggestive content directly to the user, by returning content within a framed or otherwise embedded content.

Example II

If a user is not known to The System, but is known to a web publisher (consumed web page publisher), the web publisher can provide The System with the user's identity.
   Application Scenarios:
   The web publisher directs the user to retrieve suggestive content from The System, passing identity to The System.
   The web publisher requests suggestive content from The System, passing identity information to The System, then displays that information to the user.

Example III

If a user is not known to The System, but is known to an advertising network, the advertising network can provide The System with the user's identity.
   Application Scenarios:
   The advertising network directs the user to retrieve suggestive content from The System, passing identity to The System.
   The advertising network requests suggestive content from The System, passing identity information to The System, then displays that information to the user.
   The advertising network requests suggestive content from The System, passing identity information to The System, then provides the publisher with suggestive content or factors the suggestive content into their own internal algorithms.

In regards to content customized for a viewed web identity (a website profile), The System operates much more simply. The System need only utilize the faceted/disparate identity of the website (which may be the websites URL used as an argument or request referrer header, or a passed argument from the website publisher or advertising network) and examine a list of aggregate identities provided by the identity tracking component.

The System can be configured to optimize content for:
1. The Website Consumer
   a. The website user's computer shares identity information (as a cookie, through a toolbar or browser extension, or through an application).
   b. The user may be logged into the publisher's website, the publisher can then offer that identity to the service through an API or URL pass-through.
      i. API
         1. The External Service alerts The System that a web-browser cookie with a certain identifier relates to a specific identity. The System serves content directly.
         2. The External Service queries The System for suggested content improvements for a specific identity. The Service then returns:
            a. Suggested Content Improvements to the External Service.
            b. A unique identifier to the External Service, related to the request, so that an end-user can directly request content improvements from The System.
   c. A third party service (such as an advertising network) may have user identifiable data, and present it to the service.
2. The Website Publisher
   a. If the website is an online-profile/social-network-profile/blog, content can be suggested by examining alternate identities that correlate to the Meta-Profile of the online/social-network profile.
3. A configurable combination of the above.
For Example:
Given:
   A Meta-Profile has been created out of the aggregate of:
      incomplete MySpace™ and Bebo™ profiles;
      a reasonably complete Friendster™ profile.
Optimizations:
   The Website Consumer
      Improve content on MySpace™ or Bebo™ when viewed by the owner of the Meta-Profile based on content from the entire Meta-Profile (serve content based on the identity of user viewing the page).
   The Website Publisher
      Improve content displayed on the MySpace™ or Bebo™ profiles of the Meta-Profile by optimizing content based on the Meta-Profile they both belong to.

Section I.I: Application of Meta-Identity and Meta-Profile Information-Demographics Applications The System can harness the information provided by Meta-Profiles by offering the ability to profile or target populations of users based on cross-site demographics.

Figure 52:
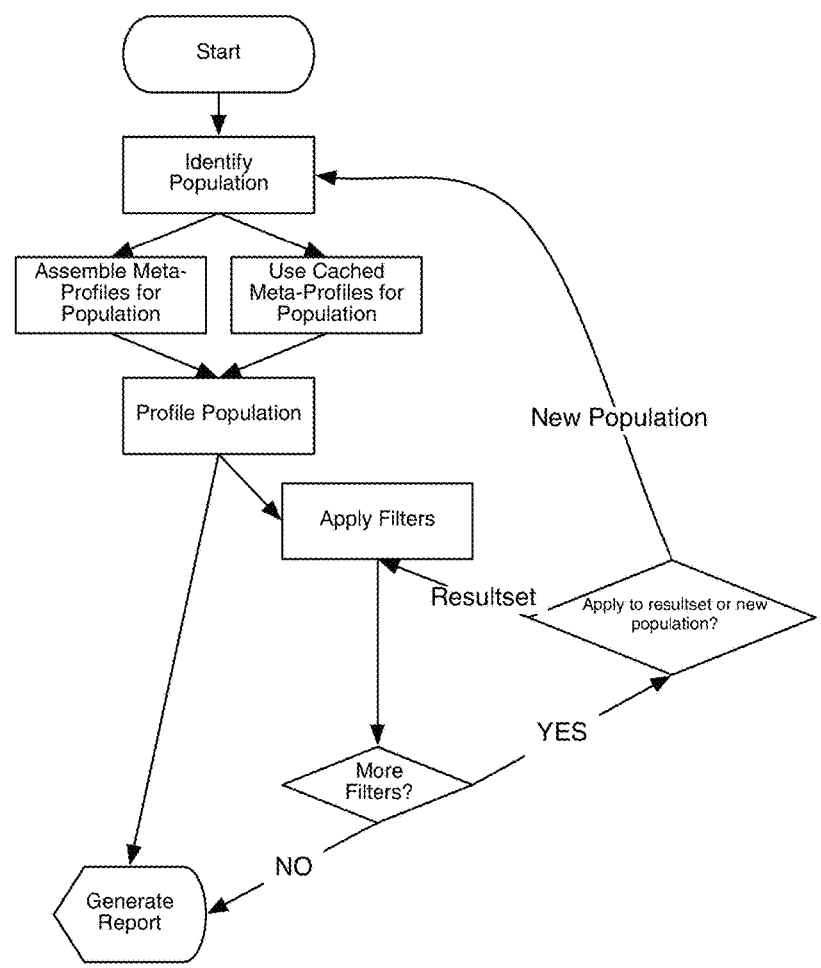
FIG. 52 illustrates Demographics Reporting on a Set Population.

Demographics reporting on a set population allows The System to take a population (such as members of a given social network or affinity group, users of a certain application, any cross-section or subsets thereof), and create detailed demographics reports that address the full-breadth of their identities, associations, profile information and content/activity across networks. This allows for an application or group that does not track or ask its own users for demographics-profiling data to access this sort of data on other networks and applications, and generate demographics reports on it. This is illustrated in FIG. 52.

Figure 53:
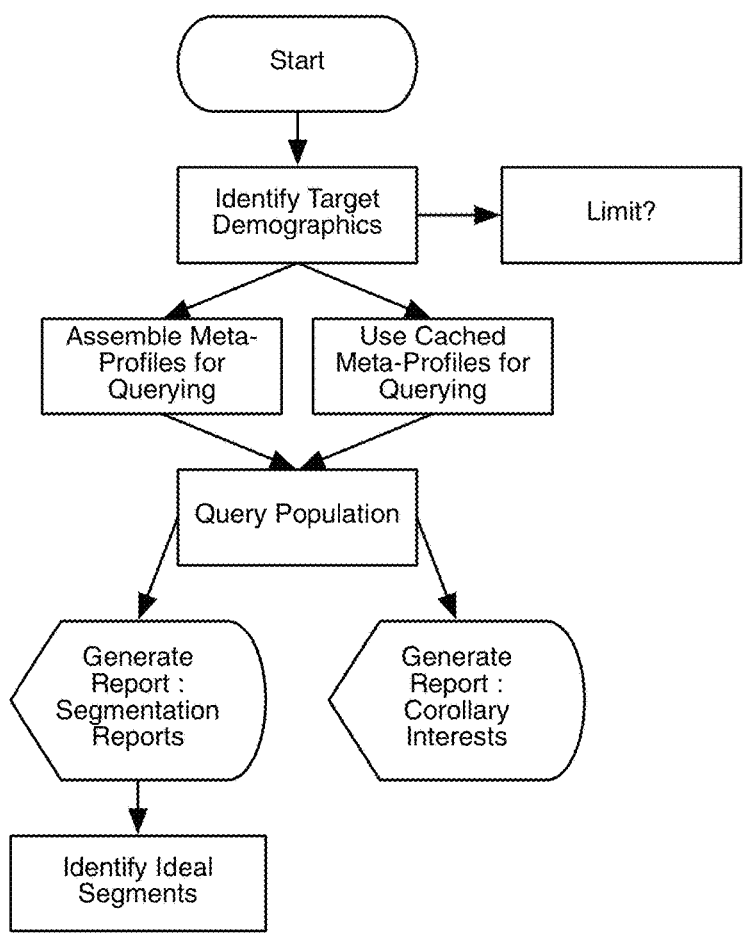
FIG. 53 illustrates Demographics Reporting to Target a Population.

Demographics reporting can also be used to target a population, as illustrated in FIG. 53. This allows The System to use cross-network Meta-Profile data to identify populations, and generate reports of corollary interest or segment into groups. For example: this sort of demographics profiling would allow a Soft-Drink company like Coca-Cola™ to find out the most popular music bands or candy bars with their own consumers, and optionally limit these groups to certain markets or other criteria (i.e. show the most popular bands among Coca-Cola™ fans in the Northeast US, and the Southwest US). Once cross-network Meta-Profiles are identified, they can be segmented into groups such as region, social network/account activity or others. This essentially allows for usage patterns to be analyzed for optimized media-buying efficiency. "Media Buy" is an industry term for the purchasing of advertising space (print, billboard, tv, radio, internet, etc). If a certain Social Network charges $10 for a set amount of advertising, The System can find similar demographically profiled users—or the same exact users—on different networks/applications, some of which may charge less money for the same amount of advertising.

When compiling demographics reporting, The System can also utilize "usage metrics" of the websites and profiles to better calculate the scope and efficacy of likely population exposure. Usage Metrics alert The System as to how often an identity or group of identities utilize a certain network or service. They may be provided by:
  The System tracking member activity across networks through the use of:
    Cookies
    Parsing profiles or APIs for account activity (login status)
    Pass-through information from partner networks
    Third party information brokers
    Other means
  Partner Systems may alert The System of user activity by:
    Bulk reporting of user activity
    API access to user activity
    Pass-through information
    Other means By integrating usage metrics, The System avoids suggesting media-buys on networks where the targeting is correct, but there is little chance of population exposure because of abandonment or limited use.

Network Analysis Example

Given:
  Social Network MySpace™ charges "$10 for 1000 advertising impressions" ($10 CPM) or "50¢ per click" (50¢ PC).
  Social Network Friendster™ charges "$5 for 1000 advertising impressions" ($5 CPM) or "10¢ per click" (10¢ CPC).
The System will:
  Analyze the two networks for overlap of users, using both site profiles and Inter-Site Meta-Profiles. MySpace™ may have more subscribers who claim "snowboarding" as an interest on their profiles, but their may be a significant overlap of the same subscribers on the Friendster™ network, who did not add that information to that specific network. Friendster™ would offer a more cost-effective purchase for targeting that population.
  Analyze targeted identities (by keywords on the 2 networks above) to suggest cheaper or more effective campaigns. There could be a comparable overlap of the Friendster™/MySpace™ snowboard fans on multiple smaller sites that offer better ad placement and efficiency at a competitive pricing, value, or increased click-rate. The System can recommend that an Advertising Campaign purchase 2 million impressions on 10 smaller websites instead of 1 large one—factoring in the costs of advertising on each network, the breadth of population exposure, and the likelihood to create a referral (click) or conversion (click+action) on an ad placement. For example: An advertisement may cost $10 CPM for a large network and $5 CPM for a smaller—and both offer the same frequency of exposure by the population, and similar click-rates—so the $5 CPM is more efficient. An advertisement may also cost $10 CPM for a large network and $20 CPM for a smaller network—but the smaller more-expensive network will result in substantially more referrals and conversions, making it the more efficient buy.

ADDITIONAL DESCRIPTION OF THE DRAWINGS

FIG. 1

The Internet and modern Social Networking Applications are not limited to the confines of a single network or service—but are instead complicated by a multitude of services. FIG. 1 illustrates this: The System tracks both Intra-Personal and Inter-Personal relations, classifying the connections between online accounts/identities as being Inter-Personal or Intra-Personal. This unique indexing method allows The System to traverse the global social graph across networks—showing how people are related to one another in the real world. The applications of this data range from simple address-book functions to "Six Degrees of Separation" tools that can contextualize online content into real human relations—showing how people are truly connected to one-another, content, and originators across networks.

In FIG. 1, we see a matrix of 4 identities:
  Adam
  Bob
  Chandler
  David
and six popular social networks/applications:
  Facebook™
  Flickr™
  Friendster™
  LiveJournal™
  MySpace™
  YouTube™

The identities of these 4 individuals are plotted across the networks. The identities of each persona across multiple networks are said to be Intra-Personal relations:
  Adam is 111 on Friendster™ and AAA on LiveJournal™
  Bob is 2 on Facebook™, 222 on Friendster™, BBB on YouTube™
  Chandler is CCC on Flickr™, 3 on MySpace™

David is DDD on Flickr™, DDD on LiveJournal™, 4 on MySpace™

As we can see on the graph, not every user is on every network.

We can interpret the friendship/contact data of these networks to show Inter-Personal relations:

Chandler & David are friends on Flickr™
Adam & Bob are friends on Friendster™
Adam & David are friends on LiveJournal™
Chandler & David are friends on MySpace™

By offering some address-book features, The System is able to offer user-subscribers the ability to list explicit cross-network connections, such as:

'Adam on Friendster™' may list that he knows 'Bob on Facebook™'—even though Adam does not have an account on Facebook™.

The System is able to take all of these discrete points on the graph, and traverse Inter-Personal and Intra-Personal relations, and derive other implicit cross-network connections, such as:

'Adam on LiveJournal™' knows 'David on LiveJournal™', 'David on LiveJournal™' is 'David on MySpace™'; therefore 'Adam on LiveJournal™' knows 'David on MySpace™'— even though Adam does not have an account on MySpace™

'Adam on LiveJournal™' knows 'David on LiveJournal™', 'David on LiveJournal™' is 'David on Flickr™', 'David on Flickr™' knows 'Chandler on Flickr™'; therefore 'Adam on LiveJournal™' knows 'Chandler on Flickr™' through David on LiveJournal™/Flickr™—even though Adam does not have an account on any of the same networks as Chandler.

FIG. 2

Relationships between people (Inter-Personal) are not always bi-directional—one person can claim someone to be a close friend, the other claims them to be a mere acquaintance or can't even remember the first person. When The System calculates probabilities of any 2 identities being related to one another as facets of the same person (Intra-Personal), the result is often scored with a probability.

Figure 2:
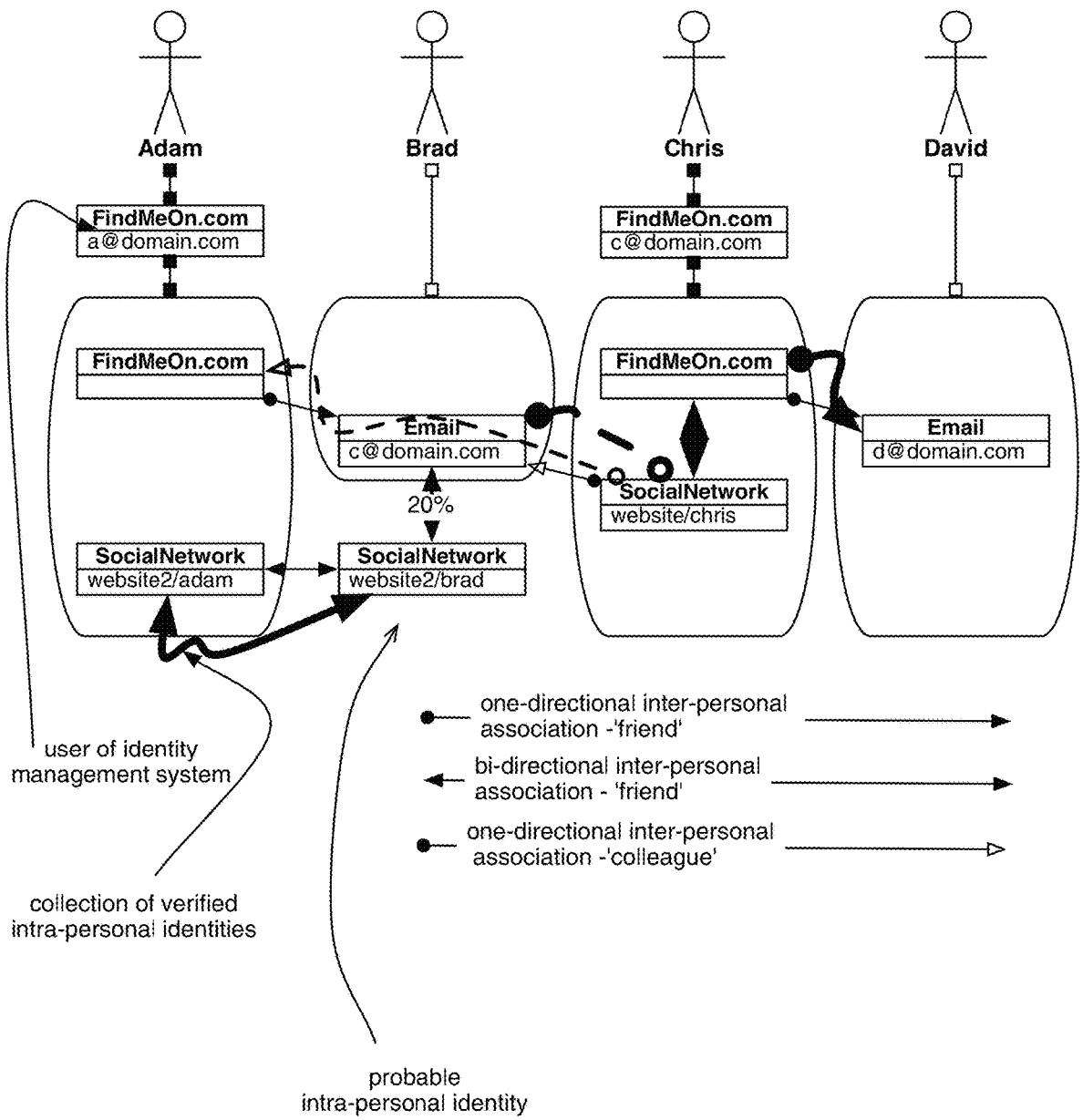
FIG. 2 shows a user of The System related to 3 claimed Intra-Personal related identities, 2 of which have been verified. In addition to relating the user to the identities, the identities are related to one another as well, along with a score reflecting the likelihood of them representing the same identity.

FIG. 2 shows 4 people, some of which have accounts with The System (operating in this diagram as FindMeOn™).

Adam
Brad
Chris
David

Adam is a user of The System, and is Intra-Personally related to a social network account "website2/adam" Adam claims to have as a friend Brad (c@domain.com), which has not been verified by the other party. The System reports that there is a 20% probability that c@domain.com and the social network account "website2/brad" belong to the same person—and there is a verified bi-directional Inter-Personal association between "website2/adam" and "website2/brad".

Chris is a user of The System too, and is related to a social network account "website/chris". Chris has listed d@domain.com as a friend. Much like Adam, Chris' account "website/chris" lists c@domain.com (Brad) as a friend.

In this figure, we can trace a pattern of relation chains from Adam all the way to David—even though the two are not friends directly, there are verifiable and probabilistic links between them and others who are connected via Inter-Personal relations.

FIG. 3

Figure 3:
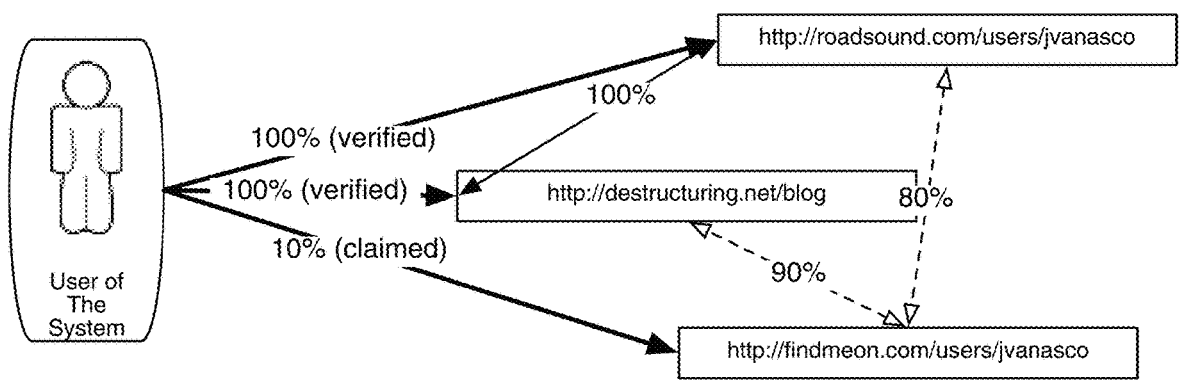
FIG. 3 shows online identities with Inter-Personal and Intra-Personal relations. Identities do not necessarily have to be related to a user of The System nor must they be related to a human being. Complex chains develop as Inter-Personal and Intra-Personal relations are traversed.

The System calculates the probability of Intra-Related identities through a variety of means. FIG. 3 shows a user of The System who has claimed 3 online identities with The System, but only verified 2 of them—therefore The System has awarded a 100% likelihood of match to the verified identities, and only a 10% match to the identity that was merely claimed. Using a variety of analysis tools & methods on the identities & identity data, designed to better understand identities of non-system users, in this diagram The System was able to calculate a 100% likelihood of matching between the 2 verified identities, and a 90% and 80% likelihood of matching between the identity that was merely claimed with each of the verified identities. This illustrates that identities do not necessarily have to be related to a user of The System, nor must they be related to a human being—they could represent entities, or be related to nothing other than other identities.

FIG. 4

Figure 4:
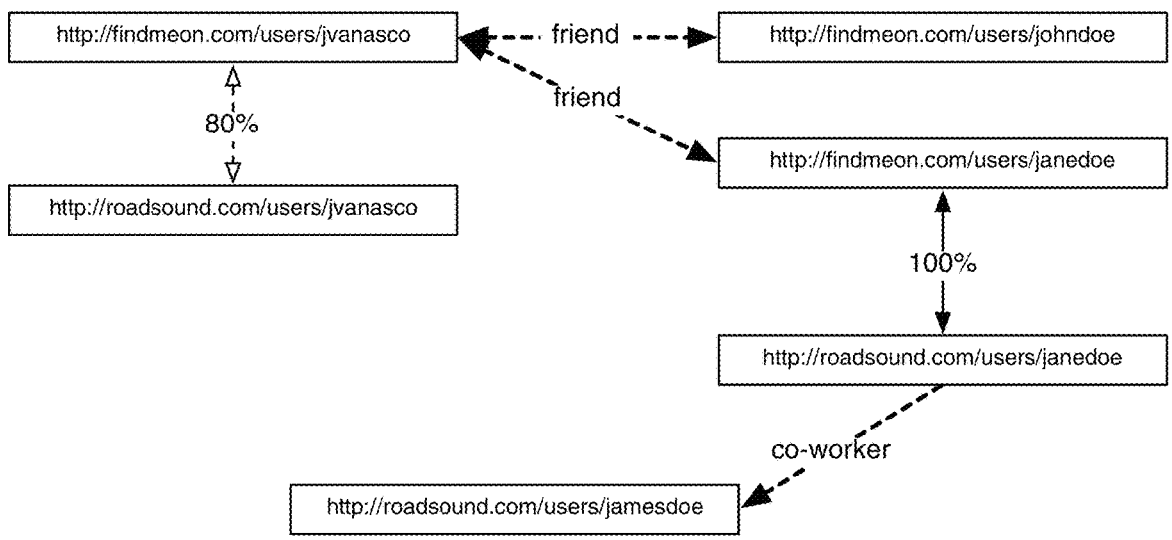
FIG. 4 shows multiple identities related to users of The System and users of the Internet at large, as well as connection chains between them.

FIG. 4 illustrates a case-study of connection chaining using predictive elements of The System along with tracked/indexed public inter-personal connections.

The System has predicted an 80% Intra-Personal match between the identities "http://findmeon.com/users/jvanasco" and "http://roadsound.com/users/jvanasco"

The System is tracking a "Friend" qualified Inter-Personal relation between "http://findmeon.com/users/jvanasco" and http://findmeon.com/users/johndoe
http://findmeon.com/users/janedoe The System has predicted a 100% Intra-Personal match between "http://findmeon.com/users/janedoe" and "http://roadsound.com/users/janedoe"

The System is tracking a "Co-Worker" qualified Inter-Personal relation between "http://roadsound.com/users/janedoe" and "http://roadsound.com/users/jamesdoe"

FIG. 5

Figure 5:
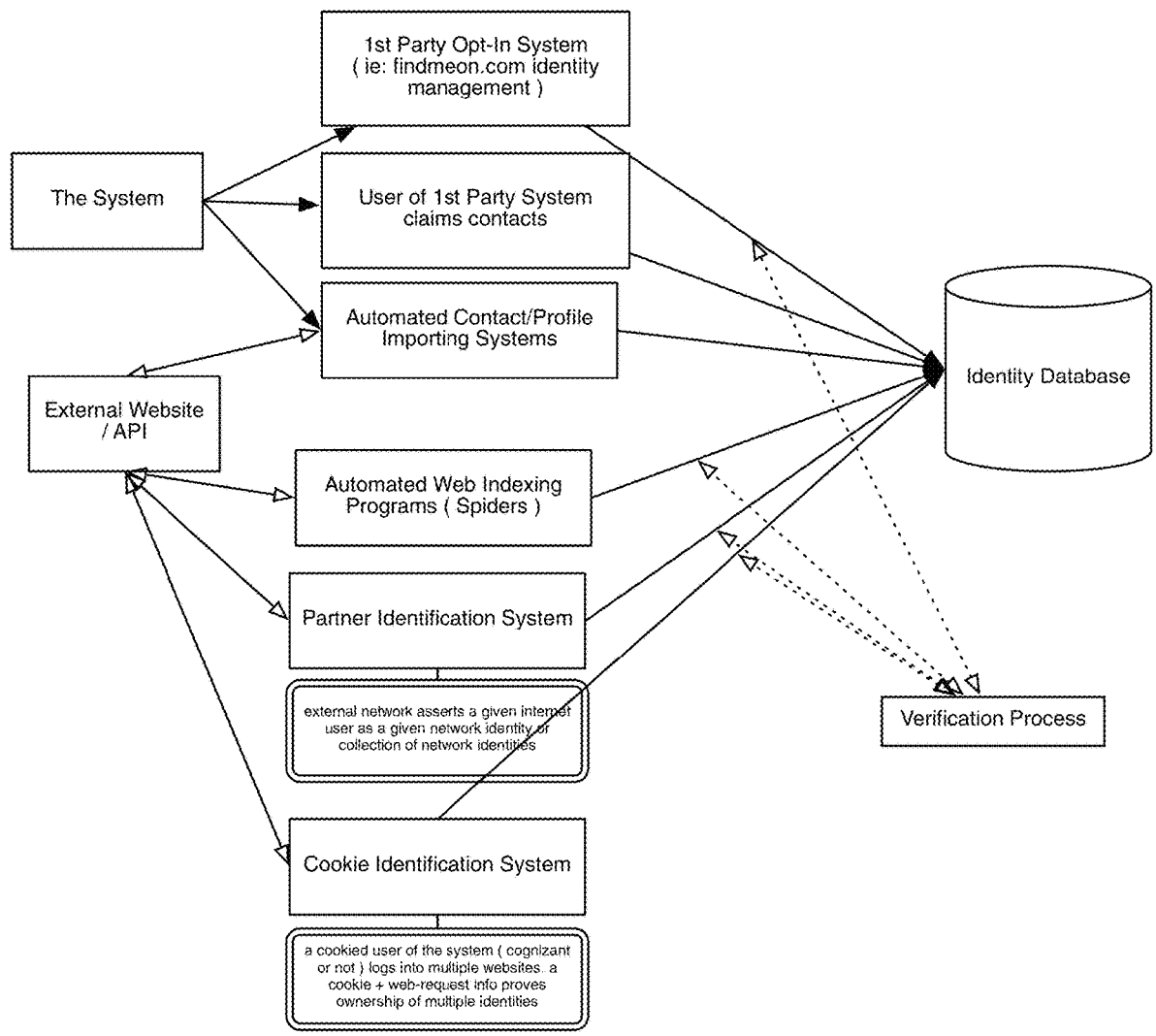
FIG. 5 illustrates a server system for identity indexing & discovery according to a present embodiment of the invention.

The System uses a variety of means to index, verify and track online identities. FIG. 5 illustrates how complex this process can be.

In order to populate the identity database The System itself will utilize:

An Open-In System for users to enter in their own information (such as an Identity Management system, which ultimately fuels a global identity database).

Mining and Indexing of Inter-Personal contacts listed/claimed by users of The System.

Automated Contact/Profile importing systems that parse identity and contact information of identities known to The System, further expanding its knowledge base.

The System also works with external Websites & APIs to grow its database:

Automated Contact/Profile importing systems that spider the internet at large.

Partner Identification Systems where external network asserts a given internet user as a given network identity or collection of network identities.

Cookie Identification System where a cookied user of The System (cognizant or not) logs into multiple websites. A cookie+web-request info proves ownership of multiple identities.

These various methods offer The System both an opportunity to learn about more identities, and a chance to verify Intra-Personal connections between identities.

FIG. 6

Figure 6:
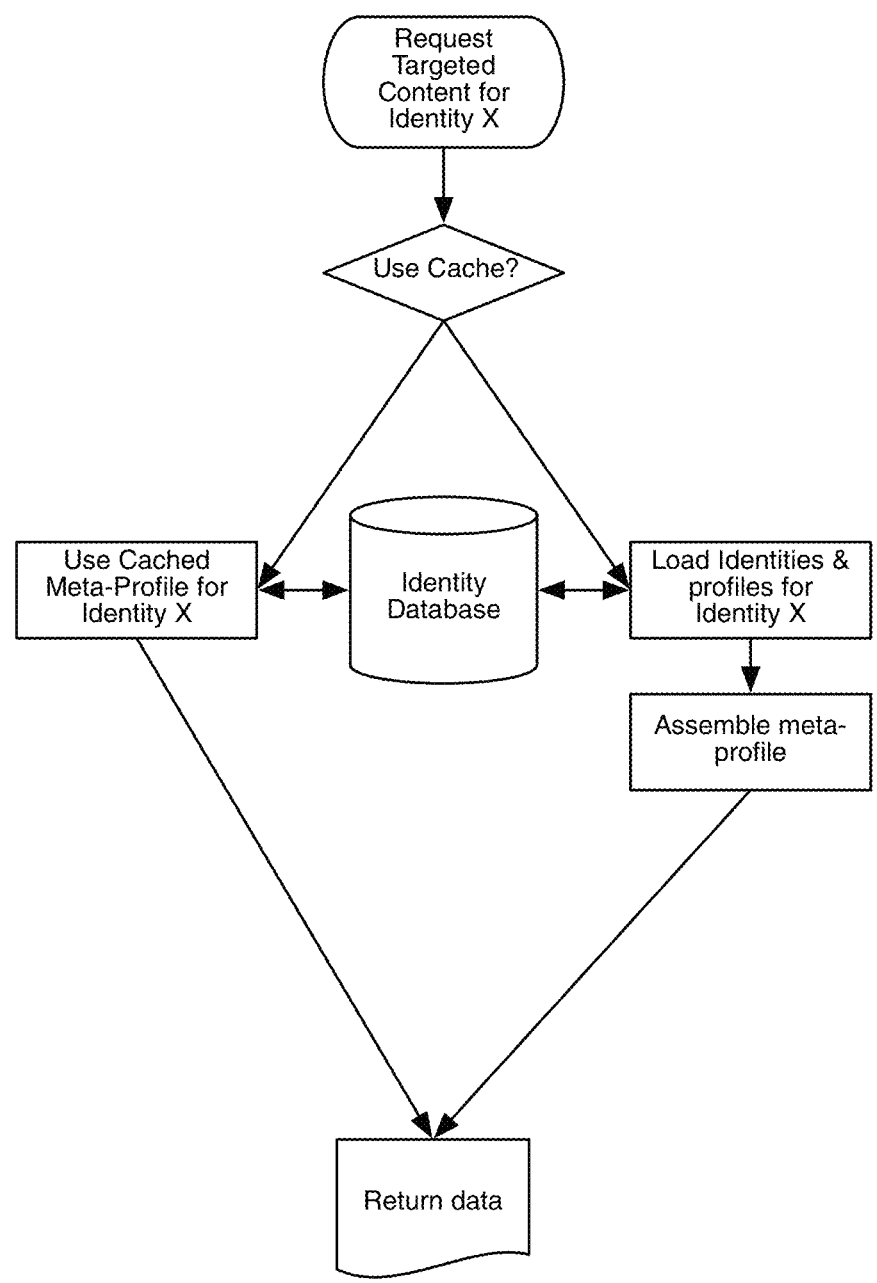
FIG. 6 illustrates a method of requesting targeted content.

In its most basic format, The System is able to serve targeted content quite efficiently as illustrated in FIG. 6. When The System receives a request for targeted content for a certain identity, it decides if it should use a cache or not. This could be a preconfigured default value or be influenced by the query or other factors (depending on time, or parameters specifying the use of a cache or live data or many other factors). If The System uses a cache, it checks to see if there is cached Meta-Profile information for the given identity, and defaults to a live query otherwise. When using a live query, The System loads Identities & profiles for the given identity to assemble a Meta-Profile of their identity information and optionally activity. The Meta-Profile is culled from:

Opt-In user information

Previous 'hints' of The System to relating Intra-Personal identities

New analysis of possible Identities that are Intra-Personally related, based on The System's algorithms which analyze identities and networks

FIG. 7

Figure 7:
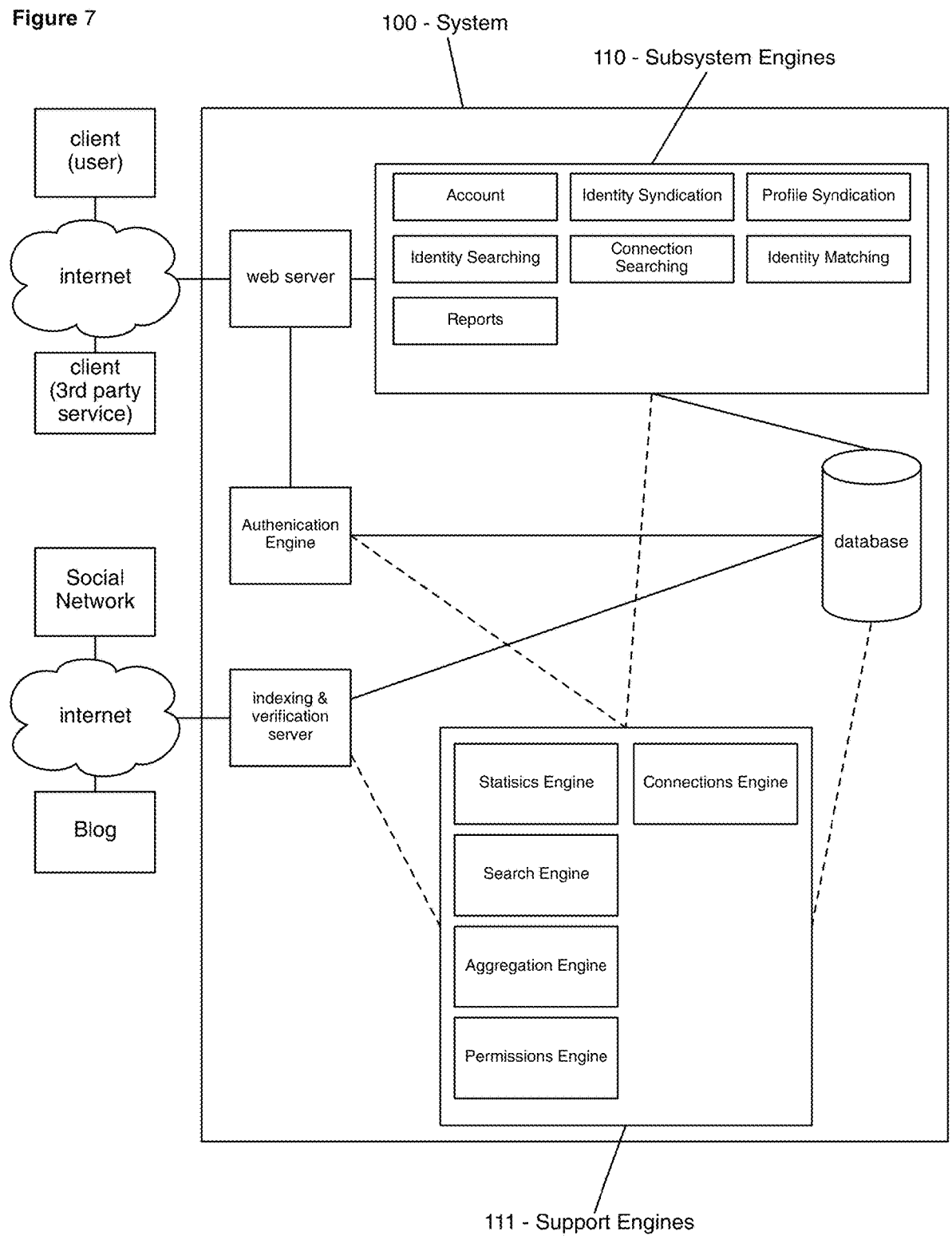
FIG. 7 illustrates a client-server system according to a present embodiment of the invention.

FIG. 7 illustrates a client-server system according to a present embodiment of the invention. The System (100) is connected to the internet via a web-server that clients such as users and $3^{rd}$ party services can interact with. The webserver interacts with various subsystem engines that interact with the database, such as Accounts, Reports, Identity Searching, Identity Syndication, Connection Searching, Profile Syndication, and Identity Matching. The webserver also interacts with the Authentication Engine, which accesses The System's database. Support engines such as Statistics, Search, Connections, Aggregation and Permissions interact with The System's database, and an indexing/verification server which can interact with media on the internet such as Social Networks and blogs.

FIG. 8-9

Figure 8:
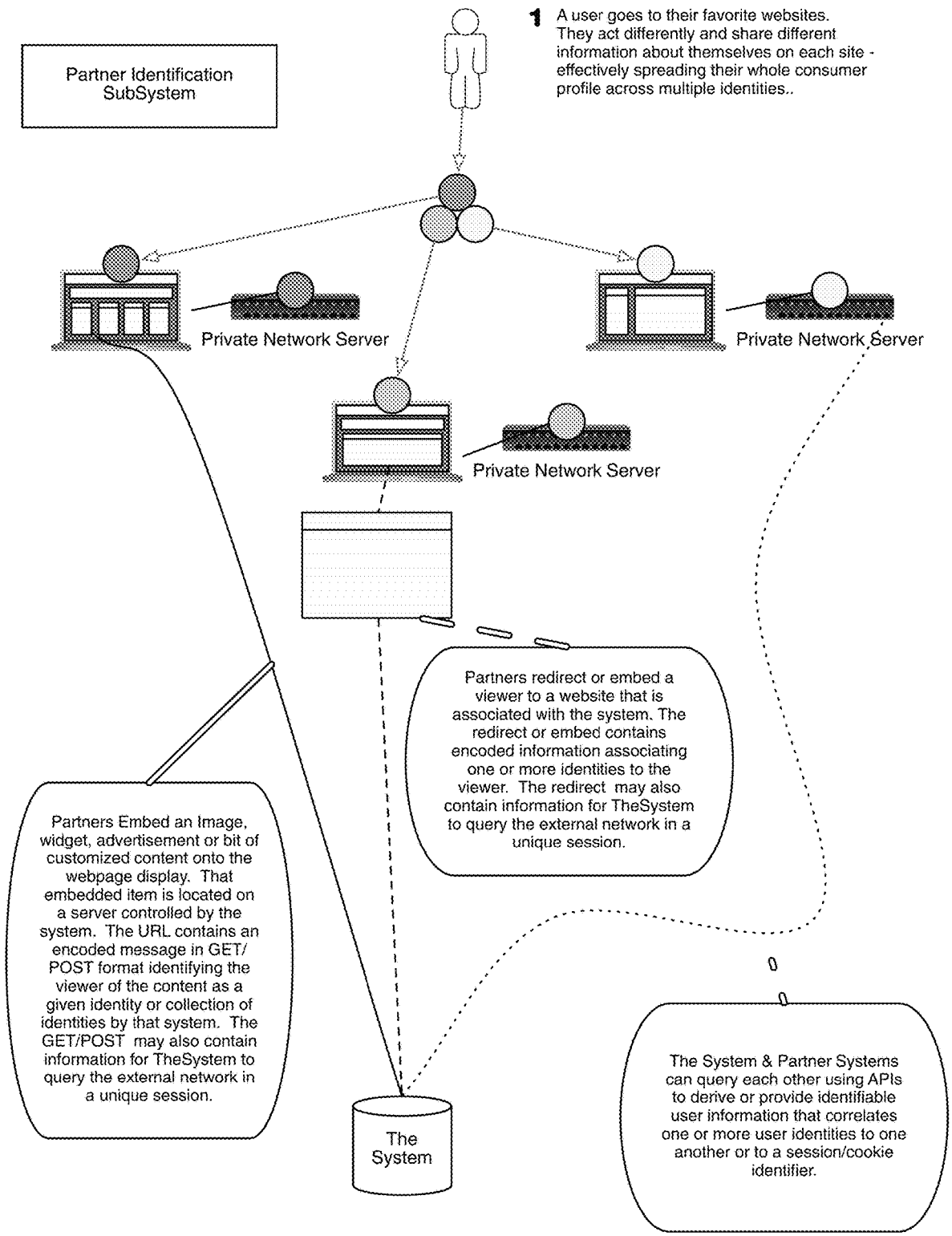
FIG. 8 illustrates the partner identification subsystem.

The Partner Identification Subsystem uses the help of partner networks and applications to correlate Intra-Personal identities to one another. In FIG. 8 we see an internet user visiting multiple websites and applications operated by partners. Partner identification can occur through a variety of means:

Partners embed an image, widget, advertisement or bit of customized content onto their webpage/application display. That embedded item is located on or accessed through a server controlled by The System. The URL used to fetch content contains an encoded message in GET/POST format identifying the viewer of the content as a given identity or collection of identities by that system. The GET/POST may also contain information for The System to query the external network in a unique session.

Partners redirect-a-viewer-to or embed-a-content-display-frame-of a website that is associated with The System. The redirect or embed contains encoded information associating one or more identities to the viewer. The redirect may also contain information for The System to query the external network in a unique session.

The System & Partner Systems can query each other using APIs to derive or provide identifiable user information that correlates one or more user identities to one another or to a session/cookie identifier.

Examples of the methods this system uses are illustrated in depth in FIG. 9, which shows a flowchart of user & partner activity in relation to The System.

FIG. 10-11

The Cookie Identification Subsystem uses cookies—unique client-side identifiers that are submitted with internet requests by web browsers, Flash™ Plugins, and other applications—to track user activity across networks and correlate multiple identities to one another.

In FIG. 10, A user visits either The System, an External network that partners with The System, or a website that embeds media (advertisement, image, custom content, widget, etc) offered by The System or an associated partner. This event creates a user cookie or session identifier that is accessible to The System.

On subsequent visits to The System, an External network that partners with The System, or a website that embeds media offered by The System, The System can correlate identities associate identities associated with the cookie/session to new identities. New identities are formulated by:

partner site information pass through url analysis.

In the case of URL analysis, The System can analyze the metadata associated with embedded content to derive identity information. For example, the HTTP referrer header media is requested with contains the URL of the page it is shown on. For many social networks and identity-oriented sites, the URL for a user's own profile differs drastically from the URL of others and contains a network identifier—thereby providing The System with information needed to accurately identify and index the user within the HTTP referrer header. FIG. 11 illustrates the logic behind this derivation in flowchart form.

FIG. 12-16

Figure 12:
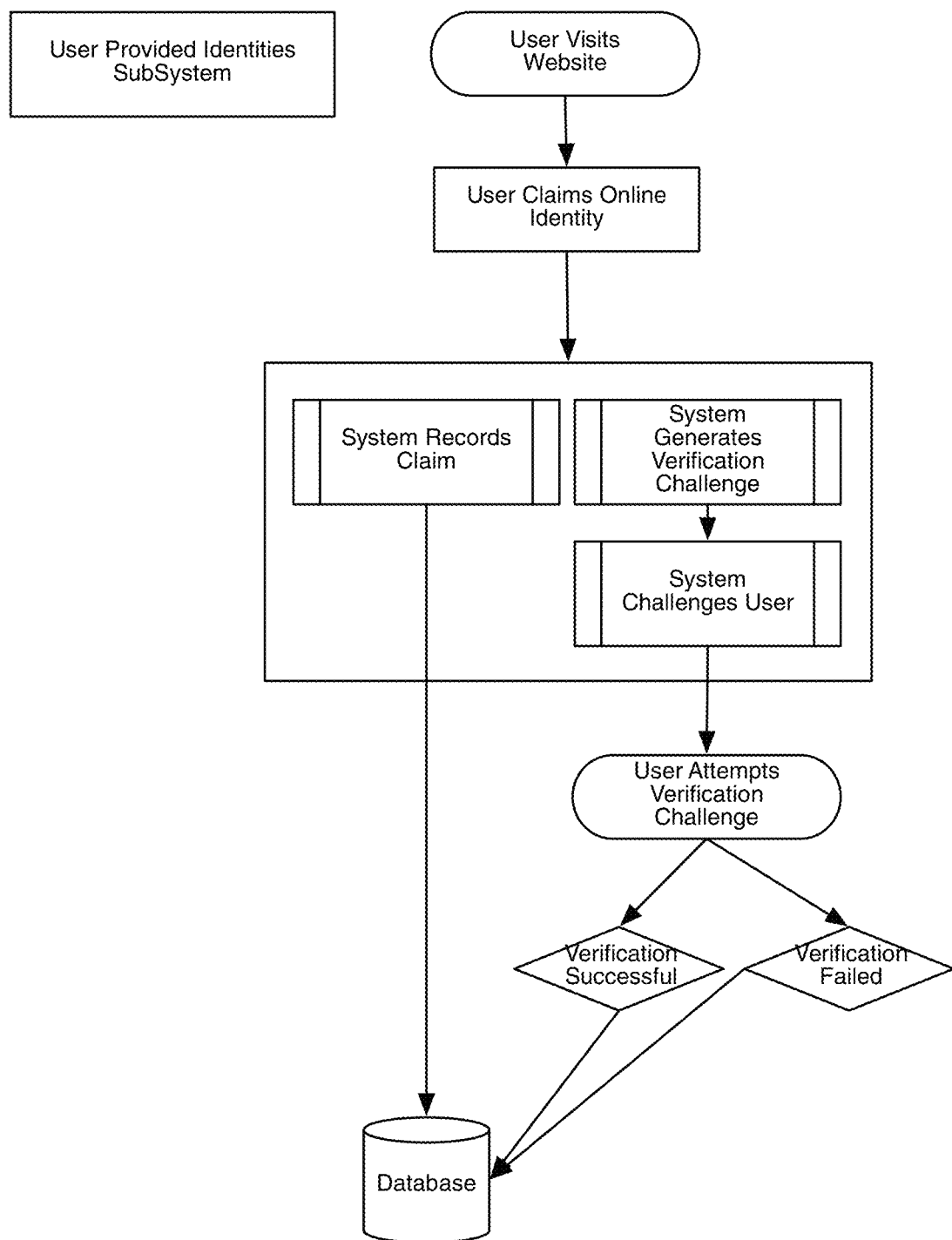
FIG. 12 illustrates the user-provided-identities subsystem.

The User Provided Identities subsystem is illustrated in FIG. 12. When a user visits a website operated by The System, they are offered the opportunity to initiate this subsystem by claiming an online identity as their own. When this occurs, The System records the claim in its database, and uses this both for the consumer-tools offered to the user, and for various analytics performed by The System. The System will also generate a challenge for the user to verify ownership of the claimed account, and present them with the challenge—this could be in various formats such as (but not limited to):

Embedding unique text/code on a website

Clicking a unique link emailed or instant-messaged to an account

If the user can successfully complete the challenge, then the claim is recorded as verified. If the user fails to complete the challenge within a specific amount of time, it can be recorded as a failed attempt and the user is notified.

Figure 13:
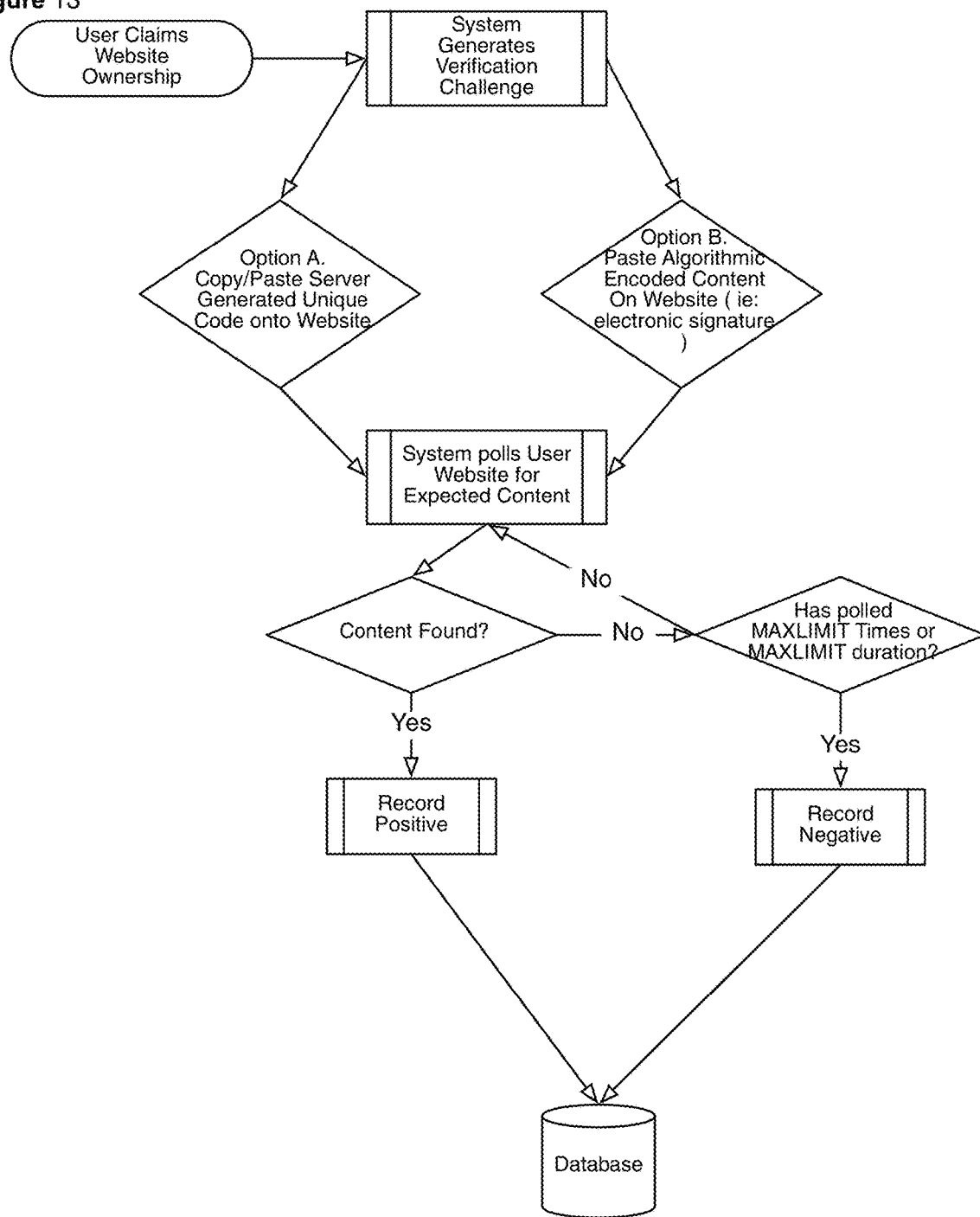
FIG. 13 illustrates the user-provided-identities subsystem when a user claims website ownership.
Figure 14:
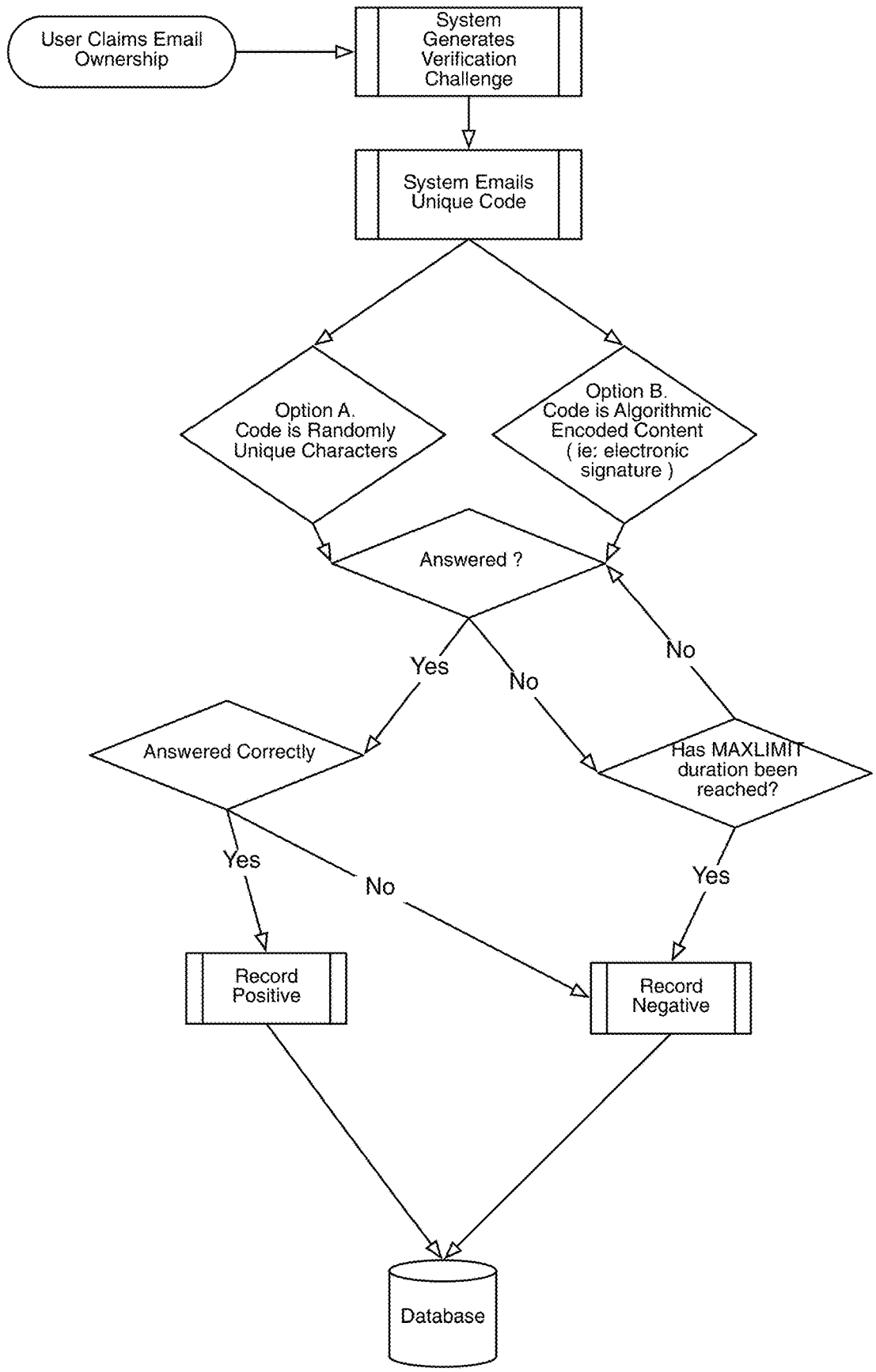
FIG. 14 illustrates the user-provided-identities subsystem when a user claims email ownership.

FIG. 13 illustrates the functionality behind a website ownership claim After The System has challenged the user, it starts to poll/visit the website in question. If the expected content (correct challenge response) is found, it records a positive verification. If the content is not found, then it will keep polling the external website at configurable intervals for a configurable amount of times. If the maximum limit of attempts or attempt-timing is reached, then a negative verification is recorded. FIG. 14 illustrates a similar functionality for an email ownership claim.

Figure 15:
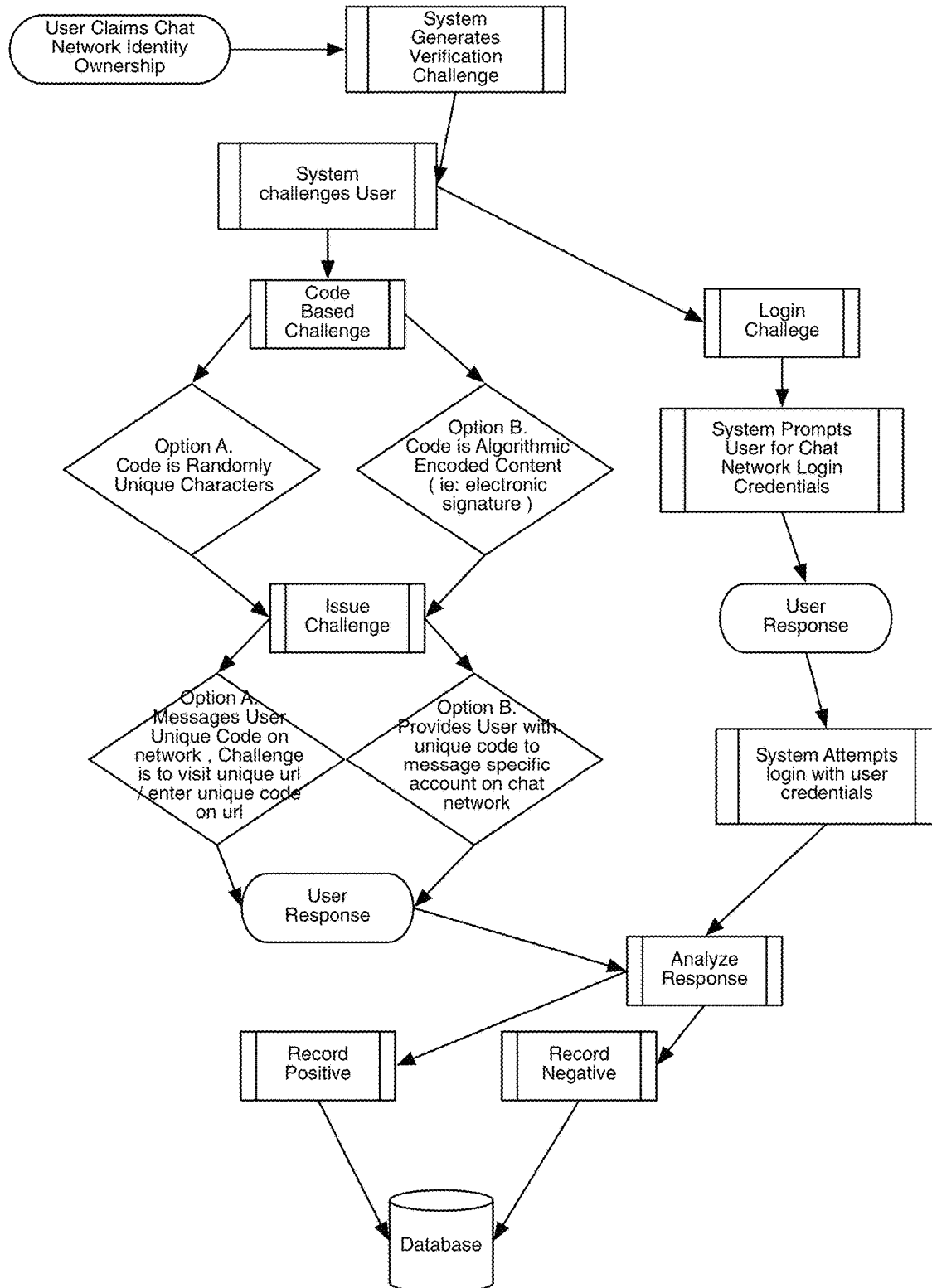
FIG. 15 illustrates the user-provided-identities subsystem when a user claims chat network identity ownership.

FIG. 15 illustrates the functionality behind a chat-network ownership claim Once a user claims ownership of a instant-messaging account, there are two primary ways of proving ownership:

a—a login based challenge, where the user provides The System with the login credentials (account identifier & password), and The System attempts to log-in to the chat network;

b—a code based challenge, where a user is issued a bit of unique text, and must either message The System the unique text through their chat-account, or The System sends their chat-account a unique message that either contains a code or a URL to visit which will prove their control of the account.

Figure 16:
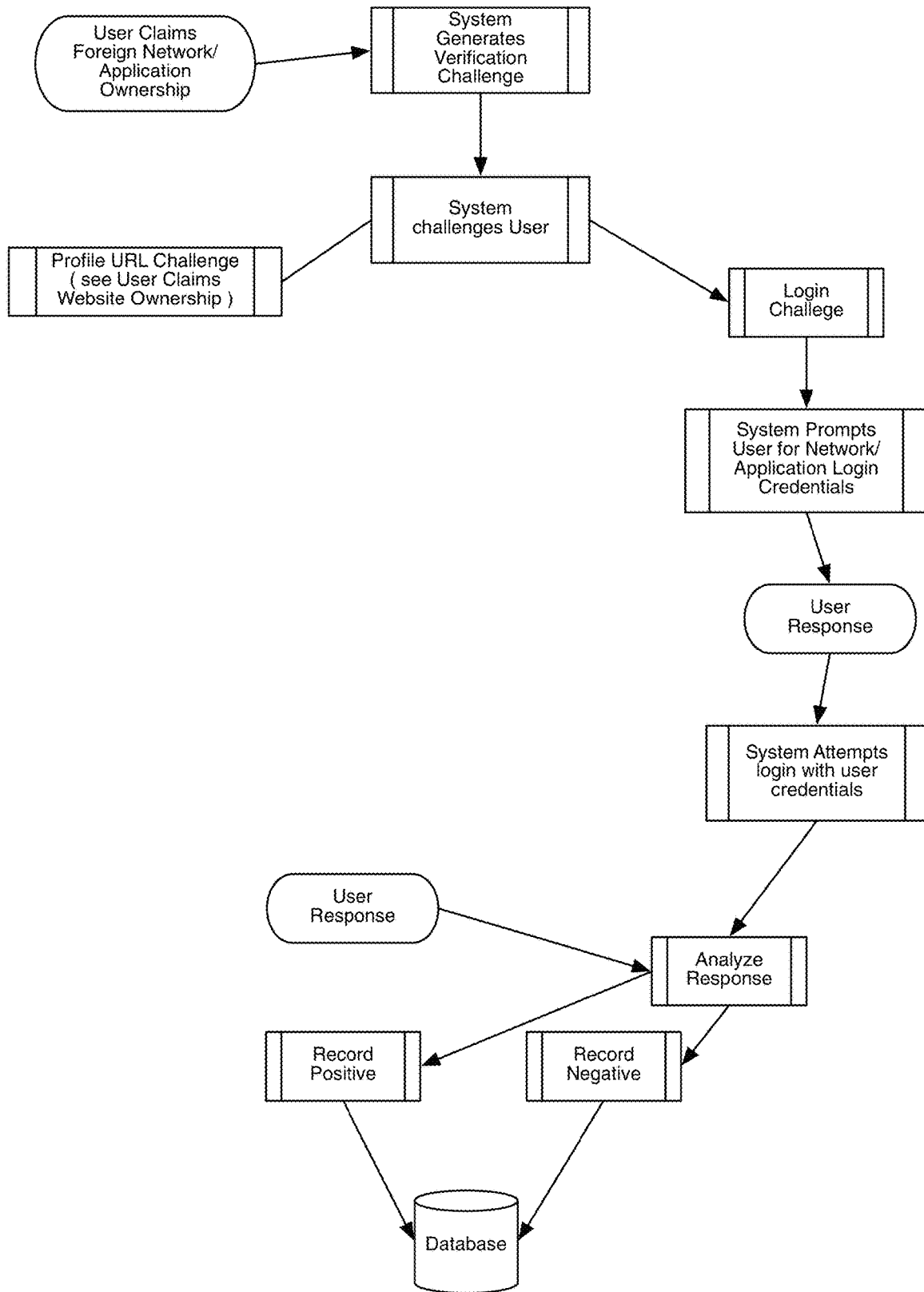
FIG. 16 illustrates the user-provided-identities subsystem when a user claims foreign network/application identity ownership.

FIG. 16 illustrates the functionality behind a foreign network/application account ownership. Under this scenario, The System may either use a Profile URL challenge as described in regards to a website ownership claim, or a login-based challenge (as described in the chat-network claim), where the user provides The System with the login credentials (account identifier & password), and The System attempts to log-in to the external network/application.

FIG. 17, 61-64

The Rapid Registration subsystem allows users of The System to quickly register for new accounts on $3^{rd}$ party websites, as illustrated in FIG. 17. The subsystem works by assigning user-subscribers unique identifiers to their account, which they may provide to $3^{rd}$ party websites in order to query The System for limited amounts of information. The unique identifiers offer no profile or identity information on their own, but are assigned to Adam within The System to expose information to new services as he desires. By using unique identifiers with limited amounts of information, The System is able to help a user register for a new service, without showing the full scope of their online identities or profile information.

Figure 58:
FIG. 58 is a screenshot of a Rapid Registration partner website.

For example:

Adam decides to sign up for the website RadioRequest.com using the Rapid Registration system that The System offers through FindMeOn.com On the RadioRequest.com registration page, Adam's browser displays a "Rapid Registration" option (FIG. 58).

Adam clicks the "Rapid Register" button and is redirected to a website on The System (FIG. 59) which shows the Rapid Registration keys available to Adam, and gives him the opportunity to create a new key.

Figure 60:
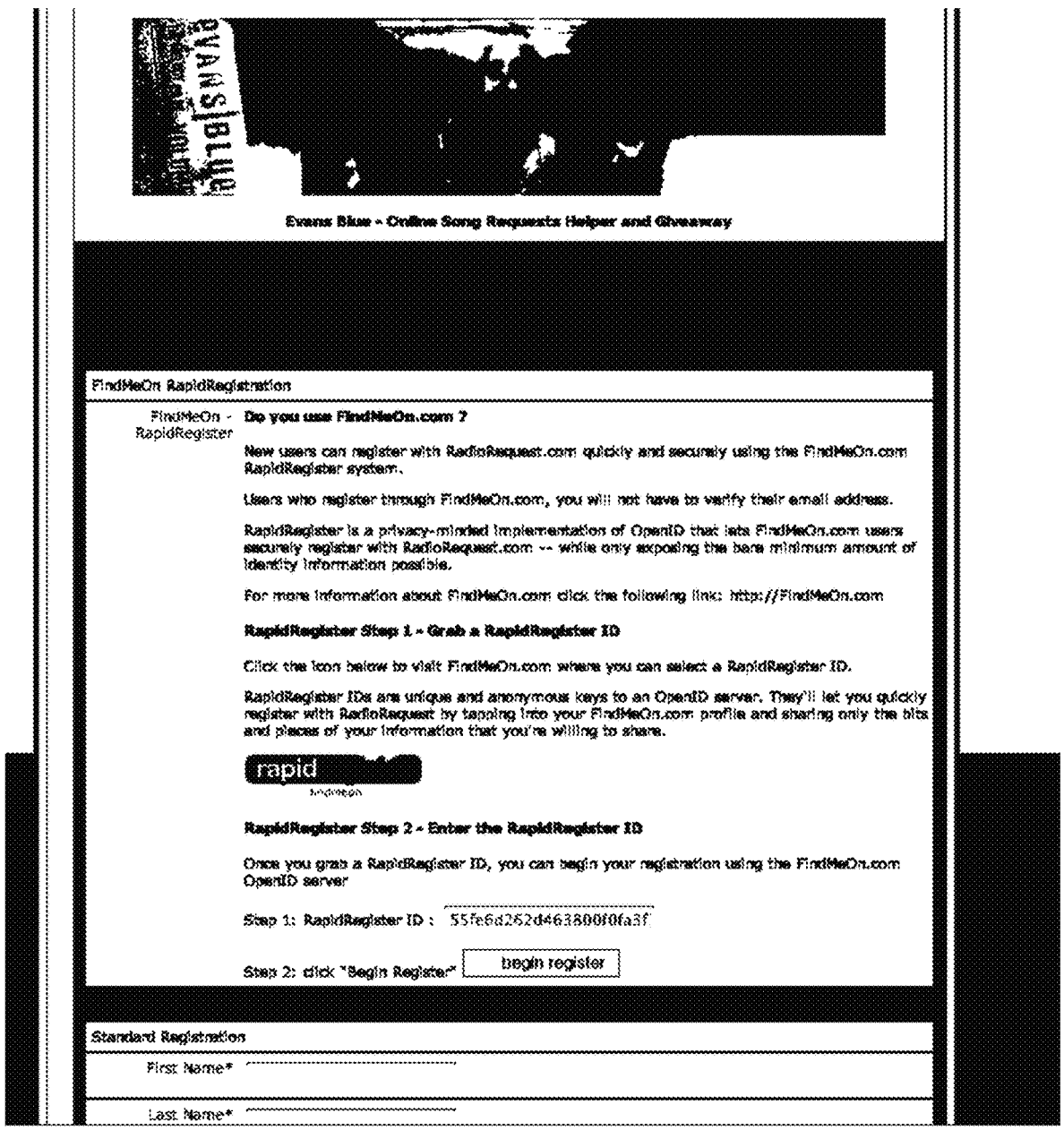
FIG. 60 is a screenshot of a Rapid Registration partner website after processing data from the Rapid Registration subsystem.

Adam decides to use one of his keys, and is redirected back to RadioRequest.com with packaged content that pre-populates the Rapid Registration ID field (FIGS. 60, 21.a)

When Adam clicks "Begin Register", the $3^{rd}$ party system redirects Adam to the OpenID (or other open platform) subsystem offered by The System (FIG. 61). At this point, The System allows Adam the opportunity to select what information to share with the $3^{rd}$ party. Once Adam approves the information transfer, his information is sent to the $3^{rd}$ party website.

The other website may then allow Adam the opportunity to bind his $3^{rd}$ party account with the Rapid Register ID, or a new ID, on The System. This happens by the $3^{rd}$ party system redirecting Adam to a "Quick Listing" page on The System (FIG. 62), and pre-populating one or more fields with information about the account, the $3^{rd}$ party, and the rapid registration key used (if any). Adam may then decide to consume the rapid registration key, turning it into a normal system identifier that can tie-into his other identities & profiles with per-attribute & per-identity privacy controls, or create a new system identifier. Once this happens, The System redirects Adam to the $3^{rd}$ party, provides the $3^{rd}$ party with The System identifier referencing Adam's $3^{rd}$ party account on The System, and optionally digitally signs or hashes the message to verify it (FIG. 21.b).

The $3^{rd}$ party website may then utilize the API subsystem (FIGS. 63-64) to access user information within the permission scopes of the unique identifier.

FIG. 17A shows a quick overview of this process. When a user visits a rapid registration partner, a quick check is performed to see if the user is logged into the rapid registration system. This usually happens with an HTTP cookie or a Flash™ cookie. In the case of an HTTP cookie, the user's web-browser can request content from The System which returns their login status based on their browser cookies. This is often manifested by requesting a line of JavaScript code that sets a variable to represent the login status. Flash™ cookies function similarly to HTTP cookies, but are dedicated to use on the Flash™ media player.

When a user is logged into the rapid registration subsystem, The System will return packaged content that may contain:

whether or not the user is logged in if the user is logged in, optionally return a system identifier for the user if the user is logged in, optionally return a list of available rapid registration ids if the user is logged in, optionally return whether or not the user can create new rapid registration ids If the user is logged into The System, then the website/interface should display Rapid Registration options. Most commonly the options are to:

i. visit the rapid registration subsystem on The System ii. create a new rapid registration id iii. select an existing rapid registration id Embeddable technologies like Flash™ and browser-windows, combined with resizable interfaces and APIs enable $3^{rd}$ parties to offer full rapid registration options to users without leaving their website.

If the user is not logged into The System, the $3^{rd}$ party website can either:

i. offer the user a chance to log-in to the rapid registration subsystem
   a. through a widget
   b. through an API
   C. through a redirect to The System ii. ignore integration with the rapid registration subsystem If the user selects a rapid registration identifier, then the $3^{rd}$ party system is able to initiate a data-exchange with The System to query for select amounts of information. The user is then able to explicitly control which bits of their information & identity can be provided to the $3^{rd}$ party. The use of the rapid registration identifier isolates this transaction from the user's Meta-Identity—as they are not registering for a new service against a public profile or public identifier that can be tied to any online identities.

FIG. 18

The quick listing subsystem allows users and $3^{rd}$ parties the opportunity to quickly list one or more identities with The System by submitting to The System pre-formatted input data that can quicken the listing process. This is often used in conjunction with the rapid registration subsystem, by allowing $3^{rd}$ parties to submit both structured data containing the account information and a preferential system identifier—the identifier used for rapid registration. FIG. 18 shows an overview of this subsystem when used by a third party: once a partner pre-populates the quick listing form data, they can optionally digitally sign the formatted-data to verify its source; the user is then redirected to The System where their login status is checked. If they are not logged in, they are given a chance to do so. If a user is logged in, they may then edit and approve the listing; after confirming the listing, the user is redirected to the $3^{rd}$ party along with an optionally digitally signed confirmation notice.

FIG. 56-57

Figure 56:
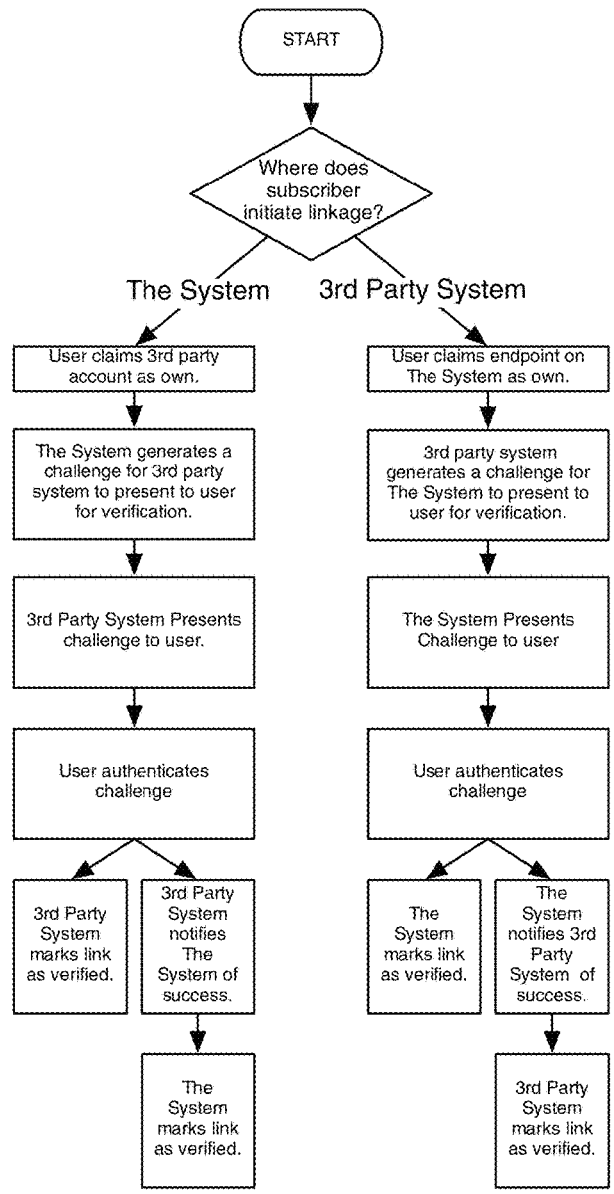
FIG. 56 illustrates Creating a verified link between a subscriber account and a 3rd party system.

The quick listing subsystem is often used to create a verified link between a subscriber account and a $3^{rd}$ party system. We see an example of this in FIG. 56, which illustrates a quick listing initiated by the user either on The System or a 3$^{rd}$ party system. When a user initiates a linkage on The System and claims a 3$^{rd}$ party account as their own, The System generates a challenge for the 3$^{rd}$ party system to present to the user for verification. This is often digitally signed or hashed using a shared secret between The System and the 3$^{rd}$ party system to prove the validity of the request, and the challenge is often a simple "Do you approve of this linkage?" associated with a transaction identifier for The System and the 3$^{rd}$ Party System to note. Should a user authenticate the challenge when presented, the 3$^{rd}$ party system will mark the user's approval, and then notify The System of the approval. This notification is often digitally signed or hashed using a shared secret between The System and the 3$^{rd}$ party system to prove the validity of the request. The procedure works similarly on an inverse, when the procedure is initiated through the 3$^{rd}$ party.

FIG. 57 illustrates an example of this in depth. Once a user of The System claims a 3$^{rd}$ party account as their own, The System redirects the user to the 3$^{rd}$ party system in order to verify the claim The redirection is accompanied with encoded data describing the claim and a digital signature or hash authenticating the message's origination with The System. The 3$^{rd}$ party system then verifies the request via the authentication mechanism, and asks the user to approve the claim Should the user approve the claim, the 3$^{rd}$ party system notifies The System of the approval via an encoded message with an authentication mechanism The procedure works similarly on an inverse, when the procedure is initiated through the 3$^{rd}$ party.

FIG. 19

The System's bi-directional search mechanism for deriving relation chains was designed for efficiency. In FIG. 19.A, we see a single-direction search when trying to derive a connection from identity A to identity B. The single direction search causes an exponential growth of the search area, as every iteration of the search must cover more area before identity B is discovered on the 3$^{rd}$ iteration. A bi-directional search, illustrated in 19.B, creates an overlap of connection-chains using a smaller search area and discovers overlap on the 2$^{nd}$ iteration.

The exact mechanism is illustrated in FIG. 19 proper. When a connection chain for 2 identities is requested, The System loads contacts for one identity, searching for the other; then loads the 2$^{nd}$ identity searching for the 1$^{st}$. If a result is found in either, the process can stop. If a result is not found, then the search areas for each identity are expanding (search areas/fields being their degrees of separation, going from 1° of separation, to 2°, to n°), and overlap is sought between their contacts. Until a configurable depth threshold is reached, The System will continue expanding contacts and contacts-of-contacts, looking for overlap. It should be noted that The System need only expand newly discovered contacts for each Identity; once a contact has been 'seen' by The System in a search, it need not be expanded if encountered again.

FIG. 20

FIG. 20 illustrates the contact expansion mechanism. When The System is queried for contacts of a particular identity (identity A), it may proceed in two ways:

It may load the exact contacts for that identity ("Identity A")

It may load the alias contacts for that identity—i.e. the various identities that are Intra-Related ("Identity A", "Identity AAdam", "Identity A1")

The System builds up a result set by searching for the appropriate contacts and compiling a listing. Once the listing is complete, The System may filter the response based on the requestor's identity & relation to the requested identity, privacy settings implemented by the requested identity, or other reasons.

FIG. 22-30,49

Figure 22:
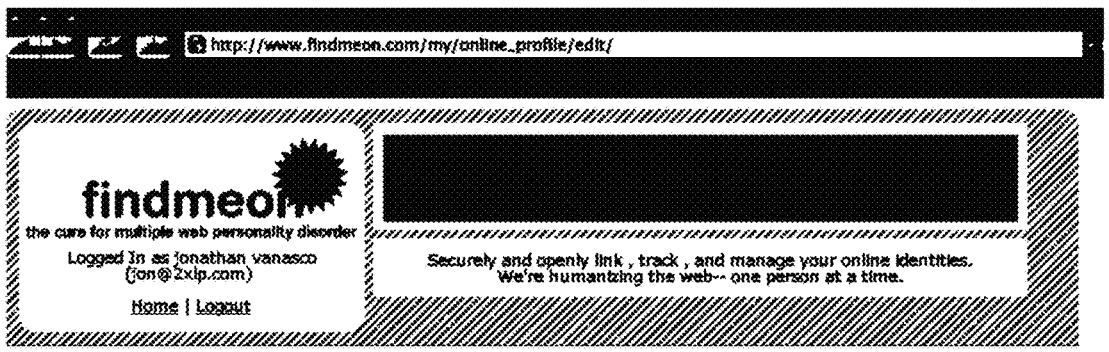
FIG. 22 is a screenshot illustrating the entry of profile data in an embodiment of the invention.
Figure 23:
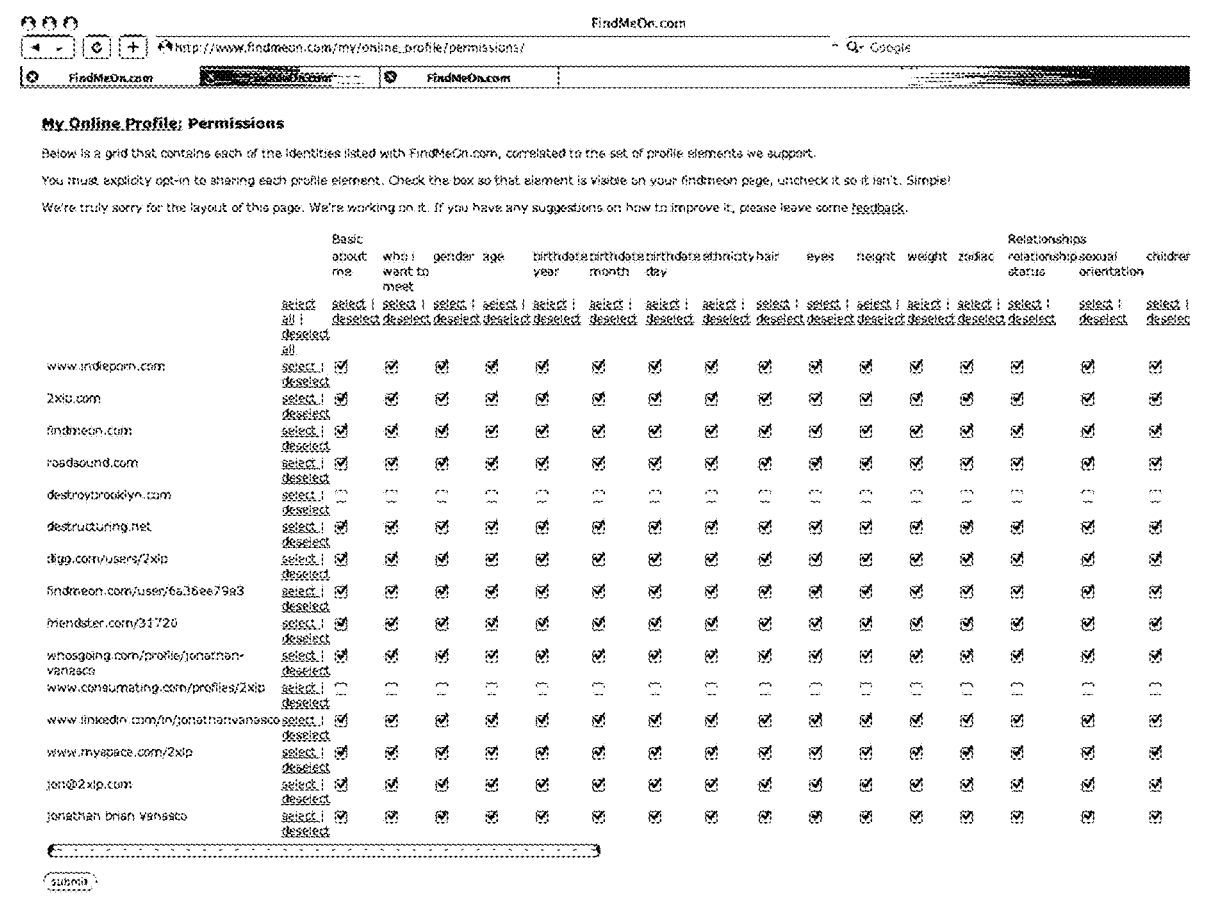
Figure 25:
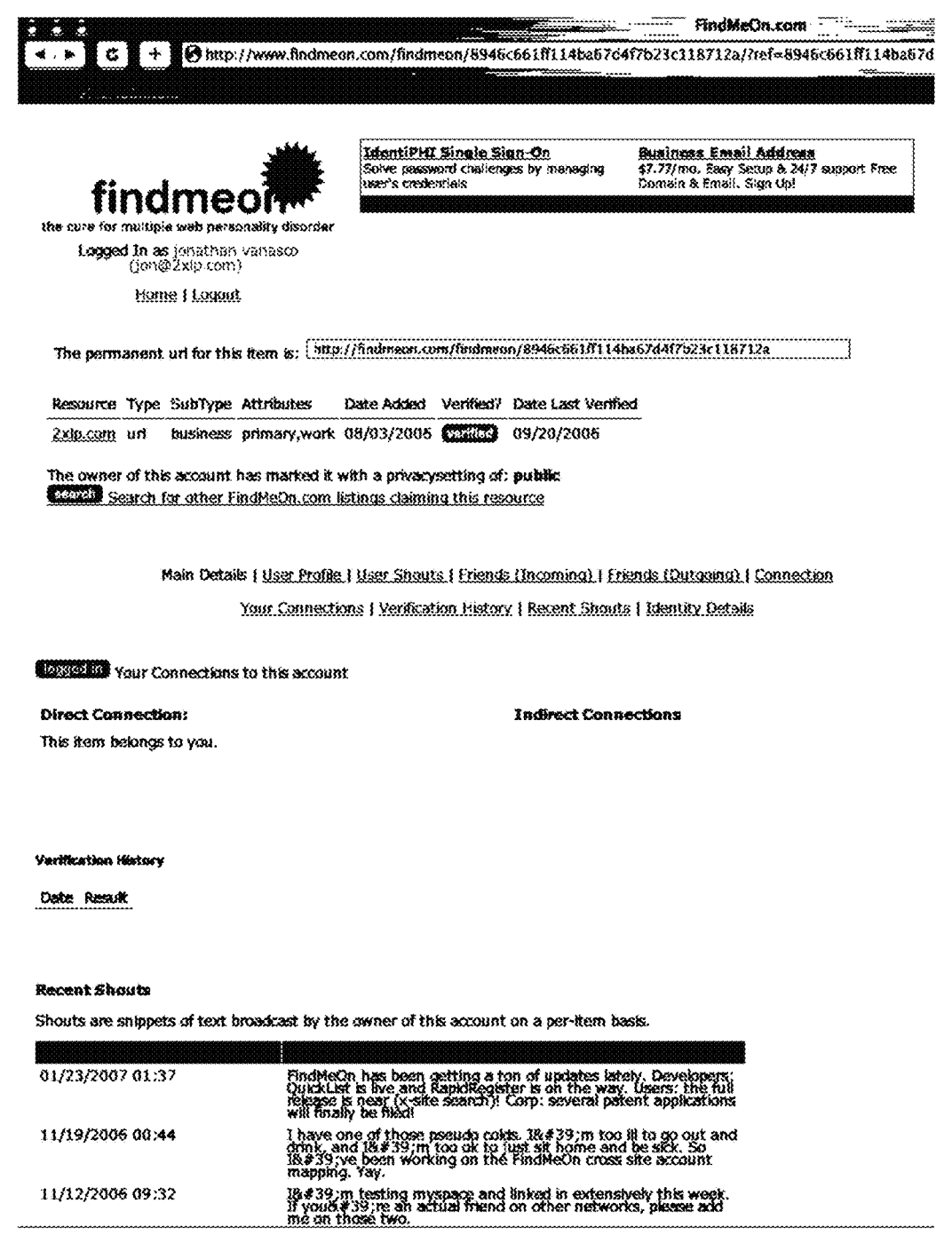
Figure 29:
FIG. 29 illustrates the content syndication widget on an external network.
Figure 30:
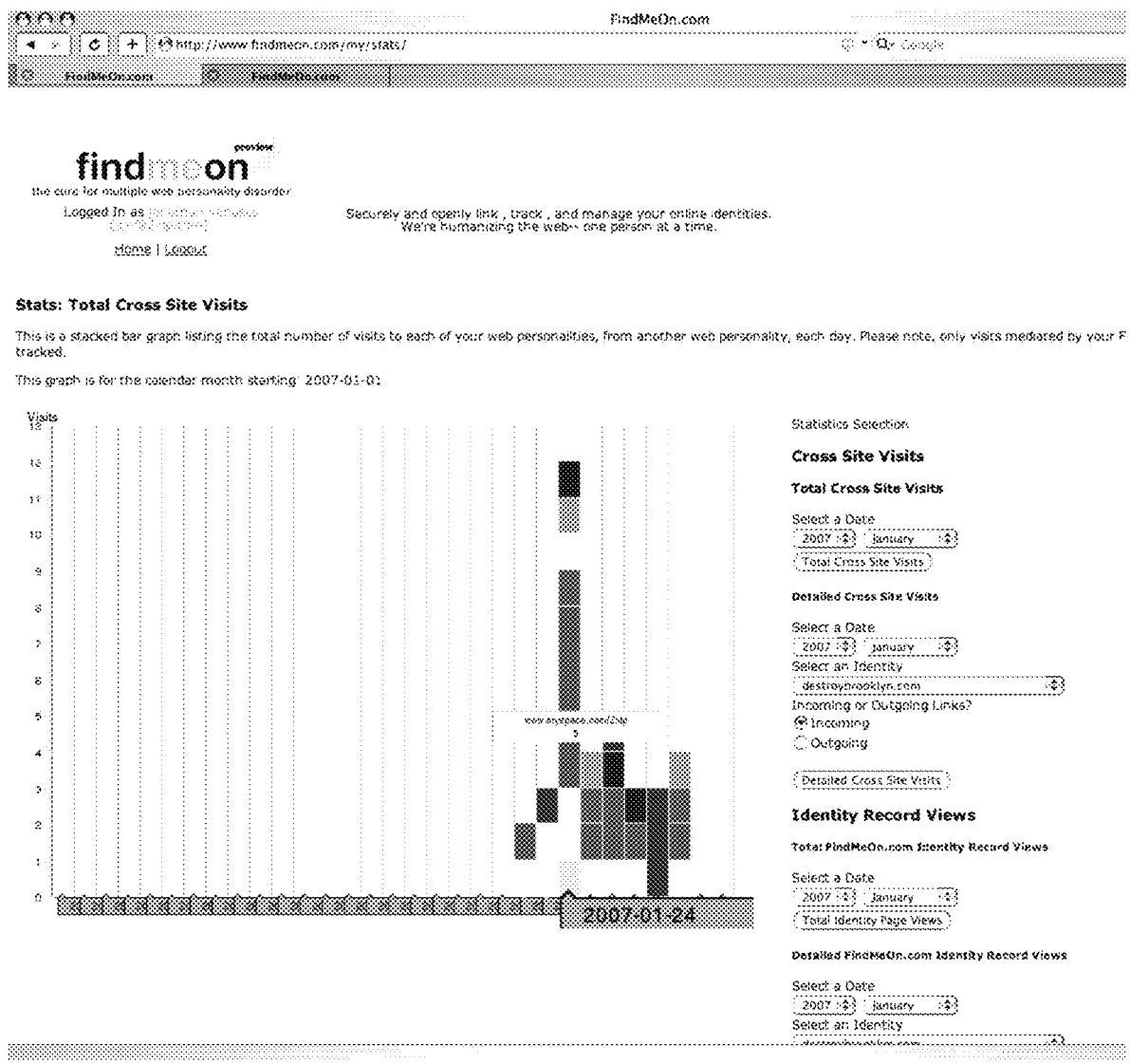
FIG. 30 is a screenshot of an embodiment of the invention showing identity visit statistics and options for a user of The System.
Figure 31:
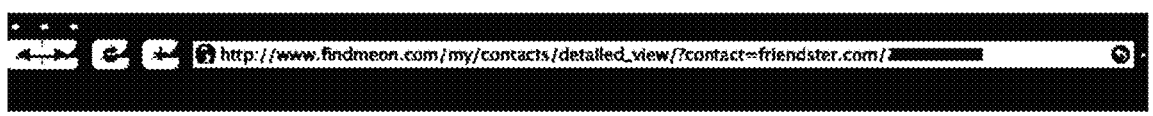
FIG. 31 is a screenshot of an embodiment of the invention showing a spatialized contact. There are options to edit the contact and, should there be any identities with potential Intra-Personal relations to the contact, they would list at the right.

The System can offer users a way to manage their online content & profiles. FIG. 22 is a screenshot illustrating the entry of some basic profile-oriented data—in which users are able to fill out profile fields that are common to a large percentage of identity-enabled systems. In FIG. 24, we see a collection of identities registered with The System by a user-subscriber. Each identity has certain meta-data associated with it (type, subtype, name), and shows verification status and offers a privacy setting. Users are able to view more details & controls abut the identity using the details button, and create widgets through a badge-builder tool. In FIG. 23, we see a mapping of the information fields shown in FIG. 22 against multiple profiles entered into The System by a user-subscriber in FIG. 24. A grid of checkboxes allows the user to specify which profile information to make visible to which networks—giving them fine-grained and incredibly powerful control over their own information. FIG. 25 shows a web-based information-syndication view of one of these identities—including a permanent URL (which contains the unique system identifier used for tracking), the identity details, and various meta-data. We also see a content stream example in the "Shouts" section, where users are able to post or link content that is subject to the same per-identity controls & override rules. FIG. 26 shows a more detailed view of this interface, illustrating the various other identities that are visible to the selected identity through the user-defined privacy settings. In addition to offering meta-data & records of each identity, The System allows public users to search for claims of the identity being viewed. FIG. 27 also shows a more detailed view of the syndication interface. In this instance we see some of the basic profile information being shown, and filtered by The System's privacy settings. Widgets created by the Badge Builder subsystem are illustrated in FIG. 28, where we see a small, medium & large widget. The small widget consumes syndicated identity content, and allows users to display & link to all of their online identities (affected by privacy controls) in a small & clickable interface. The medium widget offers the same link functionality, along with content-stream integration (affected by privacy controls), and a 'your connection' option. The 'Your Connection' option allows The System to derive a connection between the viewer of the badge & the owner of the badge. This requires The System to derive the identity of the viewer—which can either be provided by a browser-cookie if the viewer is a user-subscriber of The System, or through a browser-cookie or parameter embed on the widget media if the 3$^{rd}$ party the widget appears on is a partner of The System. The large widget offers the same functionality of the medium widget, but in a stacked (not tabbed) interface. It also offers some configurable personal information—such as name & location, and can offer any other sort of profile data. FIG. 29 is a screenshot of the medium widget on a MySpace™ page. Here we see the widget has communicated with The System to pull content, and is browsing links that belong to the user. As widgets are viewed and used to query The System to display specific content or to visit links, The System is able to track usage and offer user-subscribers tools to interpret that usage. FIG. 30 is a screen capture of a statistics interface. In this particular interface, we see patterns of visitors moving across different websites belonging to the user-subscriber, and are able to see which generate more traffic for one another each day. Other statistics offered include general usage/visits, and content exposure. FIG. 49 illustrates one of the privacy override mechanisms afforded by The System: a listing of identities entered into The System belonging to a single user, with privacy controls shown from the perspective of user@domain com—a toggle allows the user to always show or always hide an identity in relation to other identities.

FIG. 32-33

Figure 32:
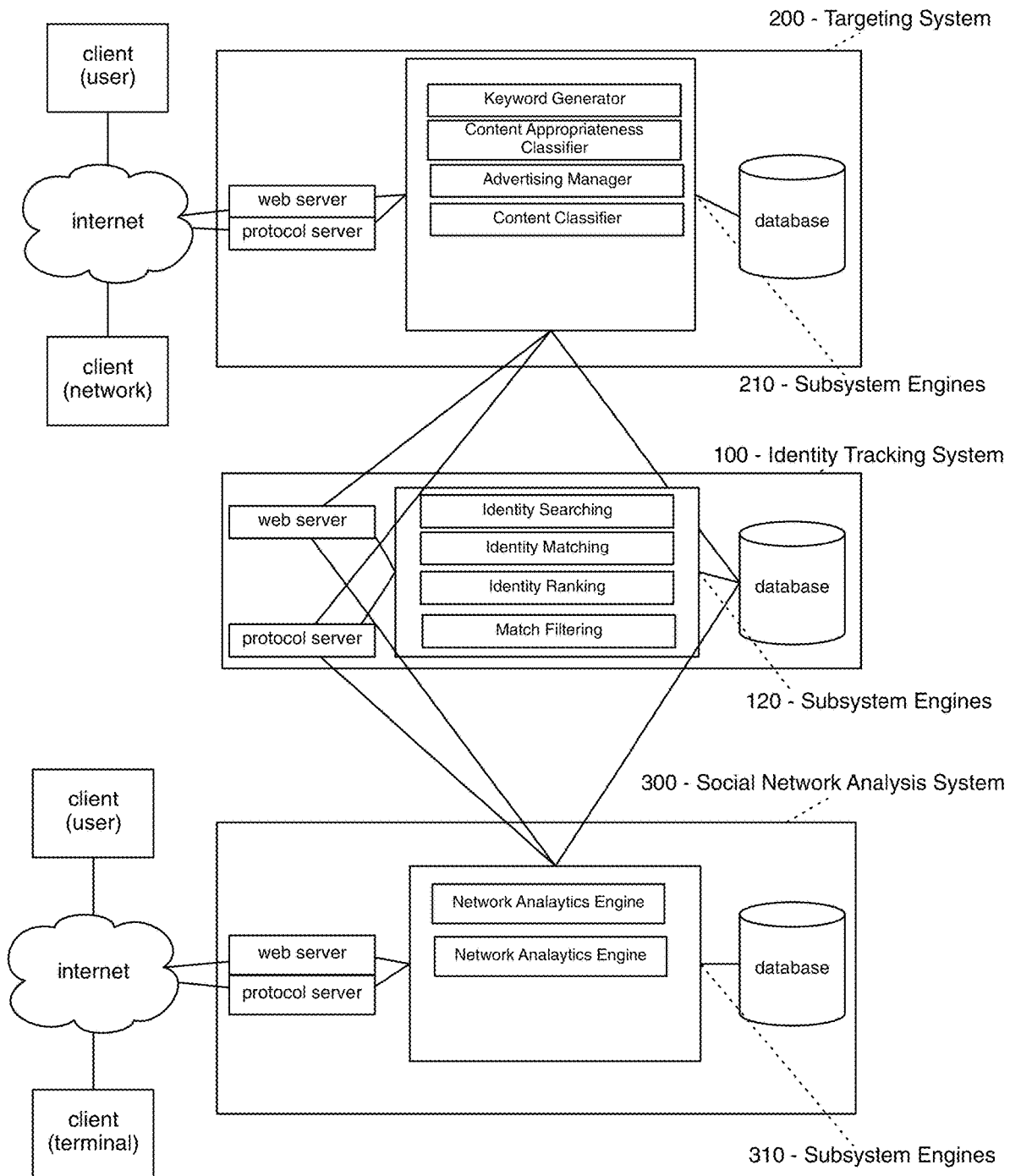
FIG. 32 illustrates a possible embodiment of the subsystem responsible for generating customized content.

FIG. 32 illustrates The System as interconnected components responsible for generating customized content. Item 100 in this drawing is the base Identity Tracking System which contains a web server and protocol server used to interact with subsystems dedicated to Identity Searching, Identity Matching, Ranking Matched Identities, and filtering the lists—which all work off a central database. A social network analysis system (300) similarly contains a webserver and protocol server, which are used to interact with specific components like the network analytics engine, and also the web & protocol servers+database of the identity tracking system. A targeting system (200) is used to serve advertising or advertising optimization Networks & clients interact with this component via a web server and/or protocol server that is connected to the Internet. Subsystem engines including: keyword generation, a content-appropriateness classifier, an advertising manager and a content classifier interacting with the Identity Tracking system to customize content; a local data store is used to cache information & record performance.

Figure 33:
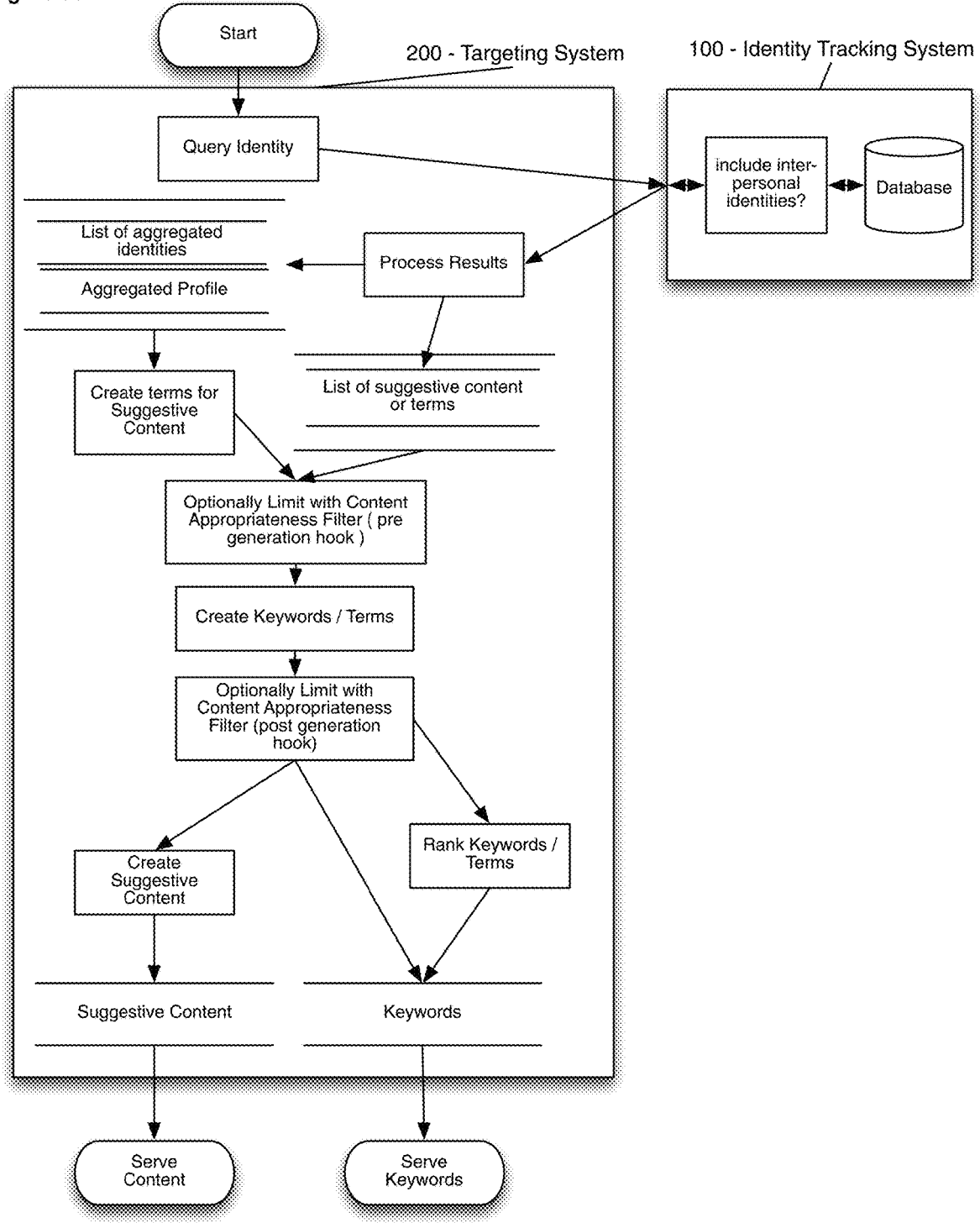
FIG. 33 illustrates a possible embodiment of the subsystem responsible for generating customized content.

FIG. 33 illustrates a potential interaction of this component. When the targeting system (200) is queried for an identity, it queries the Identity Tracking System (100) for identity information. The results can offer either suggestive content/terms directly, or a list of aggregated identities related to the queried identity. If the result is a listing of aggregated identities, it can be turned into an aggregated profile, from which terms for suggestive content are created. At this point, either result set can be limited with a content appropriateness filter, which can use query information or database information to discard irrelevant or inappropriate information, or cancel out conflicting information across the aggregate of profile information. This optionally limited list can then be used to create keywords/terms for suggestive content, and a content appropriateness filter can again be applied to filter these results. The final results may either be used by The System to identify or create & serve customized content, or may served as optionally ranked keywords and terms.

FIG. 34-35

Online profiles offer a rich amount of information. User-profiles on their own show a limited view of an individual or entity, often containing only a fraction of information needed for a consumer profile to be viable for marketing purposes. This is because people share bits & pieces of their online identities on each network, and often tailor their content, mannerisms and activity to each network's own persona. It is not uncommon to find a profile for a user on a large social network that shows a certain brand affinity ("I like to eat chocolate whenever I can"), and a profile for the same user on another network that better refines their profile ("I prefer dark chocolate. I dislike milk chocolate"), or adds new depth ("I like to eat peanut butter"). The System is able to Intelligently Assemble The Pieces of multiple profiles into a Comprehensive Consumer Profile as illustrated in FIG. 34. This illustration shows a complete consumer profile in the center, along with sample main topics of information: music, movies, sports and books. General social networks (illustrated at the left) tend to cover all of these topics. Niche networks (at the right), can often map their information to only one element of a consumer profile. By integrating all of these sources, a rich & comprehensive profile of a consumer can be derived. We are then able to draw conclusions such as:

Is an individual's musical likes limited to their MySpace™ bands, or their top played/ranked tracks on Last.fm™ (an online music service with social networking components)? The best information can result from a combination of claims & habits.

A user doesn't fill in their reading preferences on LiveJournal™, but is a member of the niche reading site Shelfari™. We now know that they're an avid reader.

A user is music-centric on MySpace™, but we learn that they belong to both the NBA™ forums (online forums for the National Basketball Association, where fans converse) and have an account with the NY Yankees™ (online website of the NY Yankees baseball team, where fans congregate).

In FIG. 35, we see how these online profiles can match up with clear examples of completion and amplification. FIG. 35a shows 13 profile elements of a specific entity across 4 identity facets. No single identity shows a complete information profile, but by standardizing and aligning them to one another, we are able to view a fully completed aggregate profile. The second diagram shows a single user's profile across 6 social networks and 7 standardized fields. Every time a field contains a new answer, it amplifies the previous information associated with that user. In this example, 6 of the fields have been amplified 3 times, one field has been amplified 1×. This translates to a broader and more powerful consumer profile for content customization and consumer marketing. FIG. 35c illustrates how social mapping technology assembles the pieces. A full consumer profile is creating by completing the picture and amplifying data. On the left we see an individual who corresponds to 3 circles of personalities across 6 social networks as each network has its personality; people share different information across identity facets. Three-dimensional pie-chart explosions of profile information on each network show areas of overlap and completion. When stacked and looked at top-down, the pie chart is completed.

FIG. 36-39

FIG. 36 illustrates how The System can cull information from multiple websites to create custom content. In this illustration, a user goes to their favorite websites. They act differently and share different information about themselves on each site—effectively spreading their whole consumer profile across multiple identities.

These websites contain
  Advertising Banners & Widgets that provide the hosting server with 'referrer' tags that can be analyzed to show profile ownership. Social Networks can also augment page/asset query-strings with variables to show this data. This data can be correlated across networks through the use of simple cookies.
  Widget systems that give users the opportunity to 'opt-in' and consolidate their identity information.
  These page assets & programs push information into Behavioral and Social Tracking servers operated by The System, and feed The System's Identity Cache/Analytics Servers. The System maintains a database of identity information, when information is necessary it can query the individual networks to receive detailed information. This may come in the form of a user profile—import service, a custom API, or a standard API like the OpenSocial proposed practice.

Eventually this information influences The System's consumer intelligence systems and content customization systems. Future visits by the user to participating networks (or pages that can access system cookies) allow for customized content and ad serving that integrates all facets of the user's identity—displaying info based on a complete consumer profile, not a limited facet.

Figure 37:
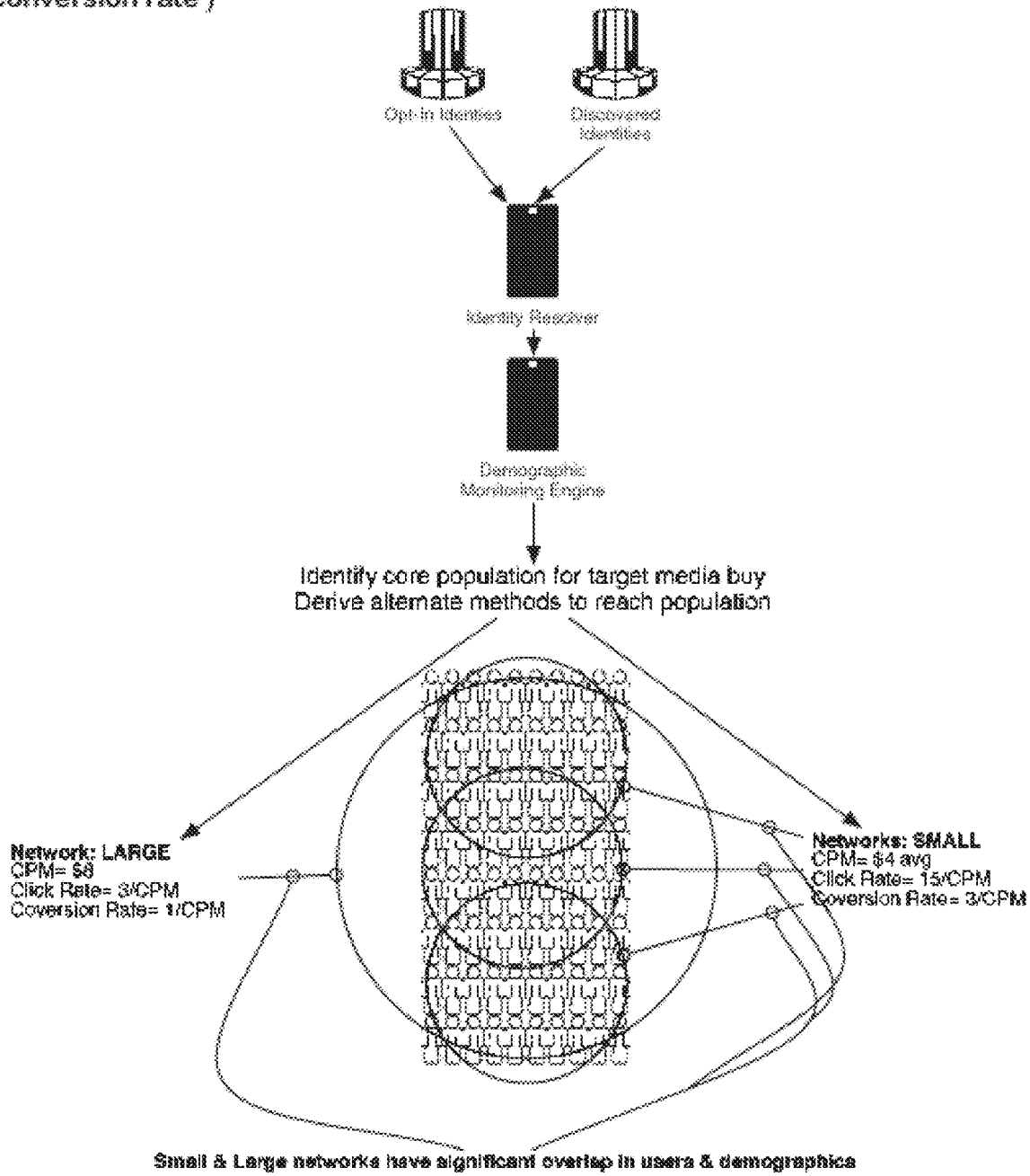
FIG. 37 illustrates an application of aggregated data usage.

FIG. 37 illustrates an application of the cross-network profile data in consumer intelligence—demographics based media buying. In this scenario, The System can influence media buying patters by finding the most efficient ways to engage target demographics (in terms of cost and conversion rate). Identities tracked by The System (both opt-in users and discovered identities at large) are piped through an identity resolver and demographics monitoring engine to identify core populations for target media buys, and to derive alternate methods to reach a population. Here we see a population of users on a large network that charges $8/CPM (cost per 1000 impressions) and has a click rate on ads of 3 people per CPM and a conversion rate (people who clicked the ad performed a task, such as a purchase or registration) of 1/CPM. The System is able to map this same population of users onto 3 small networks, which have a $4 CPM, a 15/CPM click rate, and a 3/CPM conversion rate—providing a clearly more efficient media buy.

FIG. 38 illustrates Advanced Demographic reporting, where the tracking of users across networks allows The System to offer comparative demographic profiling of networks based on cross-site data. This active profiling of social networks allows for accurately identifying groups of consumers across networks with configurable controls, using a basis of verified and predicted identities. In this graphic, we see The System identifying members of a target population on two distinct social networks.

Figure 51:
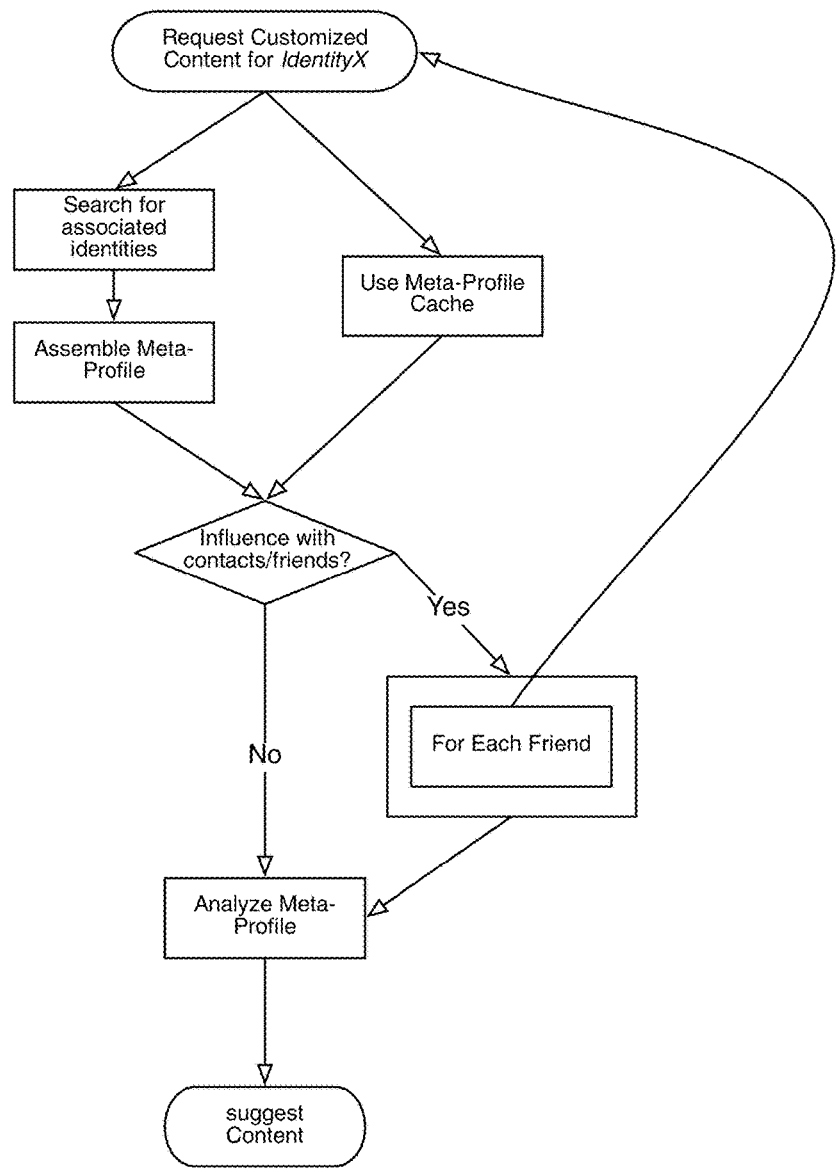
FIG. 51 illustrates how content is suggested from Meta-Profiles analysis.

FIG. 51 illustrates how content is suggested from Meta-Profiles analysis. When content is requested for a given Identity, The System responds by either searching for associated identities and assembling a Meta-Profile, or using a cached Meta-Profile for that identity. If the request is to include the influence of the identities contacts/friends, sub-requests of this functionality (recursions) are made and may be limited to one or more social networks as the contacts basis. Once the necessary Meta-Profiles are amassed, they are analyzed and content is suggested.

FIG. 52 illustrates Demographics Reporting on a Set Population. Once the population is identified, The System either assembles the Meta-Profiles or uses cached Meta-Profiles. The population is then profiled, and a report is generated, or a series of filters may be applied to further refine the population before generating a report.

FIG. 53 illustrates Demographics Reporting to Target A Population. Once a target demographic is identified, The System either assembles the Meta-Profiles or uses cached Meta-Profiles. These profiles are then queried/analyzed to generate reports such as Corollary Interests or a Segmentation Analysis/report. If a Segmentation report is made, The System may then try to identify ideal segments to target the population with. For example, this system can be used to profile supporters of a political candidate across multiple networks. If a segmentation report is made, breaking down the supporters into interest groups across networks, ideal segments to target for advertising may be then identified. This is explained more in FIG. 54.

Figure 54:
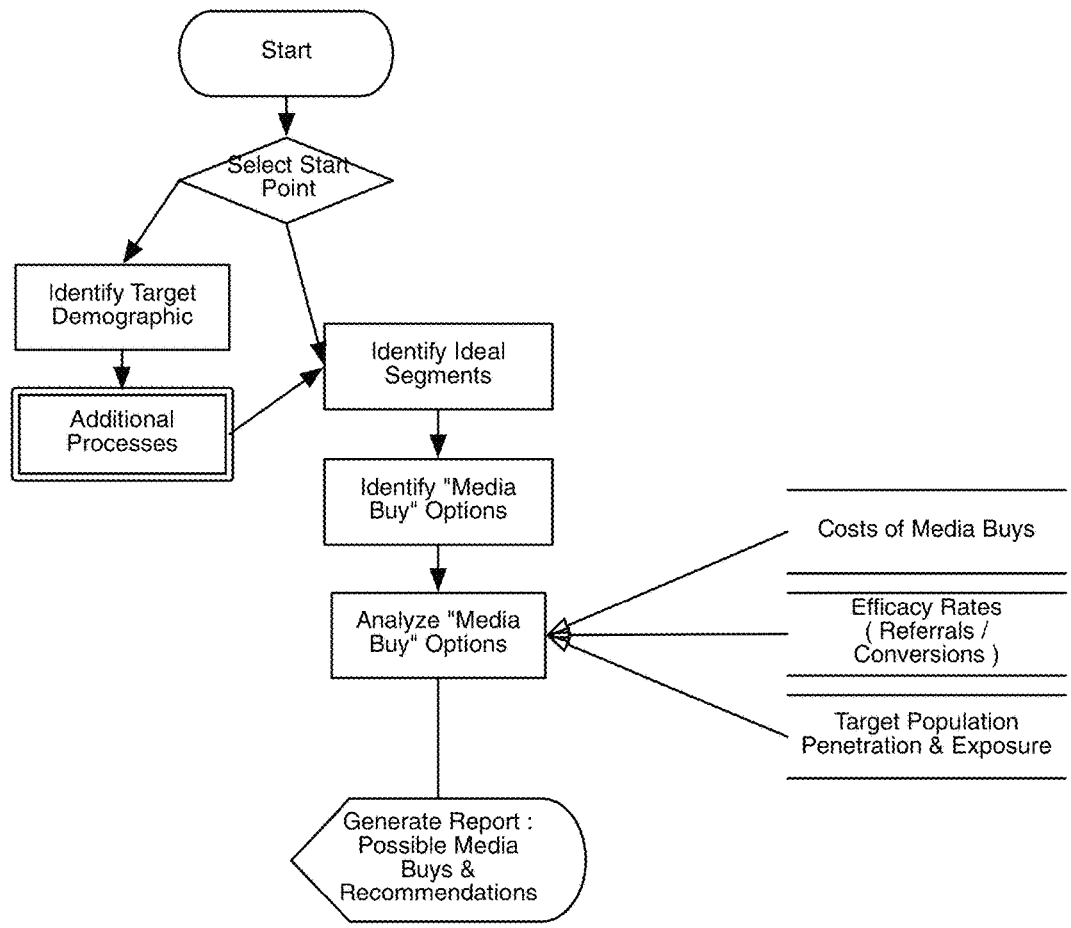
FIG. 54 illustrates a subsystem used for Media Buy optimization

FIG. 54 illustrates a subsystem used for Media Buy optimization Once segments are identified, The System can identify or be provided with Media Buy options for analysis. Analysis factors in the cost of media, along with efficacy rates (referrals/conversions), and the penetration & exposure of the target populations—along with the requestor's stated goals—in order to generate a report identifying the ideal media buy recommendations.

FIG. 39

FIG. 39 illustrates the innovations of The System in protecting end-user identity. The upper diagram illustrates the status quo of identity systems: Standard identity systems conflate multiple identities onto a single URL, giving the ability to backtrace from any one identity onto another. We see 3 distinct areas of a person's online activity: work, family, friends, and have multiple accounts mapped to each one. The identity aggregator serves as a focal point for all of this activity, but inherently allows discovery of any one identity from another. The lower diagram illustrates the innovations of The System in addressing this situation. The invention inserts a virtual firewall between the identity server and the various identities. Each identity hits the firewall as an endpoint, prohibiting a backtrace from one identity to another. Users may provide the identity server with information, and configure the firewall element with rules that show information or allow connections to other identities.

FIG. 40

FIG. 40 illustrates the importance of this innovation. As shown in diagram A (An illustration of the normal overlap of friends, family and work circles of relationships and personality): people have multiple identity facets, both offline and online. These facets are mostly kept separate from one another by people, but there is often some overlap.

The status quo systems, illustrated in diagram b, ignore divisions of identity and create linkage around a single entity. This is largely due to the developers and proponents of these systems believing in and advocating a public lifestyle of blogs and journals.

In diagram C, we're reminded that most people have complex circles of friends, family, work, and sometimes other groupings . . . and that the centralized approach offers the risk of backtracing, which can affect personal and professional lives. In the last diagram, we see this backtrace illustrated—how a search of a friends website can lead to the exposure of all friends, family and work information.

FIG. 41

Online relationships are typically defined through their networks; where people are related to one another through the context of a specific network, as illustrated in FIG. 41-A.

New attempts at online identity correlation 'flatten' these network associations and create relations through individuals, as illustrated in FIG. 41-B.

These new attempts create a problem when two individuals are on more than one network, but do not want to be connected to one another on specific networks. In the illustration 41-C, the leftmost and rightmost entities are connected to the base individual through the short-single-line, but are explicitly not connected to the users through networks attached by the long-double-line The Invention correlates contacts by maintaining the network specific online relations; it then uses its systems, methods & user filters to dynamically link each connected identity with the content and relationships that are visible to the other identities based on the network & identity. This is illustrated in 41-D.

FIG. 45

FIG. 45 is a screenshot of user targeting within The System. This functionality allows for a user to create filters and 'drill down' to populations matching exact demographic criteria. The criteria are culled from cross-site data. Here we see several filters in place: the population is being filtered for:
  Age within lower & upper boundaries
  Network association
  Geographic region This interface to The System allows for any of these filters to be modified or removed, and additional filters added. Filtering of this kind may be done within identities tracked by The System at large, or through specific subsets of identities—such as those that belong to a political group, or belong to a specific network or promotion. Depending on legal privacy constraints with user contracts & data procurement, the results of this targeting may be actionable.

FIG. 46 is a screenshot of demographic profiling. This functionality allows for the display and breakdown of demographic patterns based on cross-site information. Here we see a profiling of 1.34 million members of a specific group scattered across networks based on their cross-site profile data.

FIG. 47 is a screenshot of syndication metrics. This functionality uses cross-site data to show how media (widgets, advertisements, etc) is consumed by a cross-network base. The image shows per-network and multi-network activity. This function is utilized by The System in its user & group widgets, and is also utilized by partners looking to gauge the performance of their own campaigns across networks.

Figure 48:
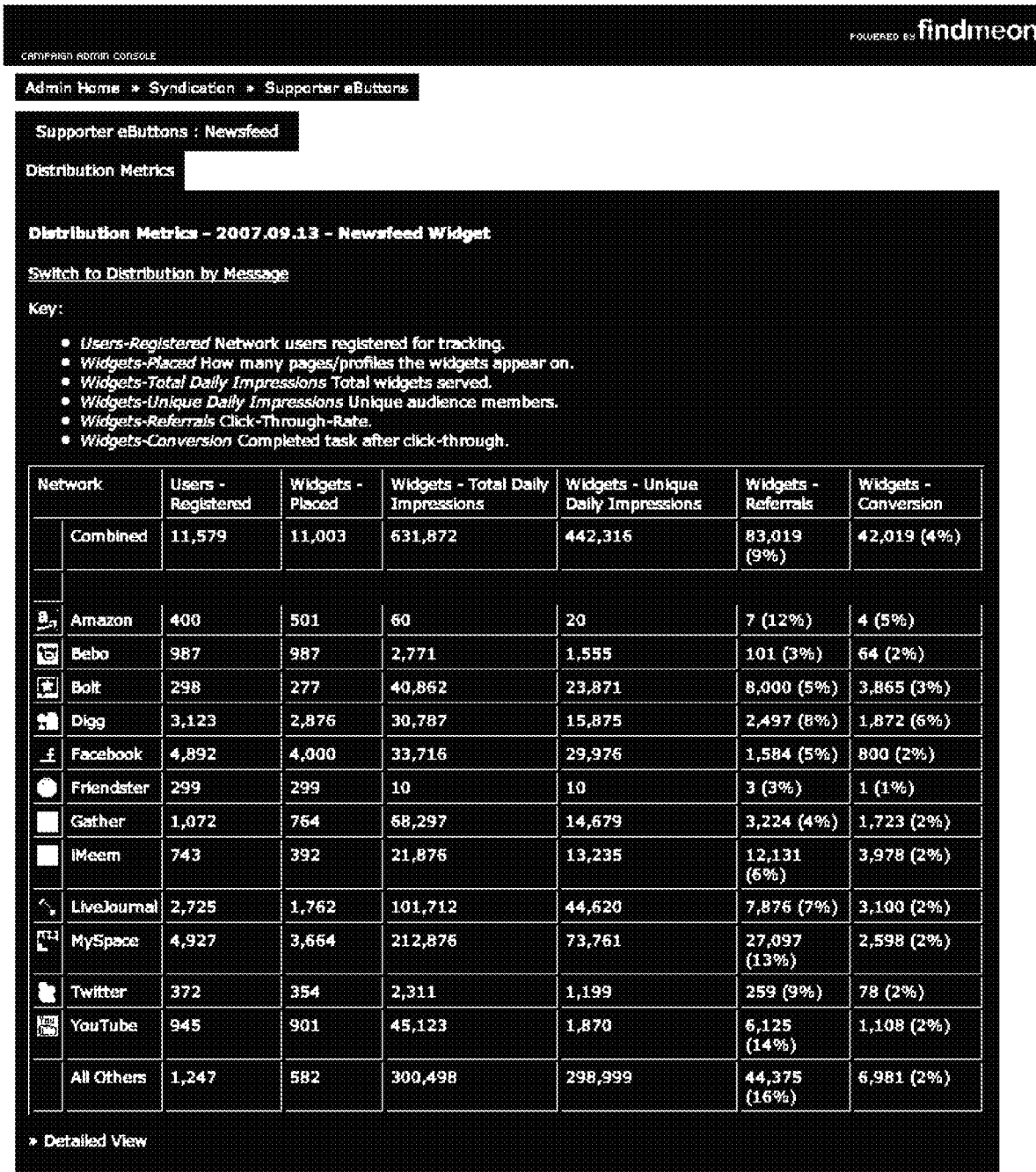
FIG. 48 is a screenshot of conversion metrics. This functionality uses cross-site data to show how media (widgets, advertisements, etc) is consumed by a cross-network base, and the user response. The image shows per-network activity, but can also show multi-network activity.
Figure 50:
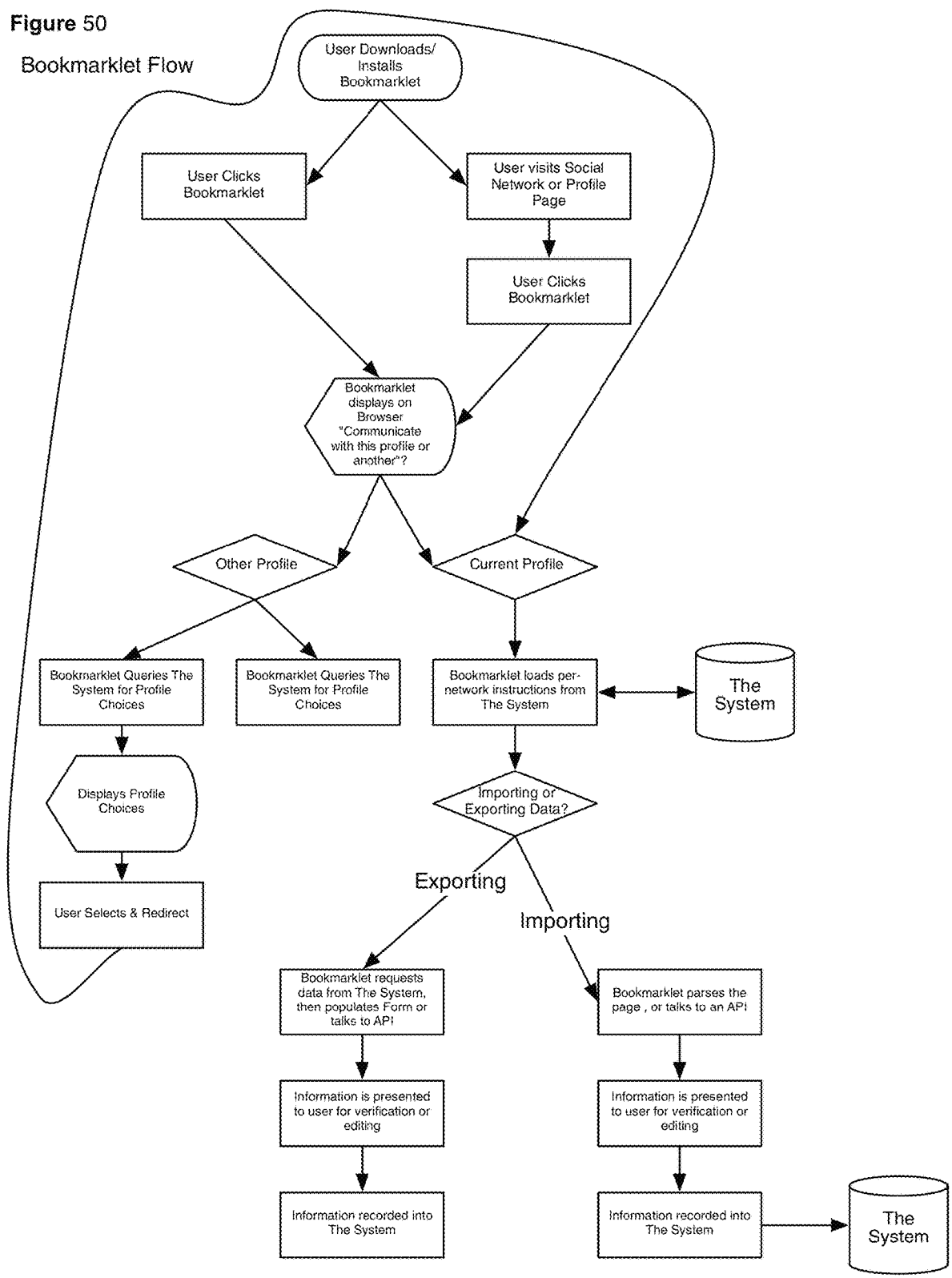
FIG. 50 illustrates sample logic of a JavaScript bookmarklet used to facilitate information porting for users.

FIG. 48 is a screenshot of conversion metrics. This functionality uses cross-site data to show how media (widgets, advertisements, etc) is consumed by a cross-network base, and the user response. The image shows per-network activity, but can also show multi-network activity. In this particular example, cross-site data is used to gauge how members of different social networks respond to a political campaign that is being tracked by The System. Cross-Site data and indexing allows The System to gauge message exposure on a per-identity basis, and then translate that exposure to network membership—this helps the message syndicator identify the best & worst performing networks for their campaign, and identify new avenues for messaging improvement and growth.

Figure 55:
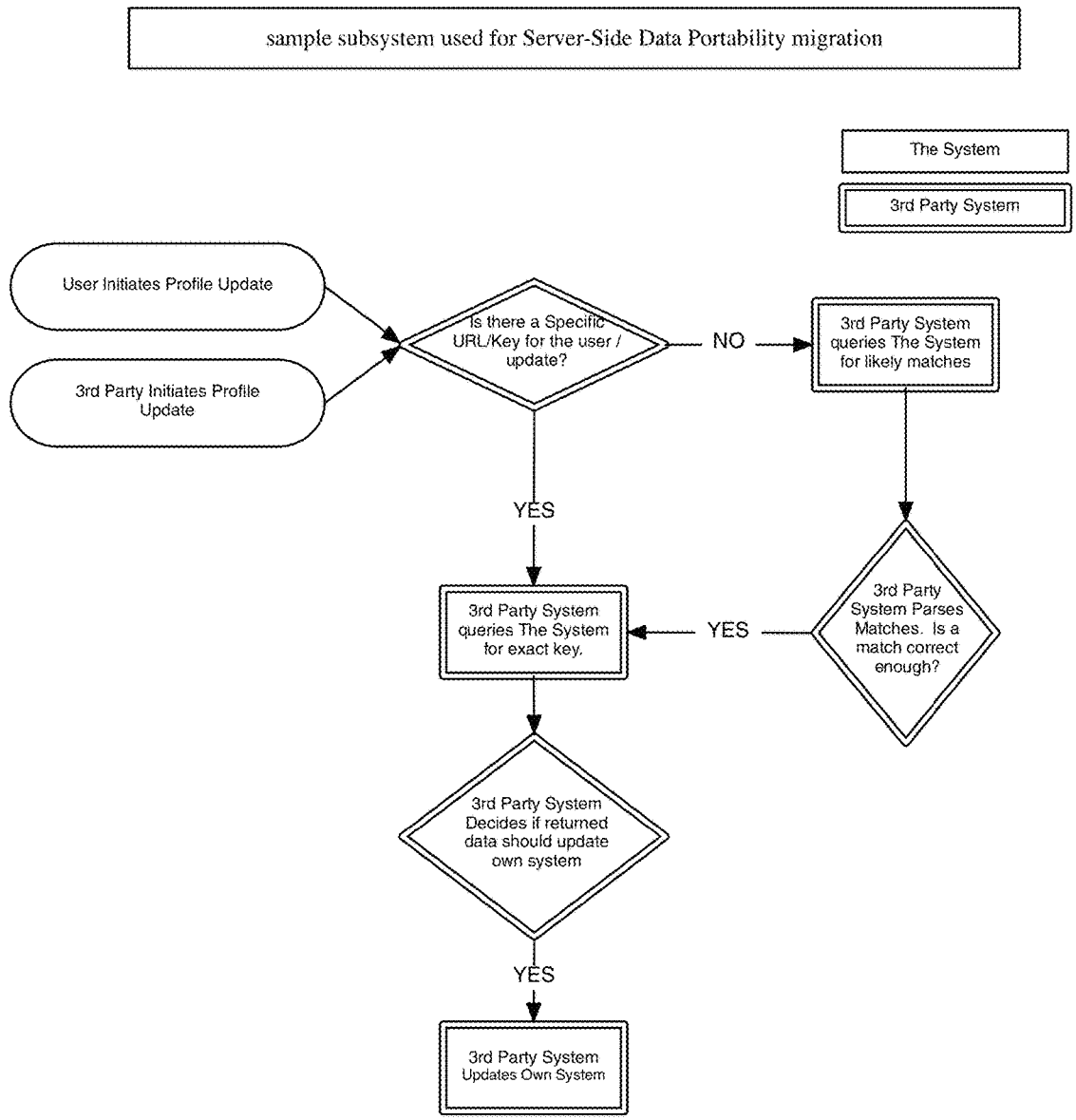
FIG. 55 illustrates a subsystem used for Server-Side Data Portability migration.

FIG. 55 illustrates a sample subsystem used for Server-Side Data Portability migration. This is the mechanism through which 3$^{rd}$ party systems can update their data stores by interfacing with The System. Once a profile update is initiated, a key to content/referenced content on The System is necessary. This can occur by the 3$^{rd}$ party system providing an exact key on initiation, or by the 3$^{rd}$ party system querying The System for likely matches and then deciding which key is most appropriate. Once The System is provided with a key, it returns the requested content or content reference, and the 3$^{rd}$ party system may then update their data store.

The system of this invention is a framework with which diffuse online identities can be associated to one another, leveraged to reference Meta-Identities referencing real internet users, and at the same time ensure modes and methods of privacy for the owners of these identities—allowing for a very granular level of control of information sharing and management. This framework can also be extended to allow for the sharing via identification or transfer of associated identity data/content.

While these identity management innovations disclosed are impressive themselves, they are merely exemplary of The System's core functionality. The resource that a private claim points to need not be a database, dynamic, or on the same server; it could be a collection of multiple static files on multiple machines, each of which are able to function as private authorities to verify identity, provide more identities, or provide content that may be optionally filtered for presentation.

Additionally, optionally filtered content would include or exclude information such as:
  i. Identities
  ii. Profiles
  iii. Packaged content based on configurable rules such as:
    a. The identity/identity facet a request comes through (as identified by the uniquely private code)
    b. The identity of the person, network or application making a request (either as an individual or linked to a class/group of individuals assigned the same filtering permissions)
    c. Non-identity specific information such as the time of day or a geographically contextualized IP address of the user.

As a centralized service, The System allows an individual to list the various facets (multiple identities) of their Meta-Identity. These identities can each be assigned a default privacy level, with configurable filtering rules to give granular control.

The example system allows for online identities to be marked as 'Public' (meaning that anyone can see them), 'Private' (no one can see them), 'Friends' (only friends can see them), or 'Friend of a Friend' (visible to a configurable N levels deep of interpersonal relations); and for the dynamic creations of rule-sets and roles by users. Additionally, this example system allows for 'Network Specific Overrides'—in which an identity may be marked as 'always visible' or 'always hidden' from specific other identities.

Network Specific Overrides were created for two reasons:
  a—They allow users to group and syndicate identity-specific information to entire networks, regardless of the 'person' viewing the information. This means that a user can allow for information to be syndicated to the social network Myspace.com, but not to the photo sharing network Flickr.com—allowing for Internet users at-large to access the information through those networks, and not necessitate registration through The System itself.
  b—Users of The System can construct 'groups' which are essentially micro social-networks, or social-networks in the true sense: a group of people, not necessarily bound to a web site. Users can create groupings of contacts such as 'friends', 'colleagues', 'family', 'kickball league', etc, and assign visibility overrides of their online identities to them.

With an explosion in decentralized online services, this service gives subscribers the ability to re-centralize their accounts around themselves, linking diffuse accounts either on their many website profiles or through a centralized directory. Subscribers are able to say "I am User #123 on siteA.com, and account XYZ on siteB.net"; Privacy controls allow them to shield their site B identity from individuals or applications that request information from the perspective of the site A identity.

Users may chain override rules to create complex filtering sets based on custom groupings or network identities. For example:
  1) A user of The System may classify their identities on the social network sites Friendster.com and Facebook.com as 'Public', and their identity on the music site Last.fm™ as 'Private'.

2) The user may create an override that makes their identity on Last.fm™ always visible to identities that are classified or grouped as 'friends' or 'family'.
3) The user may create an override to hide their Friendster.com identity from the perspective of Myspace.com.
4) The user may create an override for specific identities to override other options: e.g. "always show information to User A of The System", or "always hide information from User B on Myspace.com", or "always show information to identities that belong to the grouping friends".
5) The System may offer an API to allow external websites/services to request information contextualized either to their network or to specific accounts on their network; i.e. MySpace.com may request identity information from The System through an API, and the request may be processed either from the perspective of the network itself, or from a specific user on that network.

These filtering rules may be applied both to user profile information (which covers the individual identities that comprise a Meta-Identity, in addition to profile attributes), and to content that is stored or referenced by The System on behalf of the user (stored content being defined as i) entered or uploaded into The System directly or ii) downloaded by The System; referenced content defined as a link to external content.)

The System allows for 'content' to be entered/uploaded or registered with The System as a reference for syndication and coordination. By storing/referencing content centrally in The System, user's may create privacy levels for the content based on network/identity, groups, and individuals—in addition to override filters and reusable rule sets (all as mentioned above). Content is stored or referenced in The System according to an identifier referencing the user's Meta-Identity, but is syndicated or displayed based on per-identity permissions.

The System is further capable of managing this content by allowing users to specify which content or content-feeds can be made available to specific accounts or identities through default options and network/group/individual overrides. Content can either be requested by networks or individuals, or it can be pushed to networks or individuals via predefined intervals or triggers.

When displaying or syndicating content, The System can apply user-defined filtering rules to decide which content items are visible to networks, individuals or groups.

The System can be configured, either by users or administrators, to receive or index/pull content for Meta-Identities from specific sources, and then syndicate that data or referenced data on behalf of the user. This can be accomplished in any one of three ways:
a) The System merely indexes/pulls content from the 3rd party via an API or known content placement format that relates content to the user;
b) the third party is known to The System as a trusted system and pushes content to The System via an API that may optionally include a digital signature, secret key, or other method proving that content came from the trusted third party system;
c) the user may share a secret key with the third party, allowing it to digitally sign or otherwise prove that the content comes on behalf of the user.

The System of my invention is able to offer a robust solution to online identity management/syndication and portable cross network content and relationships that safeguards user privacy, while providing networks and advertisers with userbase management, marketing and content customization tools. It is not only one of the first social network mapping technologies, but one that resolves the competing interests of user privacy and advertiser intelligence.

Having described certain embodiments of the invention, it should be understood that the invention is not limited to the above description or the attached exemplary drawings. Rather, the scope of the invention is defined by the claims appearing hereinbelow and any equivalents thereof as would be appreciated by one of ordinary skill in the art.

What is claimed is:

1. A computer-implemented method for implementing a content customization service that utilizes cross network identity data, comprising:
   an identity resolution system aggregating, for each of one or more specified identities, by one or more computer processors, a plurality of intra-related identities on a social graph into an aggregated meta-identity node representing a single underlying entity at an established likelihood, the said aggregated meta-identity node containing a unified meta-profile comprising at least one of:
   combined profile information, or
   combined inter-related identity relationships, or
   combined intra-related identity relationships of the meta-identity's component intra-related identities;
   wherein at least one of the plurality of intra-related identities is not registered with the identity resolution system;
   and either
   responding to requests for content customization for one or more specified identities by utilizing the aggregated meta-identity node intra-related to each specified identity, or
   responding to requests for content customization for one or more specified keywords by utilizing the aggregated meta-identity node; wherein the content customization service is implemented using one or more computer memories.

2. The method of claim 1 wherein the content customization is based on either:
   unified meta-profile information associated to each specified identity's own aggregated meta-identity, or
   unified meta-profile information associated to each specified identity's inter-related aggregated meta-identities, or
   profile information associated to each specified identity's intra-related component identities, or
      profile information associated to each specified identity's inter-related aggregated meta-identities' intra-related component identities.

3. The method of claim 1 wherein a given element of an aggregated meta-identity's unified meta-profile is completed by the first occurrence of a parcel of information associated to any one of the intra-related component identities.

4. The method of claim 1 wherein a given element of an aggregated meta-identity's unified meta-profile is amplified by subsequent occurrences of a parcel of information associated to any two or more of the intra-related component identities.

5. The method of claim 1 wherein the request for content customization for one or more specified identities returns relevant keywords, recommended content, recommended advertising or recommended demographic groups.

6. The method of claim 1 wherein the content customization is based on the occurrence of the specified keywords in the unified meta-profile information or component identity profile information.

7. The method of claim 6 wherein the keywords are either:
one or more raw terms as they appear within profile data;
one or more raw terms as they appear in the name or identifier of an inter-related, intra-related or affinity-related entity;
one or more derived terms associated to raw terms appearing in the profile data;
one or more derived terms associated to entities that are inter-related, intra-related or affinity-related.

8. The method of claim 6 wherein the keywords are either associated to profile information when first analyzed, upon demand, or during periodic analysis.

9. The method of claim 5 wherein the content customization of recommended demographic groups returns a listing of demographic groups matching the specified identity's meta-profile or returns a listing of online services or websites the specified identity's associated entities have either established a profile on or have an affinity to potentially use.

10. The method of claim 1 wherein the request for content customization for one or more specified keywords returns either a listing of: one or more secondary terms appearing with the one or more specified terms in cross-network profiles, or one or more online services or websites which feature profiles matching the specified terms.

11. The computer system of claim 1 wherein the intra-related identities are aggregated into a previously aggregated meta-identity when the previously aggregated meta-identity was previously determined for one or more of the intra-related identities.

12. A computer system comprising: one or more server computers comprising non-transitive computer memory and configured to provide a content customization service that is implemented by configuring the one or more server computers and computer memory to:
aggregate, for each of one or more specified identities, utilizing an identity resolution system, one or more intra-related identities on a social graph into a single node representing a single underlying entity at an established likelihood, the said aggregated meta-identity node containing a unified meta-profile comprising at least one of:
combined profile information, or
combined inter-related identity relationships, or
combined intra-related identity relationships of the meta-identity's component intra-related identities,
wherein at least one of the plurality of intra-related identities is not registered with the identity resolution system;
and either
respond to requests for content customization for one or more specified identities by utilizing the aggregated meta-identity node intra-related to each specified identity,
or
respond to requests for content customization for one or more specified keywords by utilizing the aggregated meta-identity node intra-related to each specified identity.

13. The computer system of claim 12 wherein the intra-related identities are aggregated into a previously aggregated meta-identity when the previously aggregated meta-identity was previously determined for one or more of the intra-related identities.

* * * * *